United States Patent
Claesen et al.

(10) Patent No.: US 12,504,584 B2
(45) Date of Patent: Dec. 23, 2025

(54) FIBER ROUTING SYSTEMS AND METHODS

(71) Applicant: COMMSCOPE TECHNOLOGIES LLC, Hickory, NC (US)

(72) Inventors: Jeroen Claesen, Heverlee (BE); Debora Dockx, Duffel (BE); David James Mather, Altrincham (GB); Jozef Christiaan Mathieu Versleegers, Bree (BE)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 259 days.

(21) Appl. No.: 17/921,047

(22) PCT Filed: Apr. 23, 2021

(86) PCT No.: PCT/US2021/028957
§ 371 (c)(1),
(2) Date: Oct. 24, 2022

(87) PCT Pub. No.: WO2021/217079
PCT Pub. Date: Oct. 28, 2021

(65) Prior Publication Data
US 2023/0168434 A1  Jun. 1, 2023

Related U.S. Application Data

(60) Provisional application No. 63/154,114, filed on Feb. 26, 2021, provisional application No. 63/015,326, filed on Apr. 24, 2020.

(51) Int. Cl.
G02B 6/36     (2006.01)
G02B 6/44     (2006.01)
G02B 6/38     (2006.01)

(52) U.S. Cl.
CPC ....... *G02B 6/3612* (2013.01); *G02B 6/44515* (2023.05); *G02B 6/44528* (2023.05); *G02B 6/3849* (2013.01)

(58) Field of Classification Search
CPC .. G02B 6/3612; G02B 6/3897; G02B 6/3849; G02B 6/44515; G02B 6/44528;
(Continued)

(56) References Cited

U.S. PATENT DOCUMENTS 6,005,991 A    12/1999  Knasel
6,400,882 B1    6/2002  Sun et al.
(Continued)

FOREIGN PATENT DOCUMENTS

JP    2001255420 A  *  9/2001  ........... G02B 6/3612
WO   2012/112344 A1    8/2012
(Continued)

OTHER PUBLICATIONS

Extended European Search Report for Application No. 21792704.5 mailed May 22, 2024.
(Continued)

*Primary Examiner* — John L Goff, II
(74) *Attorney, Agent, or Firm* — Merchant & Gould P.C.

(57) ABSTRACT

The present disclosure relates to fiber management systems and methods for facilitating assembling fiber optic devices in an efficient manner by allowing pre-processed and tested optical fibers to be pre-routed on a substrate prior to installation in their corresponding fiber optic devices.

29 Claims, 37 Drawing Sheets

(58) Field of Classification Search
CPC .............. G02B 6/3608; G02B 6/3628; G02B 6/46–486; Y10T 156/1795; Y10T 156/1788
USPC .................................................. 156/574, 577
See application file for complete search history.

(56) References Cited

U.S. PATENT DOCUMENTS

| | | | |
|---|---|---|---|
| 6,778,754 B1 * | 8/2004 | Hirayama ................ G02B 6/25 |
| | | | 156/158 |
| 7,397,997 B2 | 7/2008 | Mertesdorf et al. | |
| 7,489,849 B2 | 2/2009 | Reagan et al. | |
| 7,512,304 B2 | 3/2009 | Gronvall et al. | |
| 7,653,282 B2 | 1/2010 | Blackwell, Jr. et al. | |
| 7,903,923 B2 | 3/2011 | Gronvall et al. | |
| 9,086,555 B2 | 7/2015 | Namazue et al. | |
| 9,116,321 B2 | 8/2015 | Sato et al. | |
| 9,880,368 B2 | 1/2018 | Debban et al. | |
| 9,989,723 B2 | 6/2018 | Hoshino et al. | |
| 9,995,896 B2 | 6/2018 | Namazue et al. | |
| 10,007,078 B2 | 6/2018 | Sato et al. | |
| 10,101,549 B2 | 10/2018 | Hoshino et al. | |
| 10,185,105 B2 | 1/2019 | Risch et al. | |
| 10,416,403 B2 | 9/2019 | Okada et al. | |
| 10,488,609 B2 | 11/2019 | Sato et al. | |
| 10,514,517 B2 | 12/2019 | Sato et al. | |
| 2002/0110331 A1 | 8/2002 | Farrelly et al. | |
| 2013/0020015 A1 * | 1/2013 | Dickinson .............. H02G 1/083 |
| | | | 156/166 |
| 2014/0182124 A1 | 7/2014 | Louderback | |
| 2015/0260927 A1 | 9/2015 | Murray et al. | |
| 2018/0348465 A1 * | 12/2018 | Bradley ................... G02B 6/47 |
| 2019/0056553 A1 | 2/2019 | Kewitsch | |
| 2020/0271879 A1 | 8/2020 | Fallahmohammadi et al. | |

FOREIGN PATENT DOCUMENTS

| | | |
|---|---|---|
| WO | 2013/117598 A2 | 8/2013 |
| WO | 2014/055859 A1 | 4/2014 |
| WO | 2016/043922 A1 | 3/2016 |
| WO | 2017/081306 A1 | 5/2017 |
| WO | 2018/085767 A1 | 5/2018 |
| WO | 2018/144128 A2 | 8/2018 |
| WO | 2019/040742 A1 | 2/2019 |
| WO | 2019/070682 A2 | 4/2019 |
| WO | 2019/195602 A1 | 10/2019 |

OTHER PUBLICATIONS

International Search Report and Written Opinion of the International Searching Authority for International Patent Application No. PCT/US2021/028957 mailed Aug. 12, 2021, 7 pages.

* cited by examiner

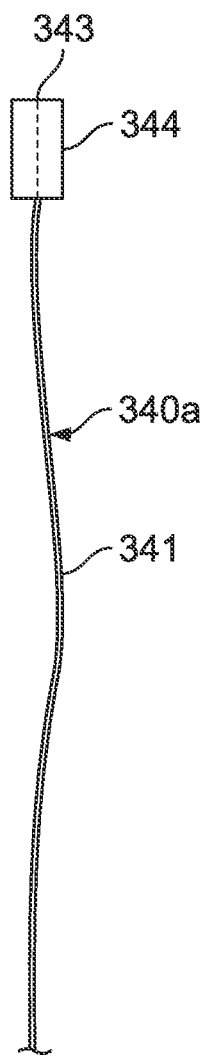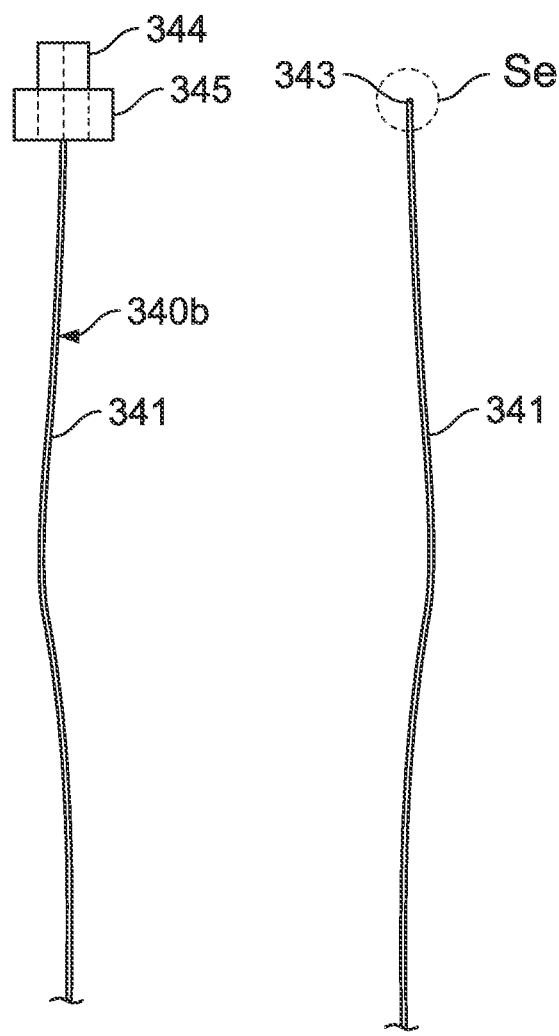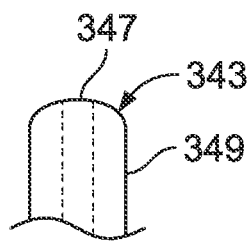
FIG. 5  FIG. 6  FIG. 7
FIG. 7A

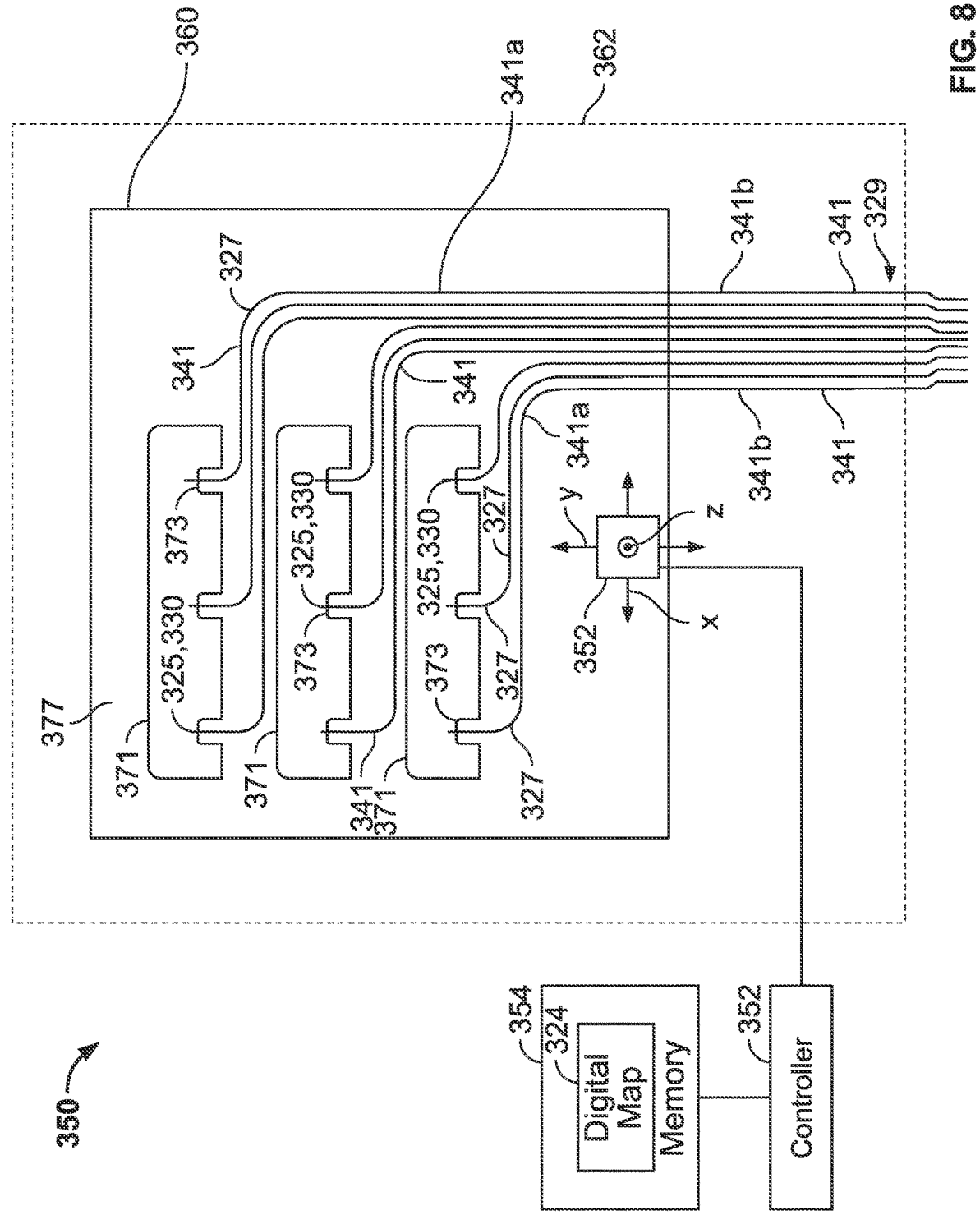

FIBER ROUTING SYSTEMS AND METHODS

CROSS-REFERENCE TO RELATED APPLICATIONS

This application is a National Stage Application of Serial No. PCT/US2021/028957, filed on Apr. 23, 2021, which claims the benefit of U.S. Patent Application Ser. No. 63/015,326, filed on Apr. 24, 2020, and claims the benefit of U.S. Patent Application Ser. No. 63/154,114, filed on Feb. 26, 2021, the disclosures of which are incorporated herein by reference in their entireties. To the extent appropriate, a claim of priority is made to each of the above disclosed applications.

TECHNICAL FIELD

The present disclosure relates generally to fiber routing systems for telecommunication equipment. More particularly, the present disclosure relates to fiber routing systems that use flexible substrates such as polymeric films.

BACKGROUND

Telecommunication systems typically employ a network of telecommunication cables capable of transmitting large volumes of data and voice signals over relatively long distances. The telecommunication cables can include fiber optic cables, electrical cables, and/or combinations of electrical and fiber optic cables. A typical telecommunication network also includes a plurality of telecommunication enclosures integrated throughout the network of telecommunication cables. The telecommunication cables are often terminated by connectors such as fiber optic connectors. The fiber optic connectors can include single-fiber fiber optic connectors and multiple-fiber fiber optic connectors. Fiber optic connectors are adapted for making de-mateable fiber optic connections between two optical fibers or between two sets of optical fibers. Fiber optic connectors are often coupled together via fiber optic adapters, but certain fiber optic connectors can be directly coupled together without the use of fiber optic adapters.

One example type of enclosure frequently used in a telecommunication system is a multi-service terminal (MST). A multi-service terminal is frequently used near the outer edge of a telecommunication network to provide optical connection points for coupling subscribers to the network via drop cables. A typical multi-service terminal includes a plurality of connector ports that are accessible from outside the terminal. Each of the connector ports is adapted for receiving a ruggedized fiber optic connector that terminates the end of a drop cable. The opposite end of the drop cable is often connected to a subscriber location to connect the subscriber location to the telecommunication network. Example multi-service terminals are disclosed by U.S. Pat. Nos. 7,653,282; 7,397,997; 7,903,923; 7,489,849; and 7,512,304 and are also disclosed by International PCT Publication Nos. WO2019/040742 and WO2019/195602.

Flexible films have been used to support and manage optical fiber routing within telecommunications devices such as modules (e.g., see United States Patent Application Publication No. US 2015/0260927 and PCT International Patent Application Publication Nos. WO 2019/070682; WO 2014/055859; and WO 2018/085767). Aspects of the present disclosure relate to enhancements in this area.

SUMMARY

One aspect of the present disclosure relates to fiber management systems and methods for facilitating assembling fiber optic devices in an efficient manner by allowing optical fibers to be pre-routed prior to installation in their corresponding fiber optic devices.

Another aspect of the present disclosure relates to a method for manufacturing an optical circuit layout for an optical connection device including a plurality of optical connection locations arranged in a multi-dimensional configuration. The method includes using a digital map corresponding to the multi-dimensional configuration of optical connection locations to control a robotic device which routes a plurality of optical fibers on a substrate. In one example, the substrate includes a flexible film, but more rigid board-like substrates could also be used. The optical fibers each have at least one pre-processed end (e.g., pre-connectorized, pre-ferrulized, pre-polished, pre-shaped with a laser or other non-contact energy source, etc.) and are pre-tested to confirm acceptable optical performance levels. By pre-testing the optical fibers prior to routing, it is possible to verify that the optical fibers comply with applicable optical loss requirements prior to securing the optical fibers on the substrate. In this way, it is possible to minimize manufacturing costs associated with failed optical connection devices which would typically be discarded. The optical fibers are routed on the substrate by the robotic device along routing paths defined by the digital map with the pre-processed ends of the optical fibers being positioned in a multi-dimensional arrangement that corresponds to the multi-dimensional configuration of the optical connection locations. The optical fibers can be routed on the substrate prior to incorporation of the substrate in the optical connection device thereby simplifying assembly of the optical connection device. Assembly of the optical connection device is further simplified by the pre-positioning of the pre-processed fiber ends in the multi-dimensional arrangement that corresponds to the multi-dimensional configuration of the optical connection locations of the optical connection device such that the pre-processed ends are staged for installation at their corresponding optical connection locations of the optical connection device.

Another aspect of the present disclosure relates to a telecommunications apparatus including a substrate defining a plurality of substrate openings and including a fiber input/output location. The telecommunications apparatus also includes a plurality of optical fibers each routed onto the substrate at the fiber input/output location. The optical fibers each include a first end and an opposite second end. The first ends are secured within single-fiber ferrules. The optical fibers include fixed routing portions extending on the substrate along routing paths extending between the input/output location and the substrate openings. The fixed routing portions are adhesively secured to the substrate. The first ends of the optical fibers secured within the single-fiber ferrules are positioned at the substrate openings. The optical fibers also include routable-portions that are not adhesively secured to the substrate and that extend from the fiber input/output location to the second ends. In one example, the substrate is a sheet (e.g., including one or more layers one of which may include a polymeric film) having a flexible construction. In one example, the sheet mounts to a tray having a more rigid construction than the sheet. In one example, the tray has a molded, plastic construction.

Another telecommunications apparatus in accordance with the principles of the present disclosure includes a substrate defining a substrate opening. In one example, the substrate has a flexible construction and can include a sheet having one or more layers one of which may include a polymeric film. An optical fiber is routed on the substrate.

The optical fiber includes a first end and an opposite second end. The first end is secured within a ferrule of a fiber optic connector. The optical fiber includes a fixed routing portion extending on the substrate along a routing path extending toward the substrate opening. The fixed routing portion is adhesively secured to the substrate. The first end of the optical fiber secured within the ferrule is positioned at the substrate opening. In one example, a plurality of the optical fibers are routed on the substrate. In one example, the substrate defines a plurality of the substrate openings.

A further telecommunications apparatus in accordance with the principles of the present disclosure includes a telecommunications enclosure. The telecommunications enclosure includes a housing, a tray that mounts in the housing and a substrate sheet secured to the tray. The tray substrate sheet has a construction that is more flexible than a construction of the tray. A plurality of optical fibers are routed on the substrate sheet. The optical fibers each include a first end and an opposite second end. The first ends are secured within ferrules. The optical fibers include fixed routing portions that extend on the substrate sheet along routing paths. The fixed routing portions are adhesively secured to the substrate sheet. In certain examples, the optical fibers also include routable-portions that are not adhesively secured to the substrate sheet.

A variety of additional aspects will be set forth in the description that follows. The aspects can relate to individual features and to combinations of features. It is to be understood that both the forgoing general description and the following detailed description are exemplary and explanatory only and are not restrictive of the broad inventive concepts upon which the examples disclosed herein are based.

BRIEF DESCRIPTION OF THE DRAWINGS

FIG. 5 depicts an alternative fiber optic pigtail that can be pre-processed and pre-tested before routing on a substrate;

FIG. 6 depicts a further fiber optic pigtail that can be pre-processed and pre-tested before routing on a substrate;

FIG. 7 depicts a ferrule-less pre-processed optical fiber that can be pre-processed and pre-tested before routing on a substrate;

FIG. 7A is an enlarged view of a pre-processed end of the optical fiber of FIG. 7;

FIG. 8 depicts a system for routing pre-processed optical fibers in accordance with the principles of the present disclosure;

DETAILED DESCRIPTION

Aspects of the present disclosure relate to fiber management arrangements for managing optical fibers for optical connection devices including optical connection locations arranged in a multi-dimensional configuration. The optical connection locations are arranged in a multi-dimensional configuration when the connection locations are relatively positioned in at least two dimensions with respect to one another, as compared to merely being aligned in a single row. An example of optical connection locations arranged in a multi-dimensional configuration includes optical connection locations arranged in a multi-row array. Aspects of the present disclosure also relate to methods for pre-manufacturing optical circuit layouts for use in optical connection devices having connection locations arranged in multi-dimensional configurations. By pre-manufactured, it is meant that the optical circuit layouts are established before installation of the optical fibers in the optical connection devices. In certain examples, pre-manufacturing the optical circuit layouts allows the pre-manufactured fiber management arrangement to stage fiber optic connectors with respect to the arrangement of connection locations to facilitate the assembly process. In certain examples, optical circuit layouts are manufactured using pre-tested, pre-connectorized fiber optic pigtails that are routed on a substrate. In certain examples, the pre-connectorized fiber optic pigtails are robotically routed on a substrate using a robotic device. An example robotic fiber routing device is disclosed by U.S. Pat. No. 6,400,882, which is hereby incorporated by reference in its entirety. In certain examples, routing paths of the fiber optic pigtails are defined by a digital map accessed by a control system that controls movement of the robotic device. The control system can include one or more processors (e.g., digital processors) and memory for storing digital information (e.g., a digital map and control protocol for controlling operation of the robotic device). In certain examples, the substrates include flexible sheets including one or more layers that may include a polymeric film or other thin, sheet-like layer.

Figure 1:
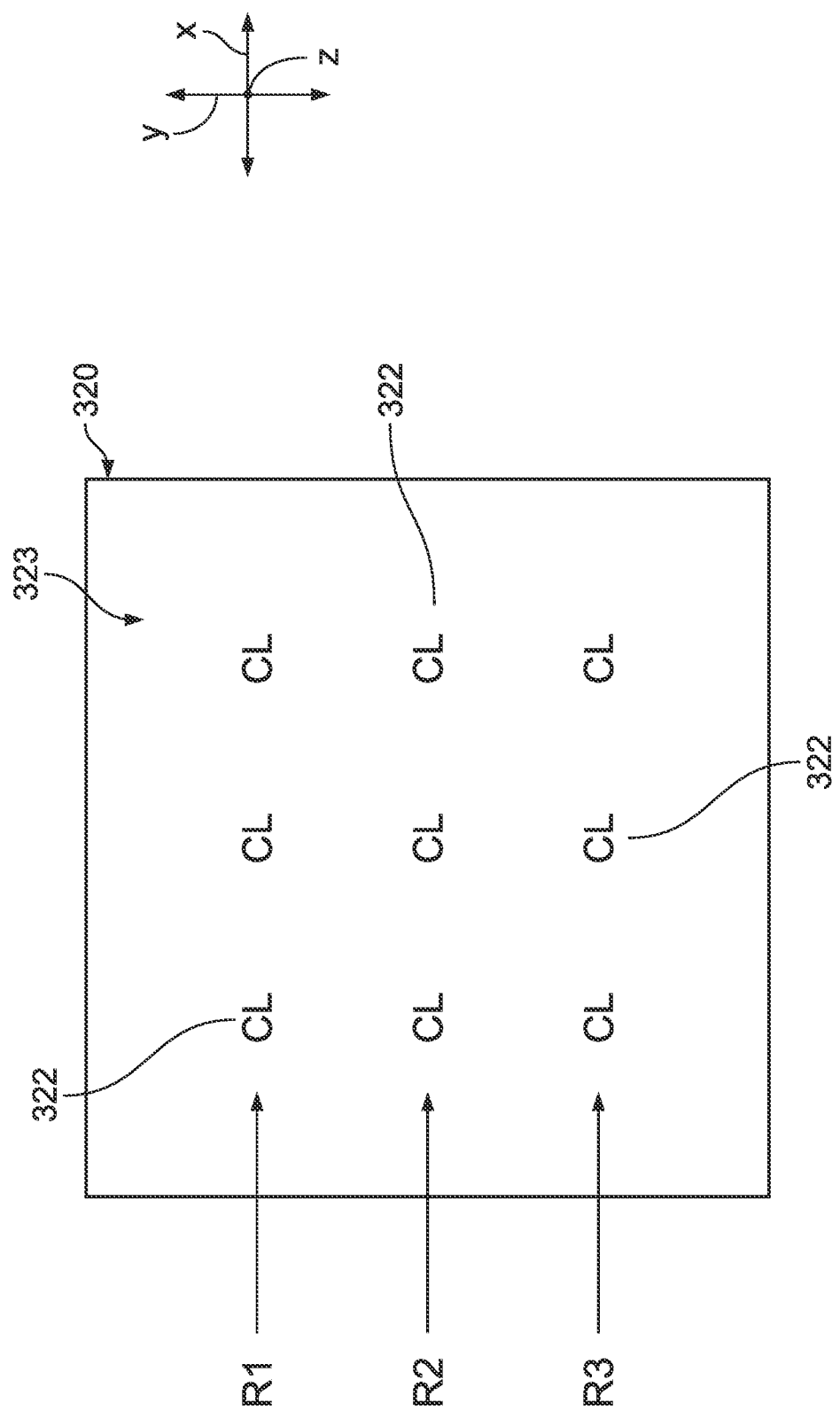
FIG. 1 schematically depicts a telecommunications apparatus having optical connection locations arranged in a predefined multi-dimensional configuration.

FIG. 1 schematically depicts an optical connection device 320 including optical connection locations 322 arranged in a multi-dimensional configuration 323 (e.g., an array having multiple rows R1-R3 of connection locations as depicted). The connection locations 322 of each row R1-R3 are spaced-apart along an x-axis, and the rows R1-R3 are spaced-apart from one another along a y-axis that is perpendicular to the x-axis. Thus, the multi-dimensional configuration 323 is a two-dimensional configurations. Aspects of the present disclosure are also applicable to optical connection devices having three-dimensional configurations of optical connection locations. For example, in the optical connection device 320 of FIG. 1, the rows R1-R3 could also be staggered or offset with respect to one another along a z-axis that is perpendicular to the x-axis and the y-axis. In certain examples the optical connection locations 322 can each include a fiber optic adapter or other structure adapted for providing a de-mateable optical connection between optical fibers (e.g., between two individual fibers or between two sets of optical fibers). In certain examples, the optical connection device 320 can include a telecommunications apparatus such as a fiber optic connection panel (e.g., a patch panel or cross-connect panel), a telecommunications module or a telecommunications enclosure.

Figure 2:
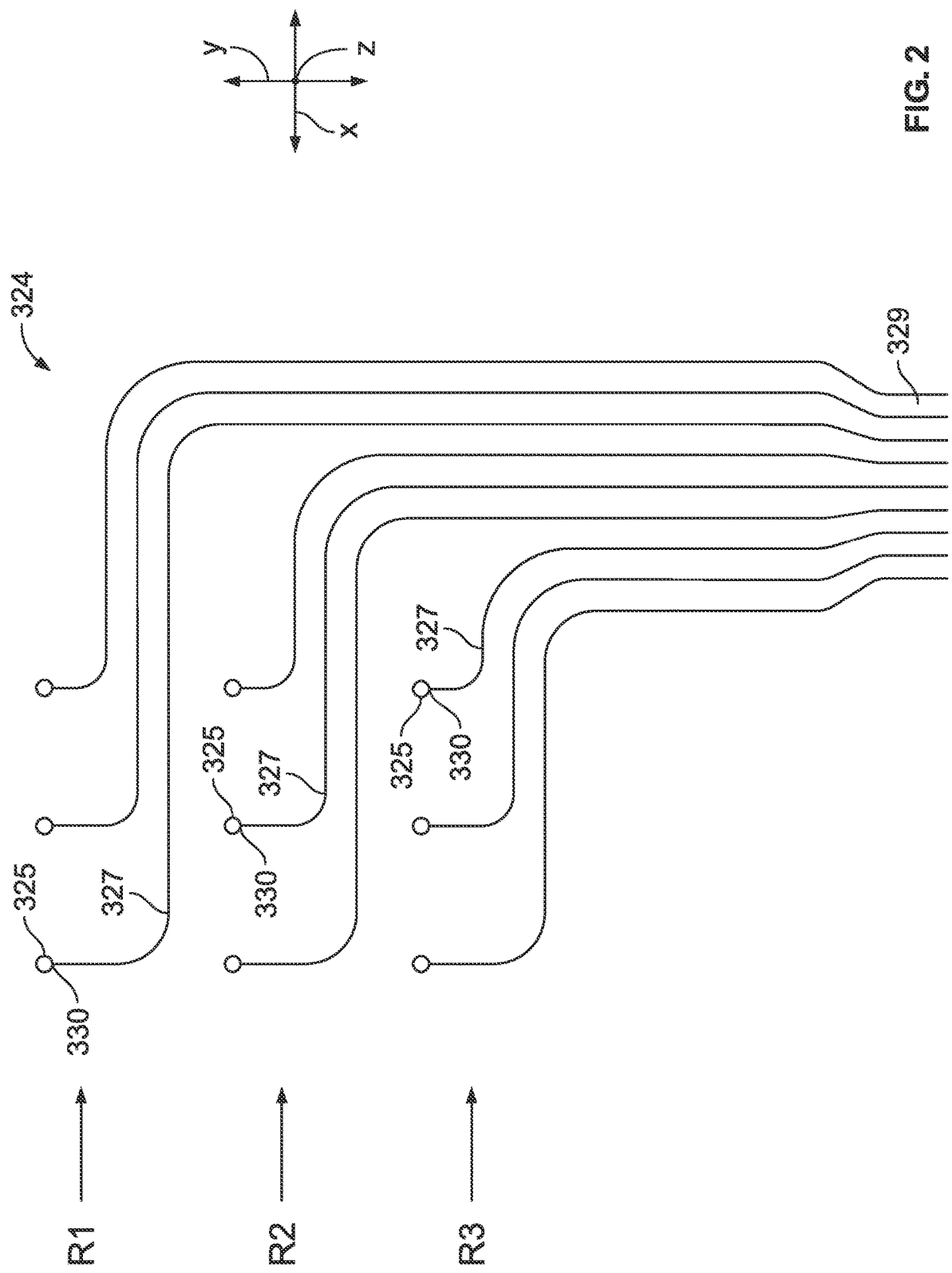
FIG. 2 schematically depicts a digital map which defines fiber routing paths having fiber termination locations arranged in a multi-dimensional configuration that corresponds to the predefined multi-dimensional configuration of the optical connection locations of the telecommunications apparatus of FIG. 1.

FIG. 2 schematically depicts a digital map 324 defining a plurality of fiber routing path termination locations 325 arranged in a multi-dimensional configuration that corresponds to (e.g., matches, complements, relates to) the multi-dimensional configuration of optical connection locations 322 depicted at FIG.1. The path termination locations 325 are arranged in multiple rows R1-R3 with the termination path locations 325 of each row R1-R3 being spaced-apart from one another along the x-axis, and with each of the rows R1-R3 being spaced-apart from one another along the y-axis. The path termination locations 325 can be positioned to overlay or register with the optical connection locations 322. The digital map 324 can also define fiber routing paths 327 that extend along multi-dimensional paths and that terminate at the path termination locations 325. The fiber routing paths 327 can extend from first locations 329 to second locations 330 (e.g., the path termination locations 325). In one example, the first locations 329 of the various routing paths are located in close proximity to one another and the routing paths 327 are parallel to one another at the first locations 329 to enable the creation of a length of ribbonized optical fiber.

It will be appreciated that the data of the digital map can be stored in memory (e.g., semi-conductor based memory) in a digital format that can be accessed by an electronic device including one or more processors (e.g., digital processors) having logic circuitry capable of accessing data from digital memory, responding to and processing instructions from memory, and performing operations dictated by stored data. In certain examples, the one or more processors can be used to control an electronic device such as a robotic device such that the robotic device can route optical fibers on a substrate in a multi-dimensional configuration in accordance with the digital map accessed from memory.

Figure 3:
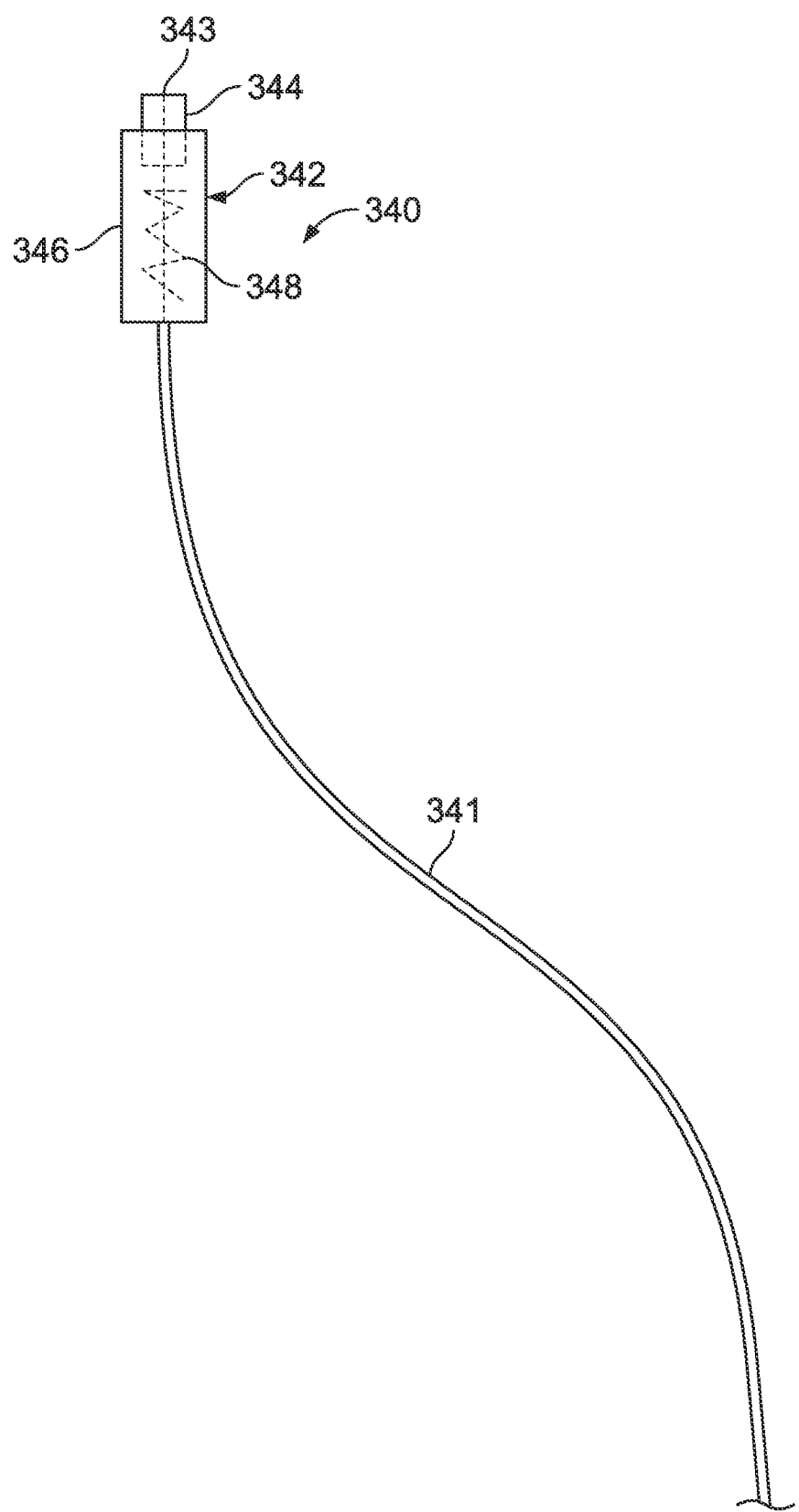
FIG. 3 depicts an example connectorized fiber optic pigtail that can be robotically routed along the fiber routing paths defined by the digital map of FIG. 2 with connectorized ends of the fiber optic pigtails positioned at the fiber termination locations.
Figure 4:
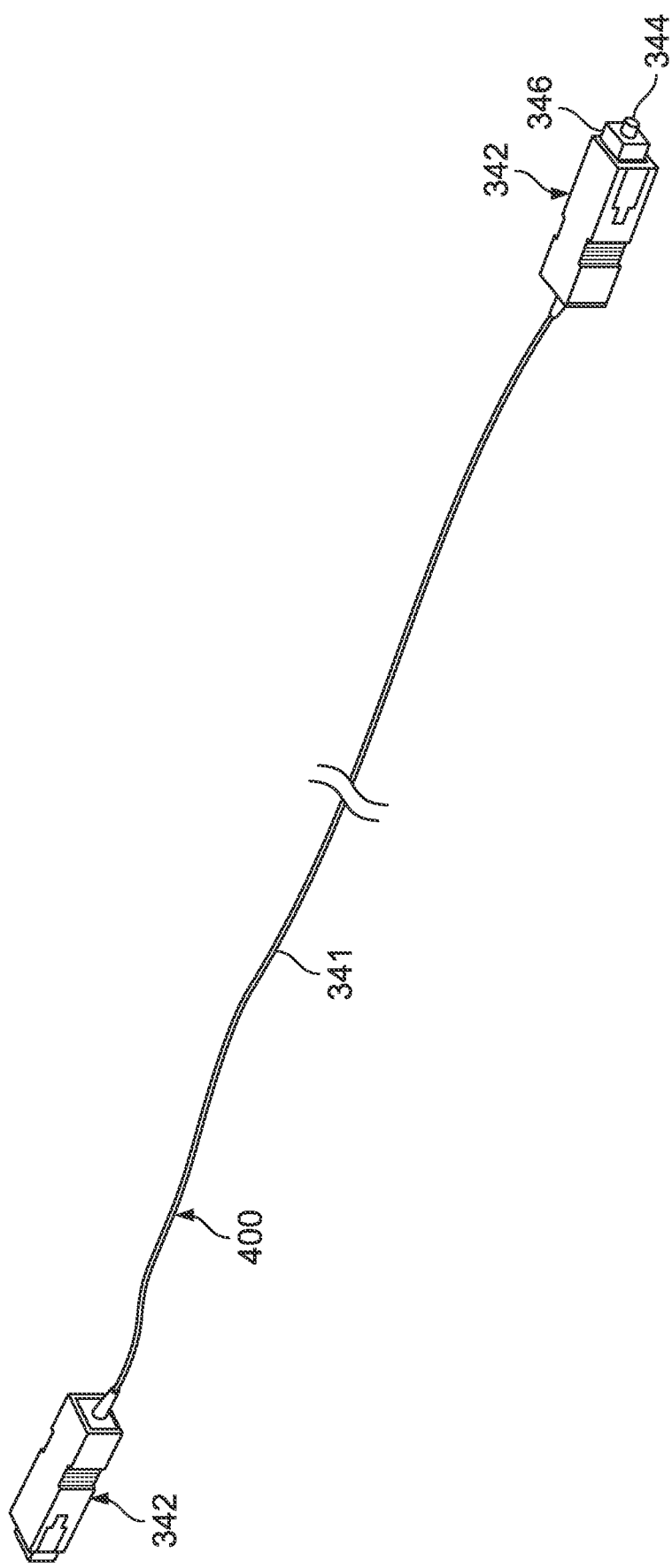
FIG. 4 depicts a fiber optic patch cord having opposite connectorized ends, the fiber optic patch cord can be optically tested and then cut in the middle to form two pre-tested connectorized fiber optic pigtails of the type shown at FIG. 3.

In certain examples, optical circuit layouts are manufactured using optical fibers that are pre-processed and pre-tested before the optical fibers are routed on a substrate. In certain examples, the pre-processed optical fibers are robotically routed on a substrate using a robotic device in accordance with a layout specified by a digital map as described above. The pre-processed optical fibers each have at least one pre-processed end (e.g., pre-connectorized, pre-ferrulized, pre-polished, pre-shaped with a laser or other non-contact energy source, etc.) that is processed before the optical fiber is routed on a substrate. In certain examples, the pre-processed optical fiber can be pre-connectorized with a full fiber optic connector (e.g., an SC fiber optic connector, an LC fiber optic connector, or other type of fiber optic connector such as a ferrule-less connector). FIG. 3 shows a pre-processed and pre-tested optical fiber 341 that is part of a pre-connectorized and pre-tested fiber optic pigtail 340. The optical fiber 341 has a pre-processed end 343 supported by a full fiber optic connector 342 such as an LC or SC connector. The connector 342 includes a ferrule 344 mounted at the pre-processed end 343 of the optical fiber 341. Often, the end 343 of the optical fiber 341 is processed (e.g., via polishing, laser cleaving or shaping, plasma treatment or other treatments) after the fiber 341 has been secured in the ferrule, but before routing of the fiber on a substrate. The ferrule 344 is mounted at a distal end of a connector body 346 typically having a form-factor adapted to mate with the port of a corresponding fiber optic adapter. The ferrule 344 is often axially moveable relative to the connector body 346 and can be spring biased in a distal direction relative to the connector body 346 by a spring 348 within the connector body 346.

In certain examples, pre-connectorized and pre-tested fiber optic pigtails 340 can be manufactured by initially manufacturing a fiber optic patch cord 400 including an optical fiber 341 with connectors 342 terminated at opposite ends of the optical fiber 341 which support pre-processed ends of the optical fiber 341. By providing the fiber optic connectors 342 at both ends of the patch cord 400, the cord overall and connectors 342 can be readily tested for optical performance such as continuity, return loss and insertion loss by plugging the connectors 342 into conventional test equipment and implementing performance testing. After testing and confirming suitable optical performance of the patch cord 400, the patch cord 400 can be cut in the middle to provide two of the pre-connectorized and pre-tested fiber optic pigtails 340.

It will be appreciated that the optical fiber 341 can optionally be a bare optic fiber (e.g., a fiber including a core and a cladding layer surrounding the core). However, for most applications, the portion of the optical fiber intended to be routed on the substrate preferably is not bare and instead includes at least a coating layer (e.g., an acrylate layer) that surrounds and protects the cladding and core. The portion of the optical fiber bonded within the ferrule 344 is typically a bare fiber (e.g., uncoated).

In the case where a full connector including a ferrule is used to provide connectorization (e.g., connector 342), the optic fiber is ferrulized to the extent a ferrule is mounted at the end of the optical fiber. In other examples, the optical fiber can be processed in a lower cost manner by terminating the optical fiber with a reduced number of parts (e.g., only a ferrule, only a ferrule with a ferrule hub, etc.) such that the optical fiber is ferrulized without a full connector. For example, FIG. 5 shows a pre-connectorized and pre-tested optical fiber 341 that is part of a pre-ferrulized and pre-tested optical pigtail 340a. The optical pigtail 340a includes a ferrule 344 mounted at a pre-processed end 343 of the optical fiber. Thus, the ferrule 344 provides connectorization of the pre-processed end 343 of the optical fiber 341. FIG. 6 shows a pre-connectorized and pre-tested optical fiber 341 that is part of a pre-ferrulized and pre-tested optical pigtail 340b. The optical pigtail 340b includes a ferrule assembly including a ferrule 344 mounted at a pre-processed end 343 of the optical fiber 341, and a ferrule hub 345 mounted at a proximal end of the ferrule 344. The ferrule assembly provides connectorization of the pre-processed 343 of the optical fiber 341. The ferrule hub 345 can function as a spring stop and can be used to rotationally align the ferrule 344 with respect to a connector body in which the ferrule can be mounted.

In examples where bare fiber connection technology is used, the end of the fiber may be pre-processed by polishing and optionally shaping the end of the optical fiber without the use of a ferrule prior to routing the optical fiber on the substrate. FIG. 7 shows a pre-processed and pre-tested optical fiber 341 having a pre-processed end 343 that is not supported by a ferrule and is suitable for use in bare-fiber optical connection systems. As shown at FIG. 7A, the optical fiber 341 includes a core 347 and a cladding layer 349 surrounding the core. As shown at FIG. 7A, the pre-processed end 343 has been pre-shaped by means such as polishing, laser processing and/or plasma discharge treatment. The pre-processed end 343 of the pre-processed optical fiber 341 of FIG. 7 can be configured to fit within a bare fiber alignment device to be optically coupled to another bare optical fiber. Optionally, a connector body can be mounted on the pre-processed optical fiber to position and protect the pre-processed bare fiber end. Example bare fiber connection systems are disclosed by PCT International Publication Nos. WO 2012/112344; WO 2013/117598; WO 2016/043922; WO 2017/081306; and WO 2018/144128.

FIG. 8 depicts an example system 350 in accordance with the principles of the present disclosure for manufacturing optical circuit layouts using optical fibers that are pre-processed and pre-tested before the optical fibers are routed on a substrate. The system 350 includes an electronic controller 352 that includes one or more processors having logic circuitry capable of accessing data from digital memory, responding to and processing instructions from memory, and performing operations dictated by stored data. The controller 352 can access information such as digital data from memory 354 and can use such information to control operation and movement of a robotic device 356 configured for laying pre-processed optical fibers 341 onto a substrate. The controller 352 accesses the digital map 324 from memory 354 and uses the digital data from the digital map 324 to control movement of the robotic device 352 such that the robotic device 352 lays the pre-processed and pre-tested optical fibers 341 on the substrate along the fiber routing paths 327 defined by the digital map 324. The pre-processed ends 343 of the pre-processed optical fibers are located at the second locations 330 of the routing paths 327 defined by the digital map 324 (i.e., the routing path termination locations 325) and opposite ends of the optical fibers 341 are located at the first locations 329 defined by the digital map 324. Thus, the pre-processed optical fibers 341 are arranged in with the pre-processed ends 343 arranged in the multi-dimensional layout defined by the digital map 324 (see FIG. 3) which corresponds to the multi-dimensional layout of the connection locations 322 of the optical connection device 320 of FIG. 1. Adjacent the first locations 329, the optical fibers 341 are routed directly next to one another in a parallel, ribbon-like configuration.

The substrate can include a first substrate 360 and a second substrate 362 (e.g., a carrier). The first substrate 360 can be mounted on the second substrate 362 and each of the substrates 360, 362 can include a flexible, sheet-like layer (e.g., foil, Mylar, film, polymeric layer, etc.). The substrates 360, 362 can also include an adhesive layer supported on the sheet-like layer for tacking (e.g., adhesively securing) the optical fibers 341 to the substrates 360, 362 as the optical fibers 341 are routed by the robotic device 356 along the routing paths 327 across the substrates 360, 362. The adhesive layer of the second substrate 362 can also function to secure the first substrate 360 to the second substrate, but the first substrate 360 is preferably removable (e.g., pealable) from the second substrate 362. As shown at FIG. 8, the routing paths 327 extend across both of the substrates 360, 362 such that first portions 341a of the optical fibers 341 are routed on the first substrate 360 and second portions 431b are routed on the second substrate 362. The first portions 341a include the first locations 329 and the second portions 341b include the second locations 330.

After the optical fibers 341 have been routed on the substrates 360, 362, an adhesive coating can be applied over the fibers 341 along the routing paths 327. The adhesive coating can function to more securely bond the first portions 341a of the optical fibers 341 to the first substrate 360 and to secure at least a section of the ribbon-like configuration of the second portions 341b together to form a fiber ribbon section. Thereafter, the first substrate 360 can be removed from the second substrate 362 and the second portions 341b can be removed from the second substrate 362. The first portions 341a of the optical fibers 341 are secured to the first substrate 360 and form fixed routing portions of the optical fibers 341. The second portions 341b are not secured to a substrate and form routable portions of the optical fibers 341. Once removed from the second substrate 362, the first substrate 360 can be installed in an optical connection device with the first portions 341a provided pre-routed sectional of optical fibers and with the second portions 341b being routable after installation in the optical connection device. For example, the second portions 341b can be routed to a splice location for splicing the ribbonized ends of the second portions 341b to ribbonized fibers of a fiber optic cable. The pre-processed ends 343 of the optical fibers 341 can be staged for alignment and coupling with optical connection locations of the optical connection device (e.g., the connection locations 322 of the device 320).

The first substrate 360 defines openings 371 corresponding to each of the rows of routing path termination locations 325. The first substrate 360 includes fingers 373 (e.g., tabs, projections, etc.) that project into the openings 371 at each of the routing path termination locations 325. The fingers 373 include free ends 375 and base ends 376. The base ends 376 are connected (e.g., unitary with) a main body 377 of the first substrate 360. The fingers 373 are configured to flex relative to the main body 377 in the z-direction (e.g., along the z-axis). The first portions 341a extend across lengths of the fingers 373 from the base ends 376 toward the free ends 375. Preferably, the first portions 341a of the fibers 341 extend past (e.g., over-hang) the free ends 375 of the fingers 373 such that the pre-processed end portions 343 of the optical fibers 341 coincide with the openings 371. The flexibility of the fingers 373 allows the end portions 343 to be moved in the z-direction relative to the main body 377 of the substrate 360 to allow the end portions to be inserted into an optical connection location (e.g., one of the optical connection locations 322) when the substrate 360 is installed in an optical connection device such as the optical connection device 320. The fingers 373 also allow adjustment of the routing paths 327 in the z-dimension to accommodate optical connection locations arranged in a three-dimensional configuration.

Fiber management arrangements including optical circuit layouts in accordance with the principles of the present disclosure can be incorporated in telecommunications enclosures having predefined multi-dimensional arrangements of connection locations which may be arranged in an array such as a multi-row array. One example type of telecommunication enclosure includes a multi-service terminal (MST). An MST is an enclosure that is commonly installed near the outer edge of a fiber optic network to provide optical connection locations for connecting subscribers to the fiber optic network. A typical MST is an enclosure having a plurality of hardened fiber optic adapter ports that are accessible from outside the enclosure. The hardened fiber optic adapter ports are often arranged in an array and are adapted to receive hardened fiber optic connectors terminating the ends of drop cables. A drop cable is typically routed from a port of an MST to a subscriber location. For example, the drop cable can be routed from the MST to an optical network terminal (ONT) at the subscriber location such that service is provided to the ONT via an optical line coupled to the fiber optic network.

Figure 9:
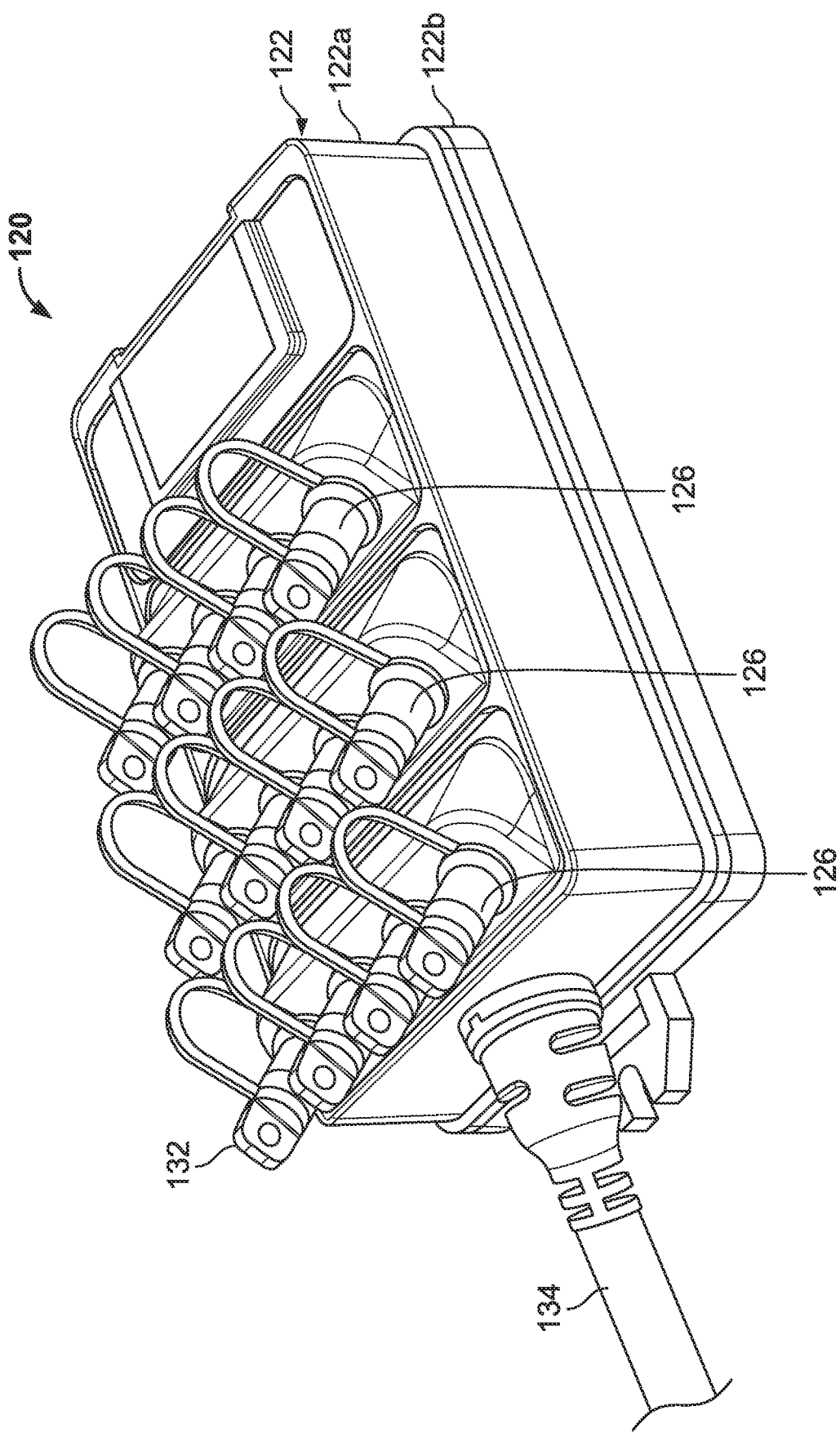
FIG. 9 depicts an example multi-service terminal (MST) into which optical circuit layouts in accordance with the principles of the present disclosure can be incorporated.

FIG. 9 depicts an example MST 120 in which an optical circuit layout in accordance with the principles of the present disclosure can be used to provide fiber management and to simplify assembly operations. The MST 120 includes a housing 122 that is preferably environmentally sealed. A plurality of fiber optic connection locations defined by hardened fiber optic adapters 126 (see FIG. 10) are carried with the housing 122. Each of the hardened fiber optic adapters 126 includes a hardened outer port 128 accessible from outside the housing 122, and a non-hardened inner port 130 accessible from inside the interior of the housing 122. In some examples, the outer ports 128 can be unitarily integrated in a wall of the housing, but in the depicted example the outer ports 128 are defined by separate adapter parts mounted within openings defined by the housing 122. The inner ports 130 are arranged in a multi-dimensional arrangement including a multi-row array of the connector ports 130. The hardened outer ports 128 can be closed by exterior plugs 132 when not in use. A fiber optic cable 134 is routed into the interior of the housing 122. The fiber optic cable 134 can include one or more optical fibers 135 (e.g., see FIGS. 17-20). The optical fibers from the cable can be coupled (e.g., spliced) to the optical fibers of a pre-routed optical circuit lay-out (e.g., the optical fibers 341 pre-arranged on the first substrate 360). Pre-processed ends (e.g., connectorized or ferrulized ends) of the optical fibers of the pre-routed circuit layout can register with the inner ports 130 to facilitate inserting the pre-processed ends into the inner ports 130. In other examples, the cable 134 may include one or more optical fibers that couple to the input of an optical component such as a passive optical splitter or wavelength division multi-plexer having outputs that optically couple to the optical fibers of the pre-arranged optical circuit lay-out.

Figure 10:
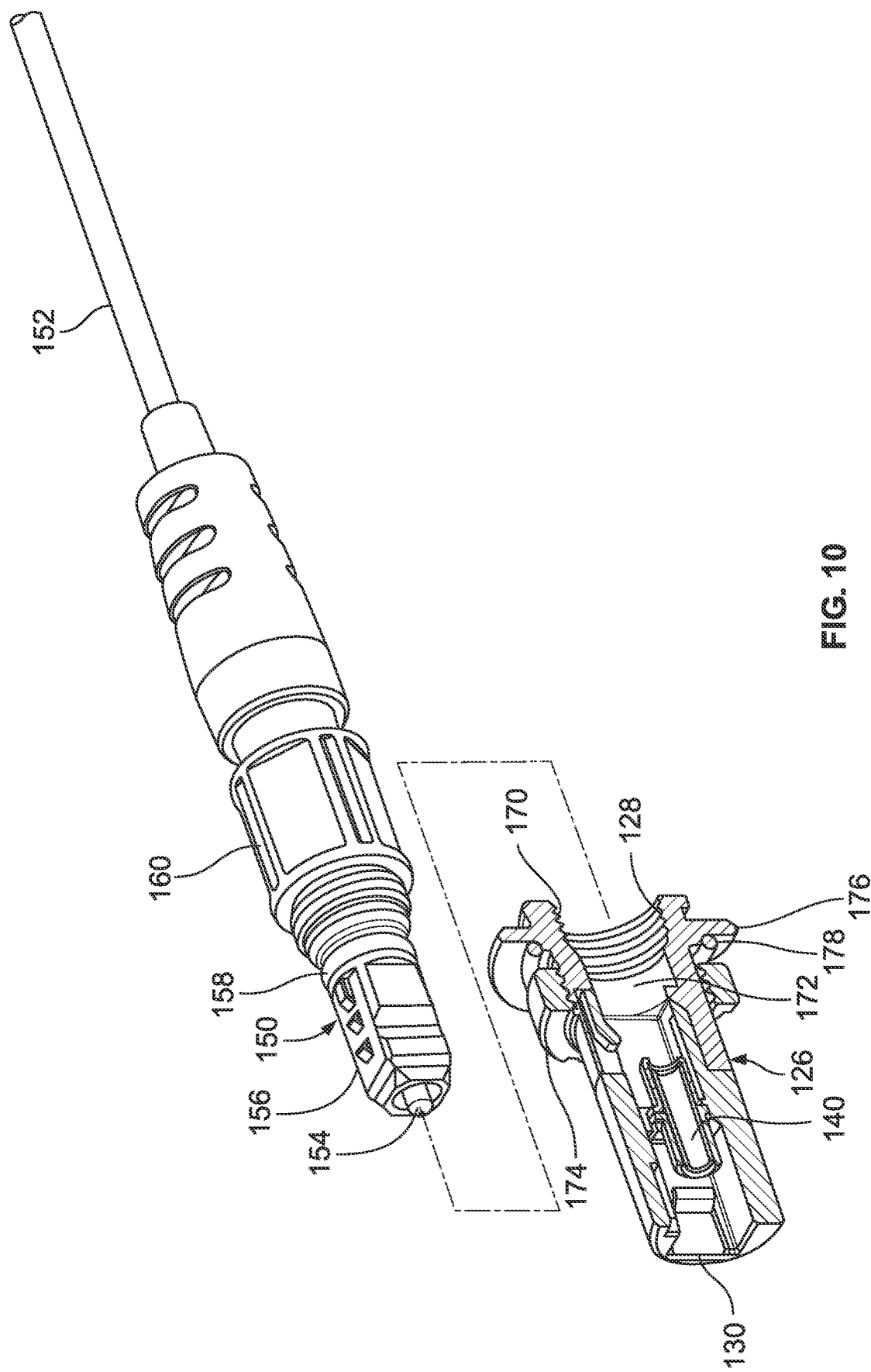
FIG. 10 depicts an example hardened fiber optic adapter that can be used to define optical connection locations of the MST of FIG. 9, a hardened fiber optic connector configured to mate with a hardened port of the hardened fiber optic adapter is also depicted.

As shown at FIG. 10, each of the hardened fiber optic adapters 126 includes a ferrule alignment sleeve 140 for receiving and aligning the ferrules of two fiber optic connectors desired to be coupled together (e.g., the ferrule of connector 415 and the ferrule of connector 150). It will be appreciated that the ferrules support the ends of optical fibers that are coaxially aligned when the ferrules of the connectors are aligned within the ferrule alignment sleeve 140. An example MST is described in U.S. Pat. No. 7,512,304, which is hereby incorporated by reference in its entirety.

FIG. 10 also depicts an example hardened fiber optic connector 150 adapted to mate with one of the hardened outer ports 128 of the MST 128. The hardened fiber optic connector 150 is depicted coupled to a drop cable 152. The hardened fiber optic connector 150 includes a ferrule 154 for supporting the end of an optical fiber of the drop cable 152. The ferrule 154 is mounted at the end of a connector body 156 adapted to be received within one of the hardened outer ports 128 of the hardened fiber optic adapters 126. In certain examples, the hardened fiber optic connector 150 includes an environmental seal 158 and a turn-to-secure fastener 160. In the depicted example, the turn-to-secure fastener 160 includes threads, but alternatively could include a bayonet connection interface or another interface that interlocks by a turning action. In other examples, a slide interlock can be used. The hardened port 128 includes internal threads 170 and a sealing surface 172. Further details of the fiber optic connector 150 are provided in U.S. Pat. No. 7,744,288, which is hereby incorporated by reference in its entirety.

When the hardened fiber optical connector 150 is installed in the hardened port 128 of the fiber optic adapter 126, the ferrule 154 is received within the ferrule alignment sleeve 140, the environmental seal 158 seal against the sealing surface 172, and external threads of the turn-to-secure fastener 160 engage with the internal threads 170 of the fiber optic adapter 126 to retain the hardened fiber optic connector 150 within the hardened port 128. In certain examples, the fiber optic adapter 126 can be secured within an opening of an enclosure by a nut 174 with a wall of the enclosure being captured between the nut 174 and a flange 176. An environmental seal 178 can provide sealing between the flange 176 and the enclosure wall. In other examples, the hardened fiber optic connector can be latched within the hardened port using a slide-lock or a flexible latch.

It will be appreciated that the MST 120 can be readily used to interconnect subscribers to a fiber optic network. Each of the hardened fiber optic adapters 126 represents a connection port for coupling a subscriber to the network. To connect a subscriber to the network, the plug 132 of one of the hardened fiber optic adapters 126 is removed to expose the hardened outer port 128. A fiber optic drop cable connectorized by a hardened fiber optic connection is then coupled to the network by inserting the hardened fiber optic connector into the hardened outer port 128. Upon installation of the hardened fiber optic connector in the hardened outer port 128, a fiber of the drop cable is optically connected to a corresponding optical fiber of the fiber optic cable 134. For example, the hardened optical connector installed within the hardened outer port 128 connects with a corresponding non-hardened fiber optic connector (e.g., connector 415) installed within the inner port 130 of the hardened fiber optic adapter to couple the drop line to the network.

Figure 11:
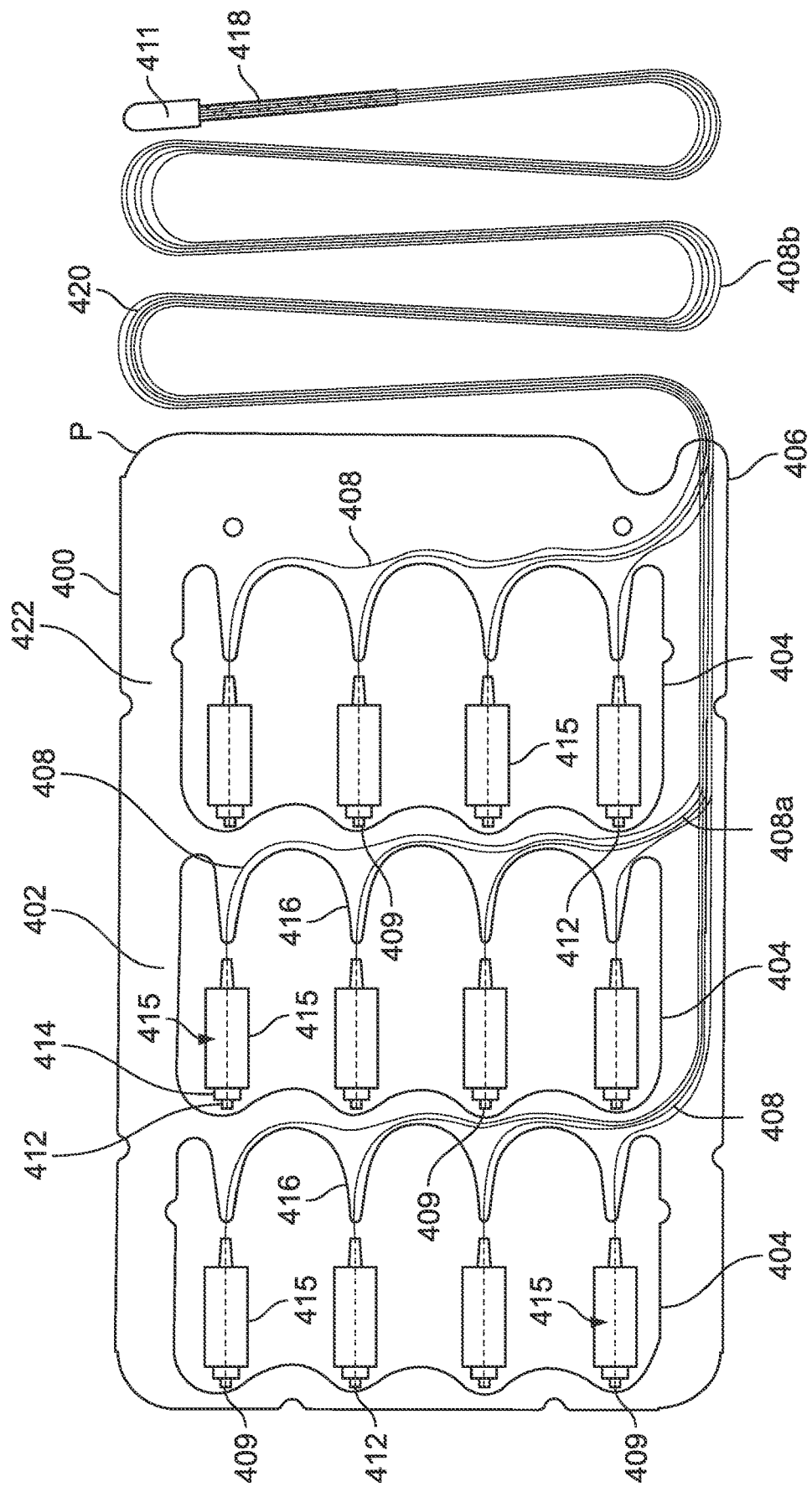
FIG. 11 depicts an example fiber management arrangement including an optical circuit layout that can be integrated in an enclosure such as the MST of FIG. 9.
Figure 12:
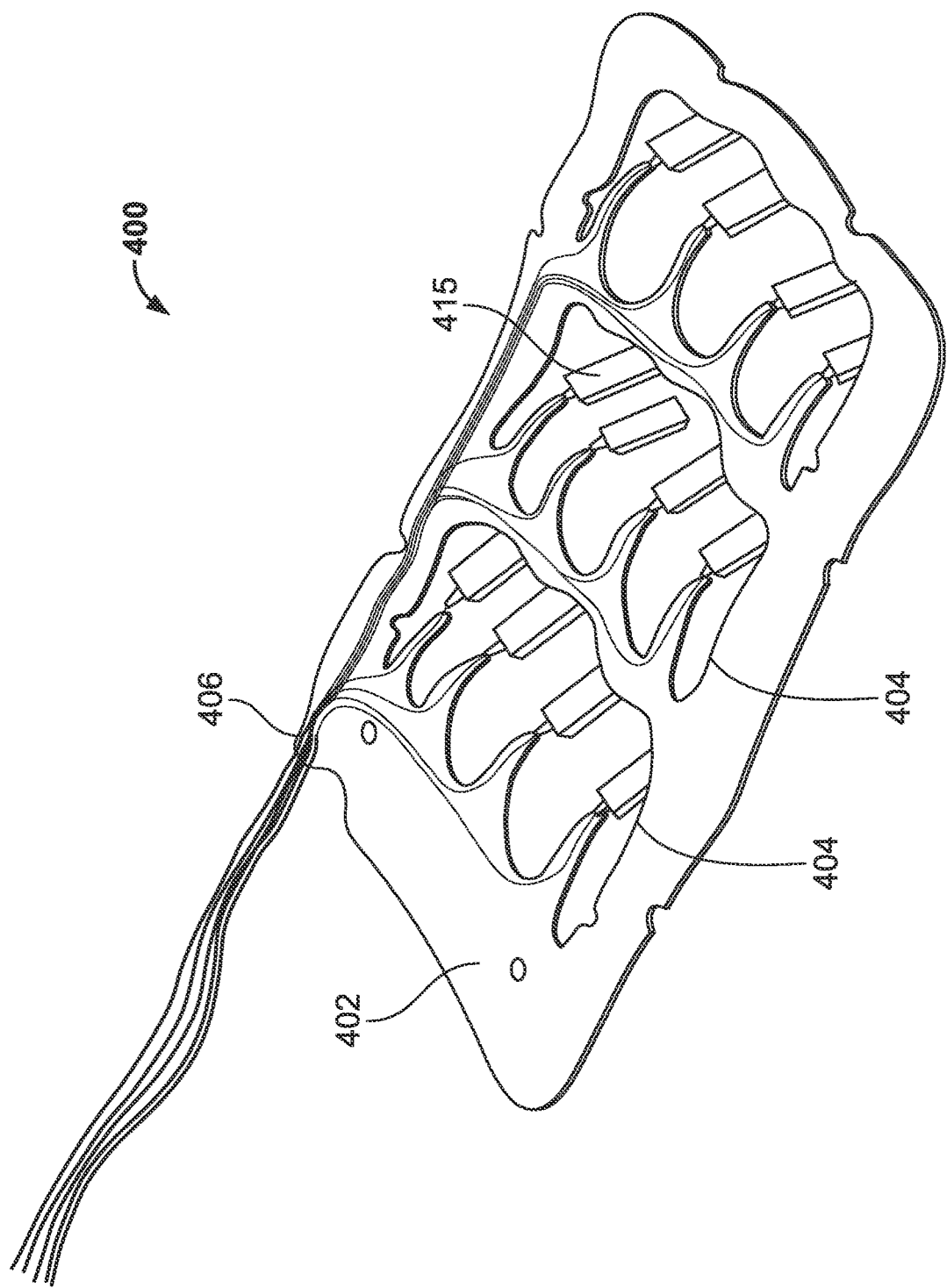
FIG. 12 is another view of the substrate of the fiber management arrangement of FIG. 11.
Figure 13:
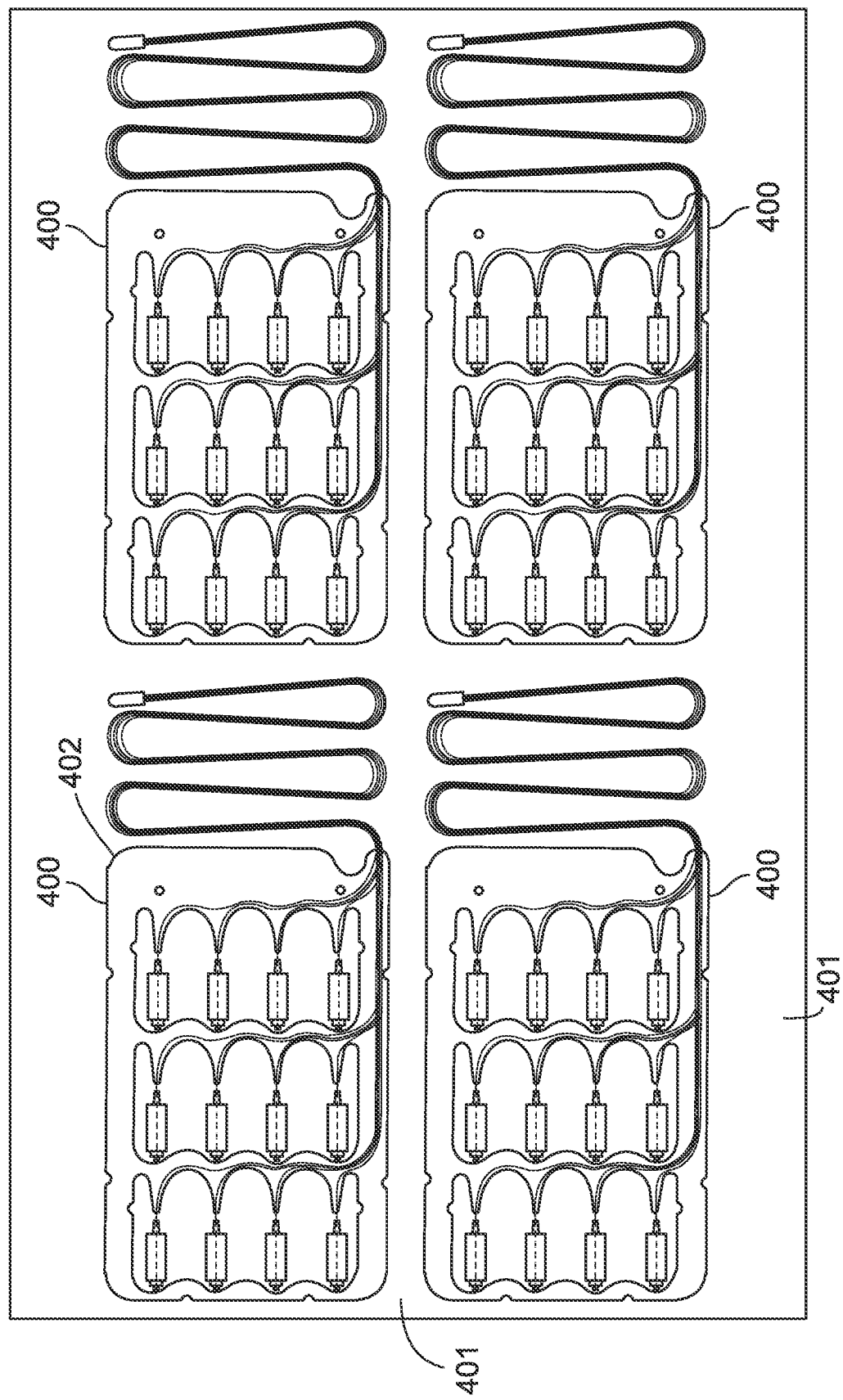
FIG. 13 shows a plurality of the fiber management arrangements of FIG. 11 supported on a carrier.

FIGS. 11 and 12 depict a telecommunication apparatus 400 having a predefined fiber routing lay-out in accordance with the principles of the present disclosure which is adapted for providing fiber management with respect to an optical connection device such as the MST 120 of FIG. 9. FIG. 13 shows a plurality of the apparatus 400 supported on the same carrier 401 during manufacturing. The telecommunication apparatus 400 includes a substrate sheet 402 having a flexible construction. The substrate sheet 402 defines a plurality of sheet openings 404 and includes a fiber input/output location 406. The telecommunication apparatus 400 includes a plurality of pre-tested and pre-processed optical fibers 408 each included as part of a pre-connectorized fiber optic pigtail 410. The optical fibers 408 are routed onto the substrate sheet 402 at the fiber input/output location 406. The optical fibers 408 each include a first end 409 and an opposite second end 411. The first ends 409 are secured within single-fiber ferrules 412. The optical fibers 408 including fixed routing portions 408a extending on the substrate sheet 402 along routing paths extending between the input/output location 406 and the sheet openings 404. The fixed routing portions 408a are adhesively secured to the substrate sheet 402. The first ends 409 of the optical fibers 408 secured within the single-fiber ferrules 412 are positioned at the sheet openings 404. The optical fibers 408 also including routable-portions 408b that are not adhesively secured to the substrate 402 and that extend from the fiber input/output location 406 to the second ends 411.

In the depicted example, the single-fiber ferrules 412 are mounted within fiber-optic connector bodies 414 positioned at the sheet openings 404. In one example, the fiber optic connector bodies 414 are SC connector bodies. Thus, the single-fiber ferrules 414 are integrated as part of full fiber optic connectors 415 positioned at the sheet openings.

Referring to FIG. 11, the substrate sheet 402 includes a plurality of fingers 416 that project into the sheet openings 404. The fixed routing portions 408a of the optical fibers 408 extend along lengths of the fingers 416 and the fiber optic connectors 415 are located adjacent free ends of the fingers 416. The optical fibers 408 can include buffered portions that extend between the free ends of the fingers 416 and the fiber optic connectors 415. The buffered portions can include sections of the optical fibers 408 that include tight polymeric buffer coatings (e.g., a 900 micron coatings) or that are upjacketed or otherwise covered with a semi-tight or loose buffer tubes. In other examples, the fingers 416 extend into or attach to the fiber optic connectors 415.

Referring again to FIG. 11, the optical fibers 408 are ribbonized at a ribbonized fiber region 418 adjacent the second ends 411 of the optical fibers 408. The optical fibers 408 are loose at a loose fiber region 420 located between the ribbonized fiber region 418 and the input/output location 406. The substrate sheet 402 includes a perimeter routing portion 422 that defines and extends about a perimeter P of the substrate sheet 402. The perimeter routing portion 422 forms a continuous loop that surrounds the sheet openings 404. The perimeter routing portion 422 includes a band of substrate material that extends about the continuous loop.

Figure 14:
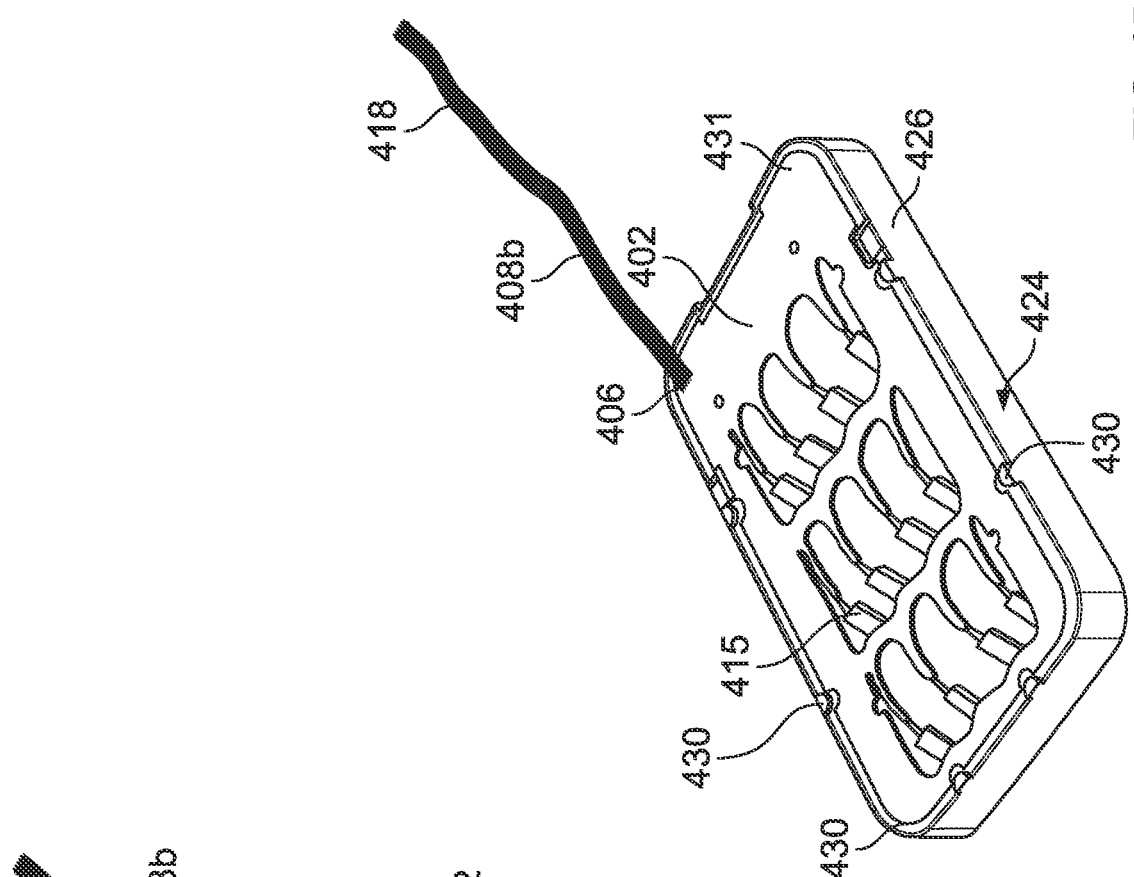
FIG. 14 is an exploded view including the fiber management arrangement of FIG. 11 and a tray for supporting the fiber management arrangement.
Figure 15:
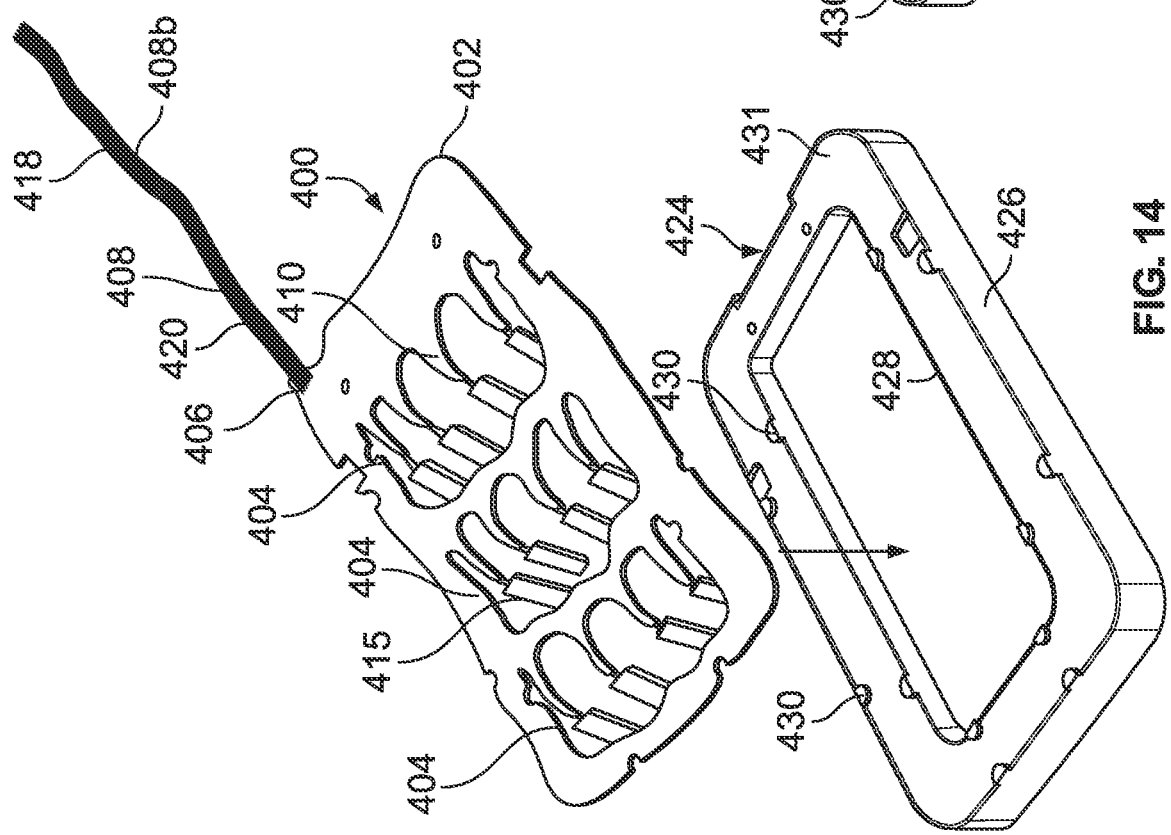
FIG. 15 depicts the fiber management arrangement of FIG. 11 secured to the tray of FIG. 14.
Figure 16:
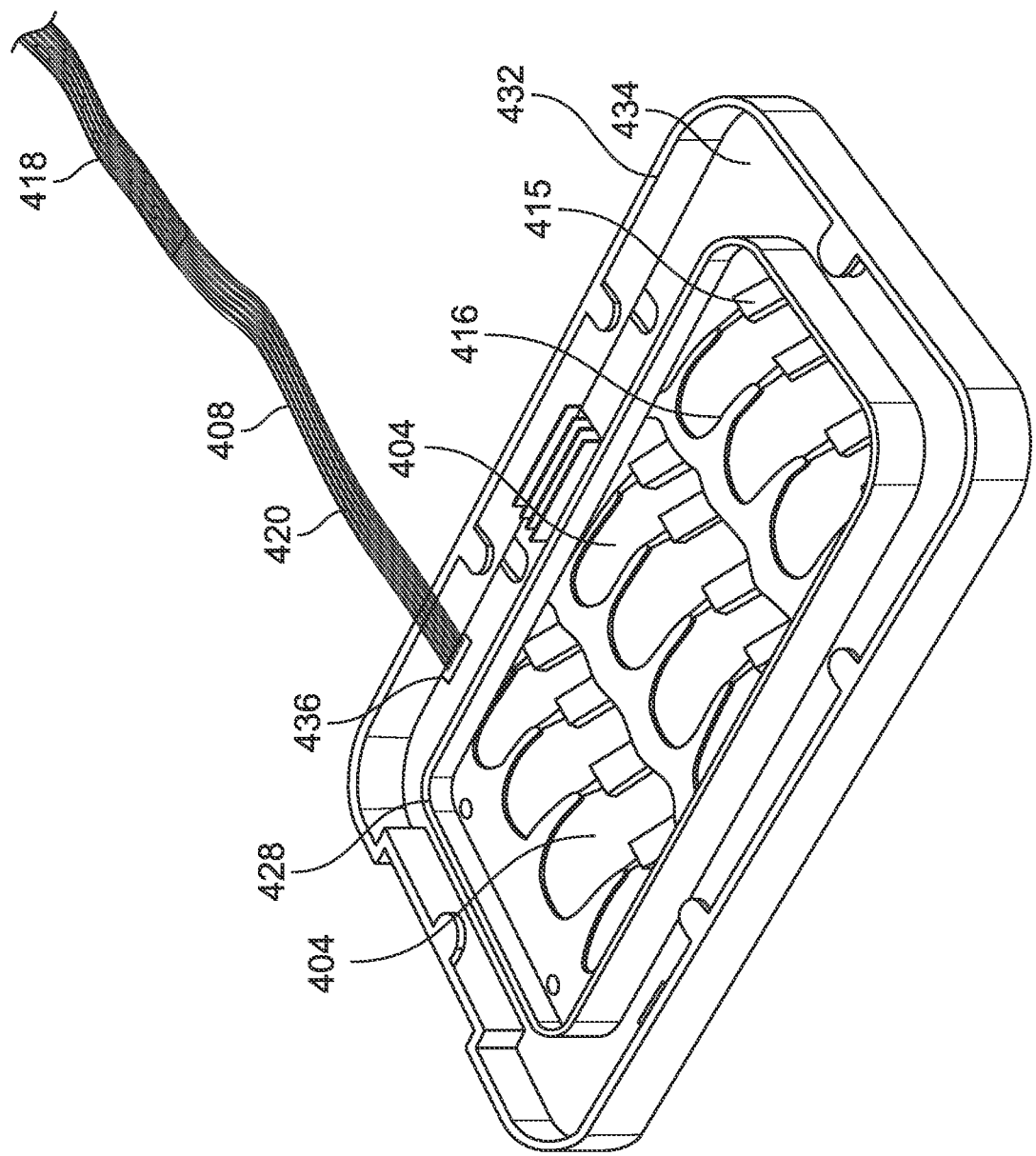
FIG. 16 is another view depicting the fiber management arrangement of FIG. 11 secured to the tray of FIG. 14.
Figure 17:
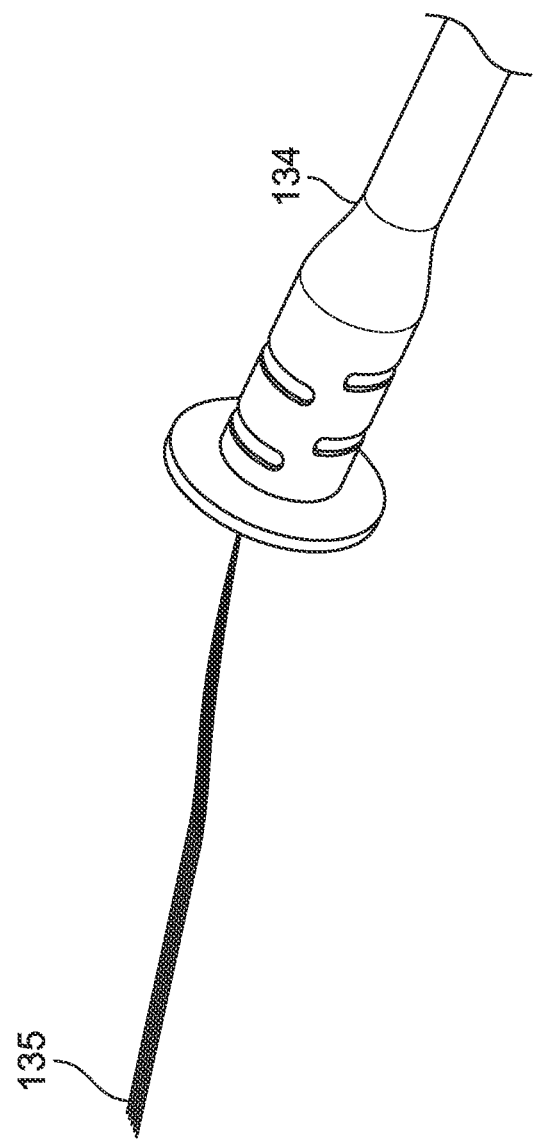
FIG. 17 depicts an input cable suitable for use with an enclosure such as the MST of FIG. 9; the input cable includes a plurality of optical fibers that are ribbonized at least at an end section of the optical fibers.
Figure 18:
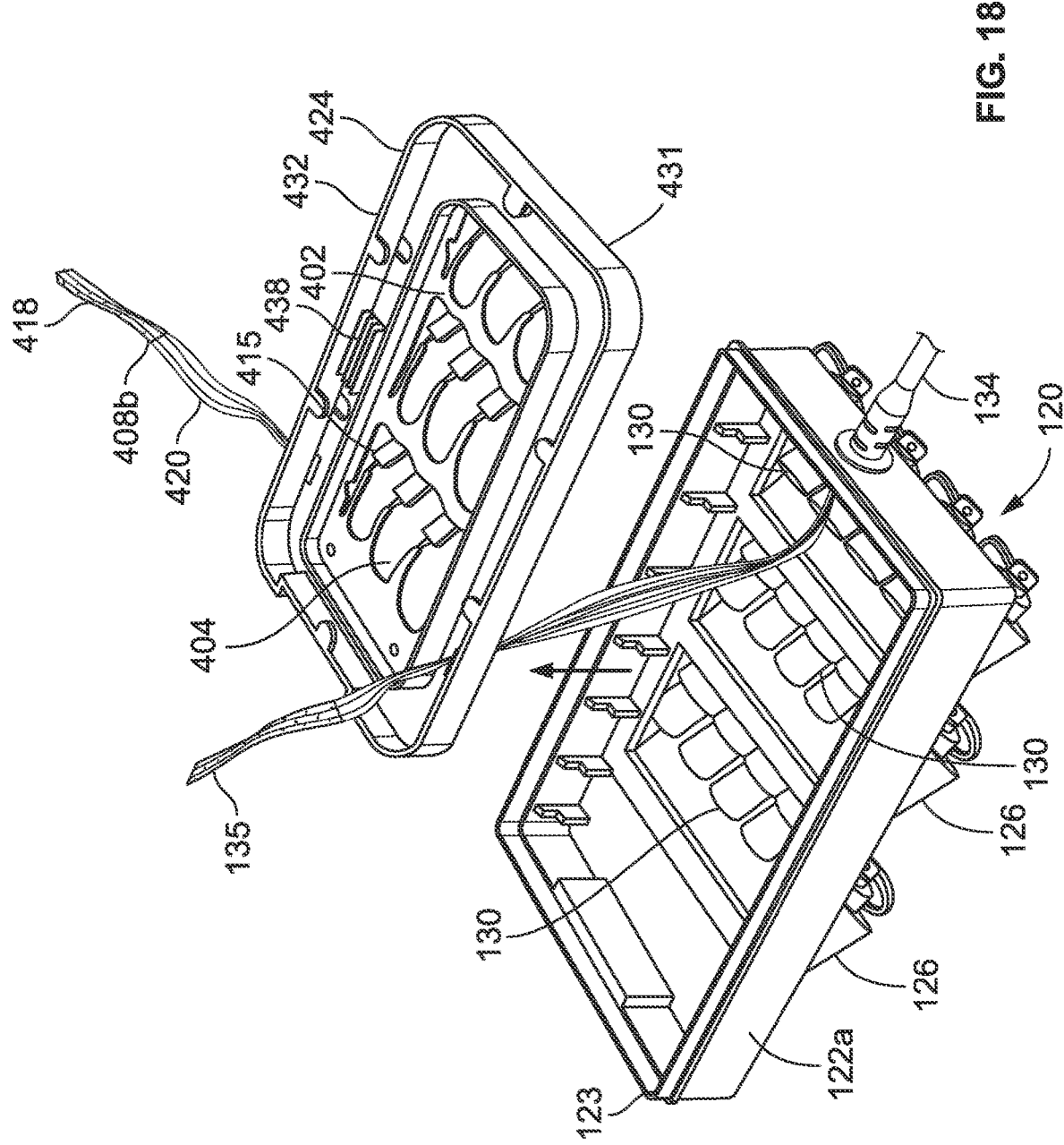
FIG. 18 is a diagrammatic view showing the input cable of FIG. 17 coupled to the MST of FIG. 9, and also showing the fiber management and tray arrangement of FIG. 16 in the process of being installed in the MST.
Figure 19:
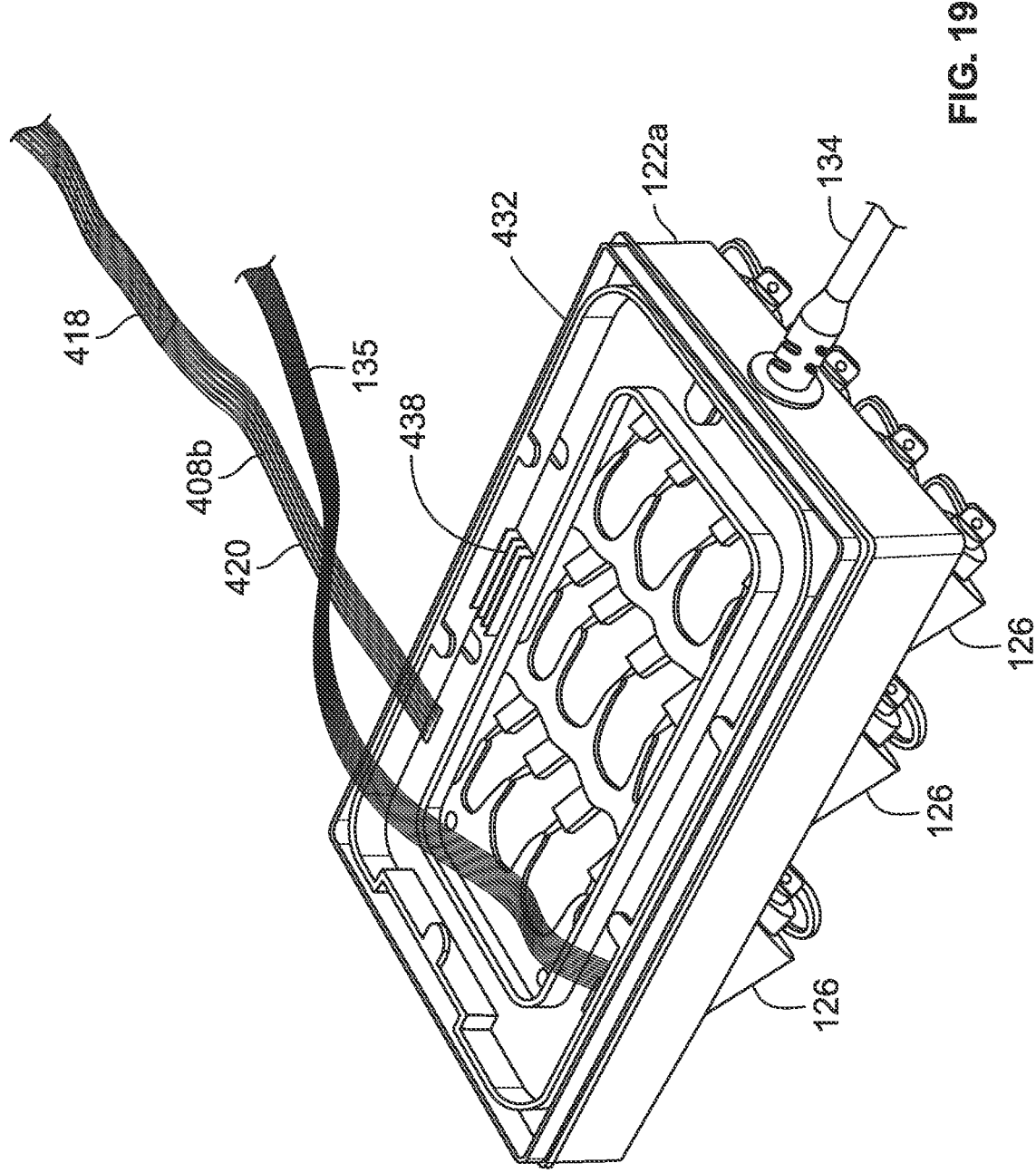
FIG. 19 is a diagrammatic view showing the fiber management tray arrangement of FIG. 16 loaded into the MST of FIG. 9.
Figure 20:
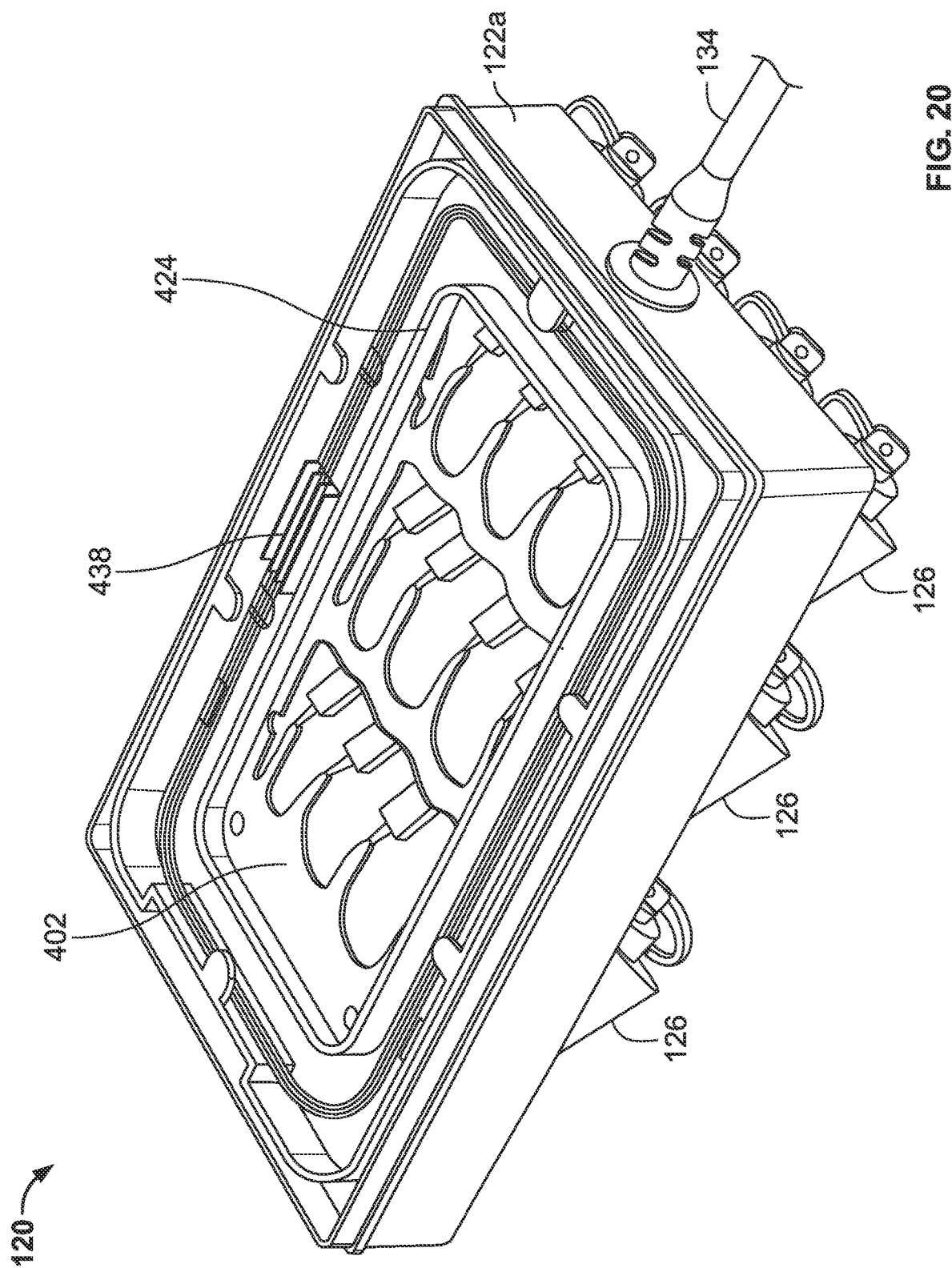
FIG. 20 is a diagrammatic view showing the fiber management and tray arrangement of FIG. 16 loaded into the MST of FIG. 9 with the optical fibers of the input cable optically spliced to the optical fibers managed by the fiber management arrangement.

Referring to FIGS. 14-16, the substrate sheet 402 can be is secured to a tray 424 (e.g., a molded plastic tray) prior to installation of the telecommunication apparatus 400 in the housing of the MST 120. The tray 424 includes a perimeter frame 426 that defines and extends around a central tray opening 428 of the tray 424. As shown at FIGS. 15 and 16, the substrate sheet 402 is secured to the perimeter frame 426 with the sheet openings 404 coextensive with the central tray opening 428. The substrate sheet 402 can be adhesively bonded to the perimeter frame 426, or can be attached to the perimeter frame 426 mechanically by fastener such as retention tabs 430.

The tray 424 includes first and second opposite sides 431, 432 (side 431 is shown at FIGS. 14 and 15 and side 432 is shown at FIG. 16). The substrate sheet 402 is secured to the frame 426 at the first side 431 of the tray 424. The frame 426 defines a channel 434 about the central frame opening 428 at the second side 432 of the tray 424. The routable-portions 408b of the optical fibers 408 are routed in the channel 434 and can be routed from the first side 431 to the second side 432 of the tray 424 through one or more openings 436 defined by the tray 424. The tray can include bend radius protection at the openings 436 for protecting the optical fibers 408 from over bending.

Once the telecommunication apparatus 400 has been secured to the tray 424, the tray 424 can be installed in the housing 122 of the MST 120. When installed in the housing 122, the first side 431 of the tray 424 faces toward the inner ports 130 of the fiber optic adapters 126 and the second side 432 of the tray 424 faces away from the fiber optic adapters 126. The connectors 415 at the ends of the fingers 416 are staged in a multi-dimensional configuration that corresponds to the multi-dimensional configuration of the inner adapter ports 130 of the fiber optic adapters 126. Thus, each of the connectors 415 is staged by the substrate 202 in alignment with a corresponding one of the inner adapter ports 130. Once the connectors 415 are staged in alignment with the inner adapter ports 130, the connectors can efficiently be installed in the inner adapter ports 130 by pushing the connectors 415 into the inner adapter ports 130. The fingers 416 are flexible and flex to allow the connectors 415 to be inserted into their corresponding inner adapter ports 130. The second ends 411 of the optical fibers 408 are spliced to ribbonized optical fibers 135 of the MST input cable 134 at a splice location 438 (e.g., a holder for holding a splice protection sleeve containing an optical splice) held within the channel 434 of the tray 424.

The housing 122 can include first and second housing pieces 122a, 122b that meet at a sealed interface 123 and that cooperate to define an interior of the housing 122 when mated together at the sealed interface. The fiber optic adapters 126 are mounted to the first housing piece 122a. The first side 431 of the tray 424 faces toward the first housing piece 122a and the second side 432 of the tray 424 faces toward the second housing piece 122b when the tray 424 is mounted in the housing 122.

Figure 21:
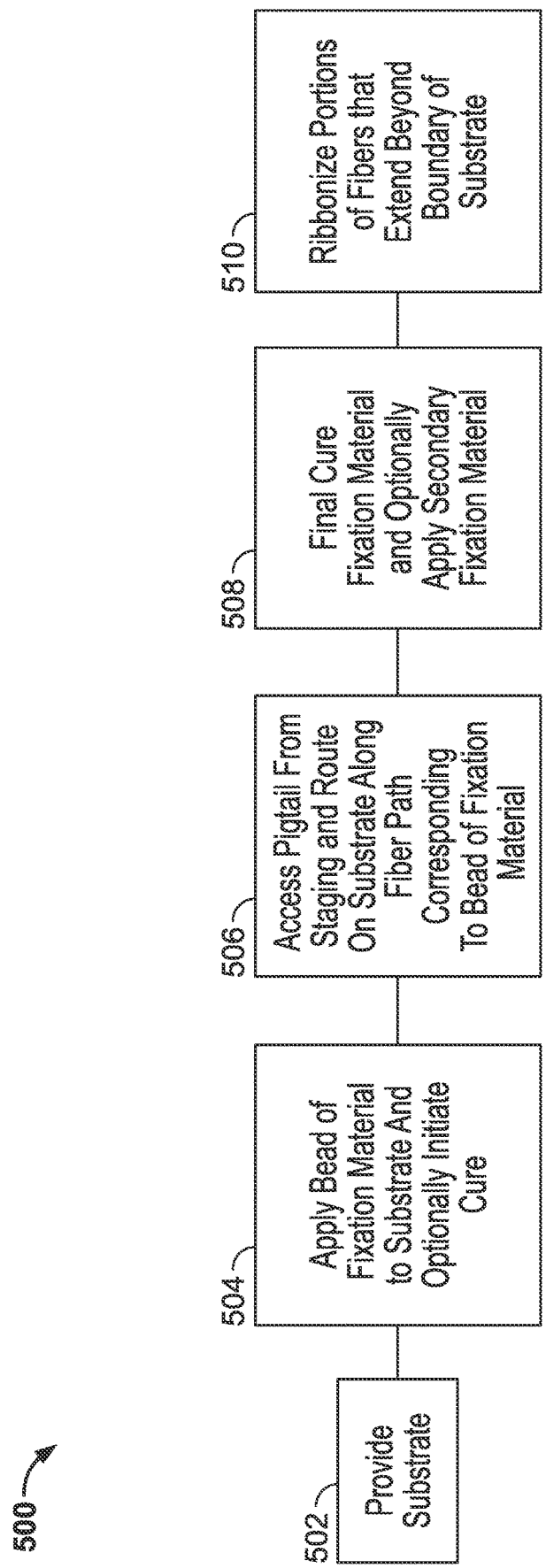
FIG. 21 outlines an example fiber routing method in accordance with the principles of the present disclosure.

FIG. 21 outlines an example method 500 in accordance with the principles of the present disclosure for manufacturing a telecommunications apparatus (e.g. a fiber management arrangement) having a predefined and pre-established fiber routing lay-out which is adapted for providing fiber management to an optical connection device. Example optical connection devices can include an MST such the MST 120 of FIG. 9, another type of enclosure, a panel, a tray, a drawer, a module or other type of device. It will be appreciated that the telecommunications apparatus can have a configuration similar to the telecommunications apparatus 400 and can include a plurality of optical fibers having pre-processed ends (e.g. a preconnectorized ends) that are routed along predefined routing paths. In certain examples, routing paths can be established by a digital map defining fiber routing paths and fiber routing path termination locations arranged in a multi-dimensional configuration that corresponds to (e.g., matches, complements, relates to) the multi-dimensional configuration of the optical connection locations of a given optical connection device.

At step 502 of the method 500, a substrate is provided. In certain examples, the substrate can include a single, flexible polymeric layer that does not include an adhesive layer. For example, the substrate can include a polymeric film having a single polymeric layer. In certain examples, the substrate can be pre-processed to include a desired exterior shape and to include predefined openings such as openings 371 which may correspond to routing path termination locations. In one example, a supply roll of polymeric film can be fed across a cutting location such as a laser cutting location which cuts the film to define substrates having predefined outer shapes and opening locations. Waste film can be collected at a waste take-up reel. In certain examples, the laser cutter can include a laser scanner having a laser cutting head that is robotically movable along two dimensions or three dimensions. Locations of the openings and the shape of the substrate can be predefined by a digital map that is accessed by the laser scanner to cut the pre-determined outer substrate shape and a predetermined pattern of openings into the film.

At step 504, an initial fixation material (e.g., an adhesive material such as an epoxy) can be applied to the pre-processed substrate to define a plurality of fiber routing paths. In one example, the fixation material can be applied as separate beads that are routed along the predetermined fiber routing paths. As previously discussed, the predetermined routing paths can be defined by a digital map. Additionally, an adhesive application device such as an injection head can be robotically controlled to move along two or three dimensions such that beads corresponding to multiple different optical fiber routing paths can be applied to the substrate. In certain examples, after application of the beads of fixation material, the beads of fixation material can be exposed to a curing environment (e.g., heat, radiation, ultraviolet light (UV) radiation from a UV lamp, etc.) to initiate curing of the fixation materials such that the fixation material becomes tacky or sticky.

Once the fixation material has been applied to the substrate and curing has been initiated, the process can proceed to method step 506 where optical pigtails are accessed from staging and are routed along the predefined fiber routing paths corresponding to the beads of partially cured fixation material. Once again, a robotic head can be used to apply the pigtails along the routing paths. The routing head can be robotically controlled and can access a digital map including data corresponding to the routing paths. In certain examples, routing head can include a roller or rollers for pressing the optical fibers of the pigtails against the pre-routed beads of fixation material corresponding to the predefined routing paths. It will be appreciated that the staged pigtails can be pre-packaged in a manner that allows the robotics to readily access the pigtails and efficiently route the pigtails along the predetermined routing paths. In a preferred example, staged pigtails each include a predefined length of optical fiber having a pre-processed end (e.g., a pre-connectorized end). In a preferred example, predefined lengths of optical fibers are packaged in a coiled configured and in certain examples, pigtail packaging can include holders for holding the optical connectors. Additionally, optical pigtail packaging can include structure for protecting the coiled optical fibers and for maintaining the optical fibers at given coil diameter.

Once the pigtails have been routed on the substrate, the method proceeds to step 508 where the beads of fixation material can be finally cured. Optionally a secondary fixation material can be applied over the pre-routed pigtails to provide enhanced securement of the pigtails along the routing paths.

In certain examples, first portions of the optical pigtails may be secured to the substrate, and second portions of the optical fibers may extend beyond an outer boundary of the substrate. It will be appreciated that the second portions of the optical fibers are not directly fixed to the substrate. In certain examples, the method can include processing the second portions of the optical fibers to ribbonize the second portions of the optical fibers (step 510). For example, the second portions of the optical fibers can be arranged in a linear array with respect to one another by a ribbonizing tool. In certain examples, the ribbonizing tool can clamp the fibers in a given array in which the optical fibers are arranged parallel to one another with a predetermined pitch between the center points of each of the optical fibers. Example pitch distances between optical fibers can include 200 microns and 250 microns. Once the ribbonizing tool has arranged the optical fibers in the array, a curable matrix material can be applied to the optical fibers and cured to secure the optical fibers together. In certain examples, matrix material can be conventional ribbonizing material that secures the optical fibers in a fixed planar array. In other examples, the optical fibers can be secured together via a rollable-ribbon configuration in which relative positioning (e.g., a sequence) of the optical fibers is established but that the optical fibers are movable relative to one another. Rollable ribbon configurations often provide intermittent connections between the optical fibers, utilize slits in the matrix material to allow the ribbon to be rolled, or use thin layers of matrix material sometimes at only one side of the group of aligned fibers. Examples of rollable ribbons are disclosed in U.S. Pat. Nos. 10,185,105; 9,880,368; 10,488, 609; 10,007,078; 9,995,896; 9,086,555; 10,416,403; 9,116, 321; 10,514,517; 9,989,723, 10,101,549, the disclosures of which are hereby incorporated herein by reference in their entirety. Examples of rollable ribbons also are disclosed in U.S. Publication No. 2020/0271879, the disclosure of which is hereby incorporated herein by reference in its entirety. Other examples of loose ribbons of fibers include the Freeform Ribbon™ produced by Sumitomo of Japan, rollable ribbons produced by OFS Furukawa of Norcross, GA, the SpiderWeb® Ribbon produced by AFL Telecommunications, LLC of Duncan, SC, and FlexRibbon™ of Prysmian Group of Italy.

Figure 22:
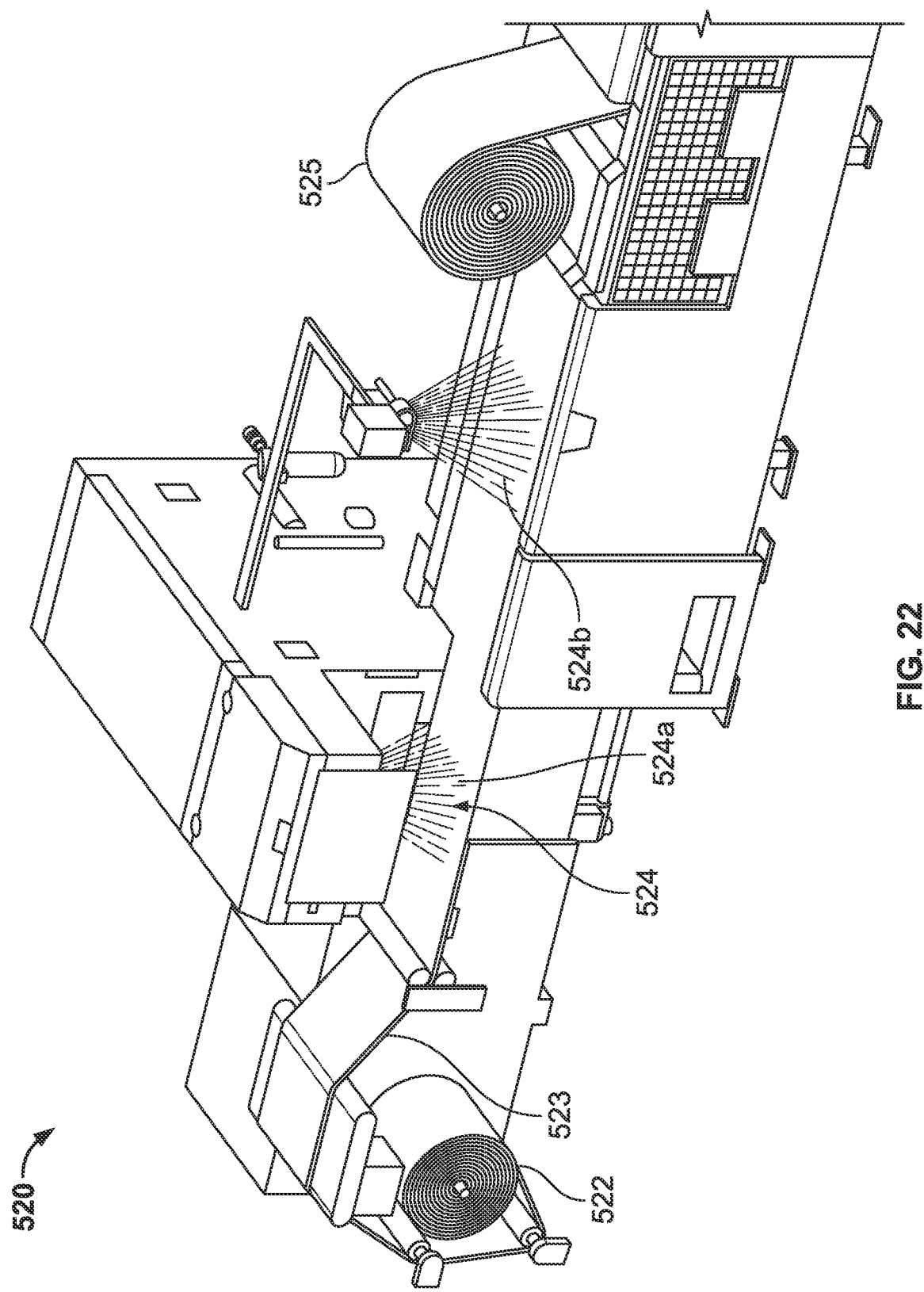
FIG. 22 depicts an example substrate preparation station (e.g., laser cutting station) for preparing flexible substrates for use in supporting optical pigtails routed thereon.

FIG. 22 depicts an example station 520 for manufacturing substrates suitable for use in practicing the method of FIG. 21. The station 520 includes a supply reel 522 for supplying a continuous length or web of plastic foil 523 (e.g., plastic sheeting, plastic film, etc.). The station 520 can include a cutting region 524 such as a laser cutting region at which the substrate can be cut from the web of substrate material and openings can be cut into the substrate. The substrate can then be removed from the system and the remainder of the web can be collected on a waste reel 525. It will be appreciated that laser cutting can take place at multiple locations 524a, 524b along the station 520 so that different cuts can be performed at different locations.

Figure 23:
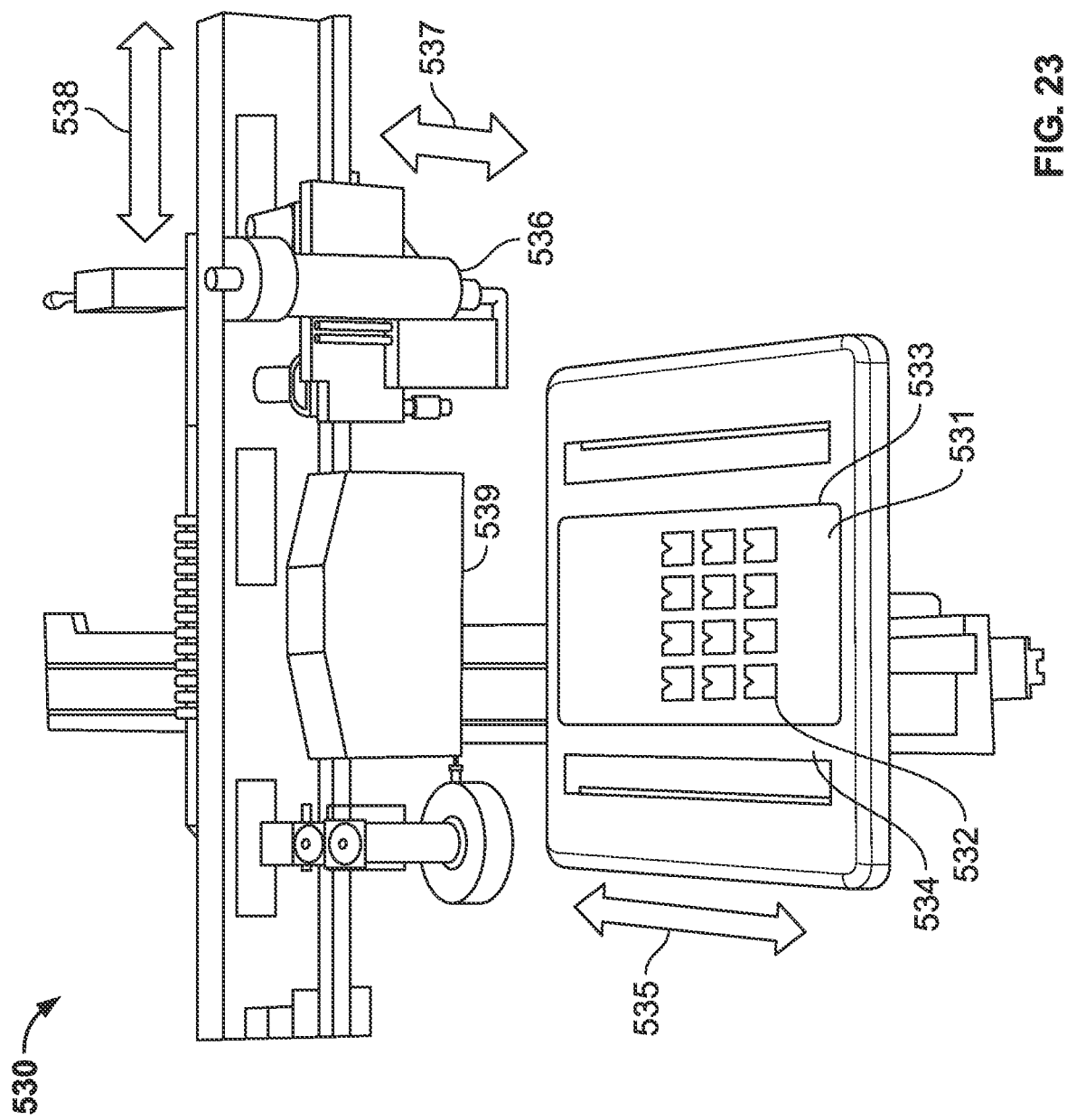
FIG. 23 depicts an example adhesive application station for applying beads of adhesive material to a substrate.
Figure 24:
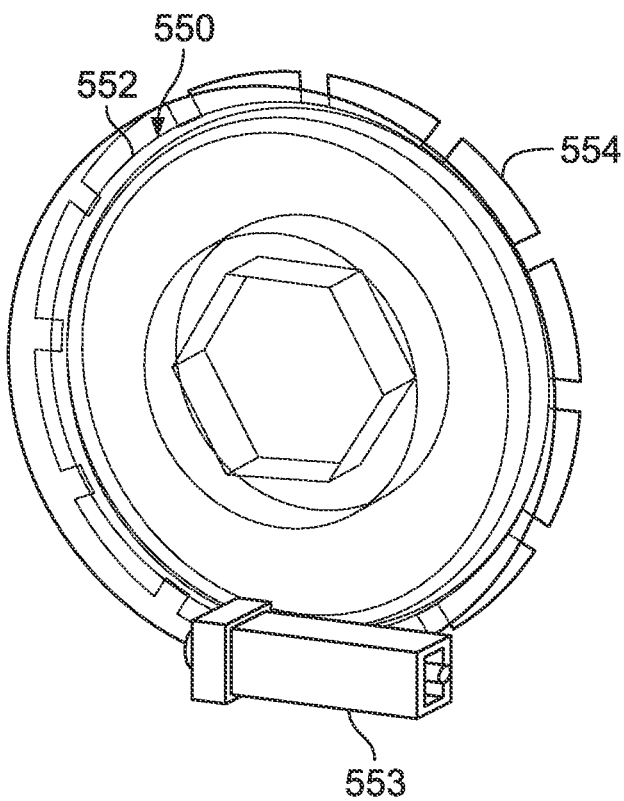
FIG. 24 depicts an example packaging arrangement for packaging a connectorized optical fiber.

FIG. 23 shows an example station 530 for applying the initial fixation material to a substrate. For example, as shown at FIG. 23, a substrate 531 having pre-cut openings 532 and a predefined outer shape 533 is supported on a platform or a table 534 that is movable along an x-axis 535. The station 530 also includes a fixation material application head 536 (e.g., a nozzle, a jet head, a jet printing head, a spray nozzle, etc.) that is movable along a y-axis 538 and along a z-axis 537. The x, y and z axes are all perpendicular with respect to one another in accordance with a Cartesian coordinate system. A fixation material curing device such as a UV lamp 539 is also provided at the station 530. In certain examples, the UV lamp 539 is movable along the y-axis 538 and/or the z-axis 537. It will be appreciated that the movement of the table 534, the application head 536 and the UV lamp 539 can be coordinated by a controller that accesses a digital map to control application of the beads of fixation material (e.g., UV curable adhesive material) on the substrate 531. Linear drives and linear guides can be used to move the components along the axes FIG. 24 depicts an example fiber optic pigtail 550 suitable for use with the method of FIG. 21. The pigtail 550 includes a length of optical fiber 552 and a fiber optic connector 553 terminated at one end of the length of optical fiber 552. In the depicted example, packaging 554 (e.g., a cartridge) is provided for maintaining the optical fiber 552 coiled in a circular loop and for maintaining bend radius requirements of the optical fiber 552. In certain examples, the packaging 554 can also include a holder for holding the fiber optic connector 553 at a mounting location on the packaging.

Figure 25:
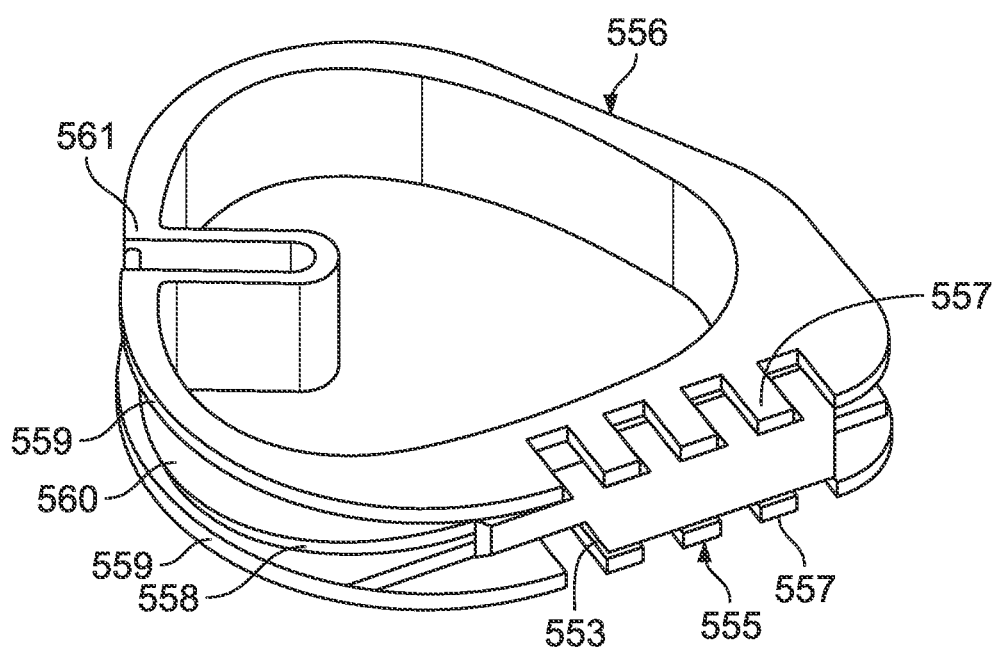
FIG. 25 depicts another example packaging arrangement for packaging a connectorized optical fiber.

FIG. 25 shows alternative packaging 556 including a holder 555 holding the fiber optic connector 553 for holding the fiber optic connector 553 at a defined connector mounting location on the packaging 556. In certain examples, the holder 555 can secure the fiber optic connector 553 to a remainder of the packaging frictionally, by a snap-fit connection, by a mechanical interlock, by a sliding interface or by other techniques. In one example, the holder 555 can include fingers 557 for gripping or otherwise securing the fiber optic connector 553 at the mounting location on the packaging 556. In certain examples, packaging 556 can include a spool 558 having flanges 559 defining a channel 560 in which the optical fiber 552 is coiled. In one example, the optical fiber 552 is coiled in a non-circular shape. In the depicted example, the packaging 556 includes at least one non-curved side (e.g., a flat side). Additionally, the packaging arrangement can include a fastening element 561 for allowing the packaging to be secured (e.g., frictionally secured, clipped, latched or otherwise retained) at a staging location of a device for accessing the pigtails and routing the pigtails on substrates. In certain examples, the optical fibers 552 of the pigtails can have a standardized length.

Figure 26:
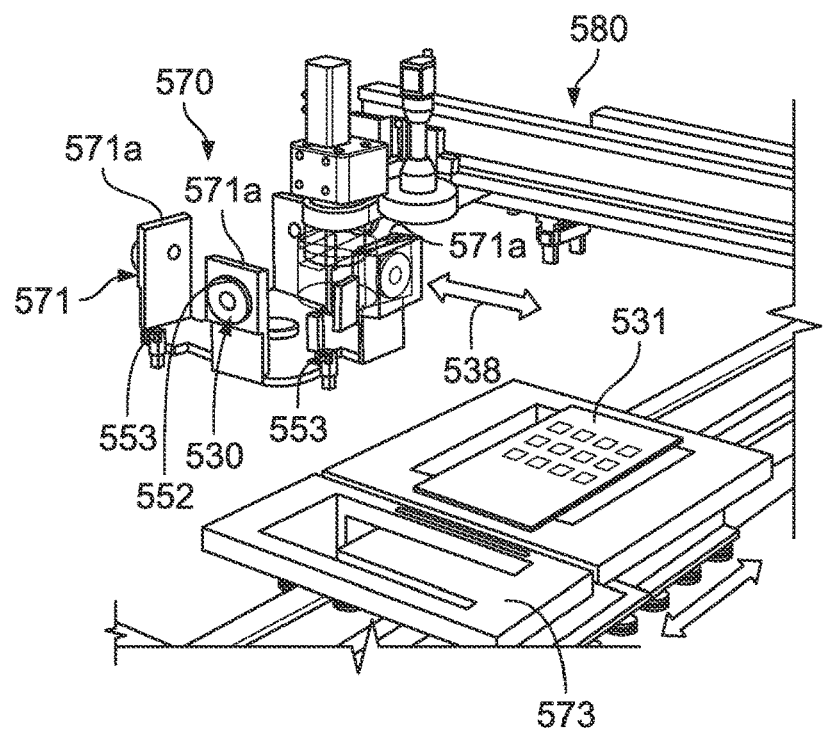
FIG. 26 depicts an example fiber routing apparatus in the process of receiving a packaged fiber optic pigtail from a staging location.
Figure 27:
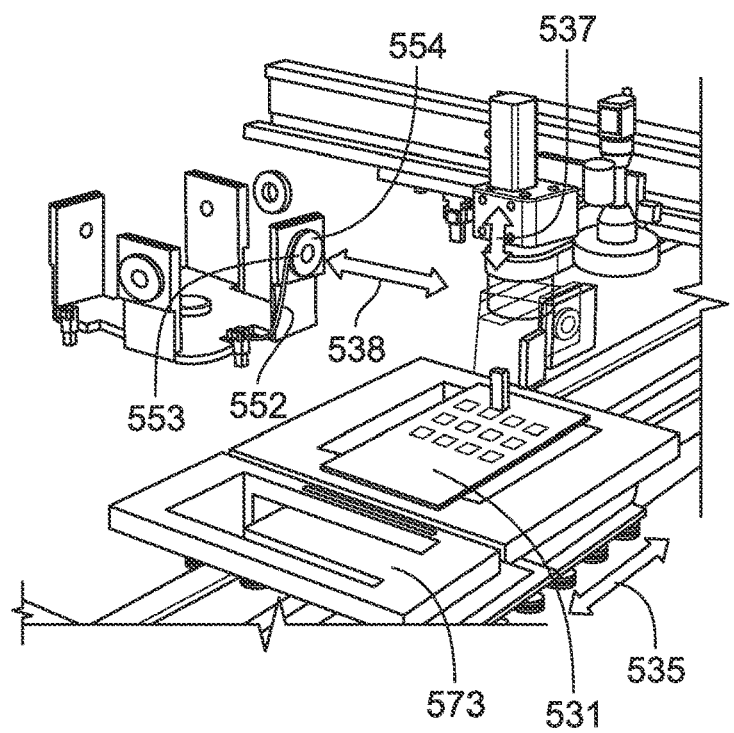
FIG. 27 depicts the fiber routing apparatus of FIG. 26 in the process of locating a connectorized end of the fiber optic pigtail at a pre-determined location on a substrate.
Figure 28:
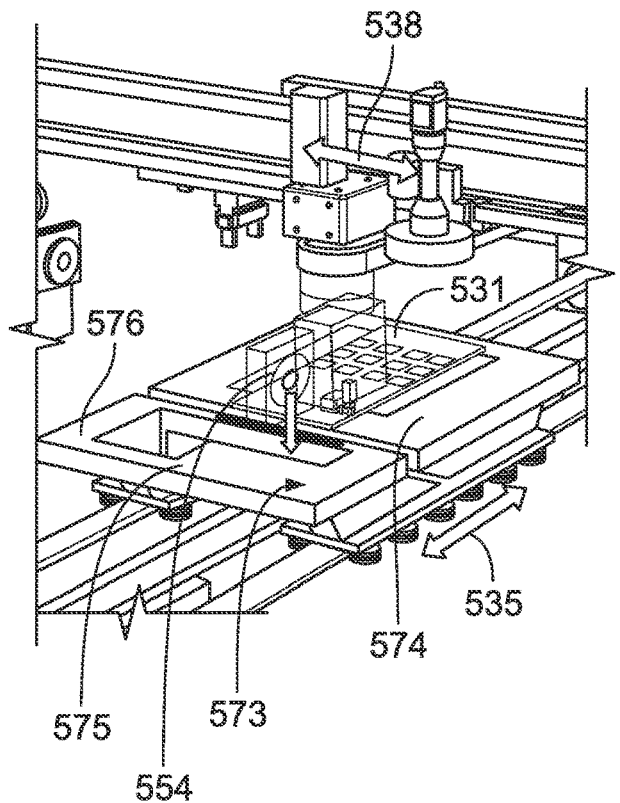
FIG. 28 depicts the fiber routing apparatus of FIG. 26 in the process of unloading the packaging for the fiber optic pigtail at a post routing packaging staging location.

FIGS. 26-28 depict an example staging apparatus 570 for staging the pre-packaged pigtails 550 and also depicts a fiberoptic pigtail routing apparatus 580 for accessing the packaged pigtails 550 from the staging area 570 for applying the pigtails to the pre-laid beads of fixation material applied to the substrate 531. In the depicted example of FIG. 26, the pigtail staging apparatus is configured as a carousal arrangement 571 and includes a plurality of pigtail packaging mounting locations 571a. It will be appreciated that the carousal arrangement 571 can have a load station for loading unused pigtail packaging onto the pigtail packaging mounting locations 571a of the carousal 571, and an unload station for allowing the pigtail packaging to be transferred from the pigtail packaging mounting locations 571a of the carousal arrangement 571 to the fiber routing apparatus 580. A post-routing staging location 573 can be provided for receiving the pigtail packaging after the pigtail has been routed on the substrate 531. In one example, during fiber routing the substrate 531 is supported on a platform 574 and the post-routing staging location includes a packaging receptacle 575 provided on a carrier 576 that is separate from the platform 574. In certain examples, the pigtail packaging can be mounted in a side-by-side configuration within the packaging receptacle 575. In certain examples, portions of the optical fibers 552 can remain coiled or otherwise managed by the packaging material when the packaging material is loaded onto the post-routing staging location. Thus, the optical fibers can extend from the substrate 531 on the platform 574 to the post-routing staging location 573 located off the platform 574. Thus, portions of the optical fibers not routed on the substrate and secured thereto can be positioned to extend outside an outer boundary of the substrate and can be staged for subsequent processing such as ribbonization.

FIG. 26 shows the pigtail routing apparatus 580 interfacing with the carousal arrangement 571 to receive packaging loaded with a connectorized pigtail. FIG. 27 shows the pigtail routing apparatus 580 in the process of positioning the connectorized end 553 of the fiber optic pigtail 550 on the substrate 531 prior to routing the optical fiber 551 along a corresponding adhesive bead that has been pre-applied on the substrate 531. FIG. 28 shows the pigtail packaging being positioned at the post routing staging location 573 after the optical fiber 551 has been routed along and secured to the adhesive bead on the substrate 531. The post routing staging location 573 is offset from the substate 531 such that portions of the optical fibers not routed on the substrate extend outside or beyond an outer boundary of the substrate 531 while continuing to be maintained (e.g., in a coil) by the packaging.

Figure 29:
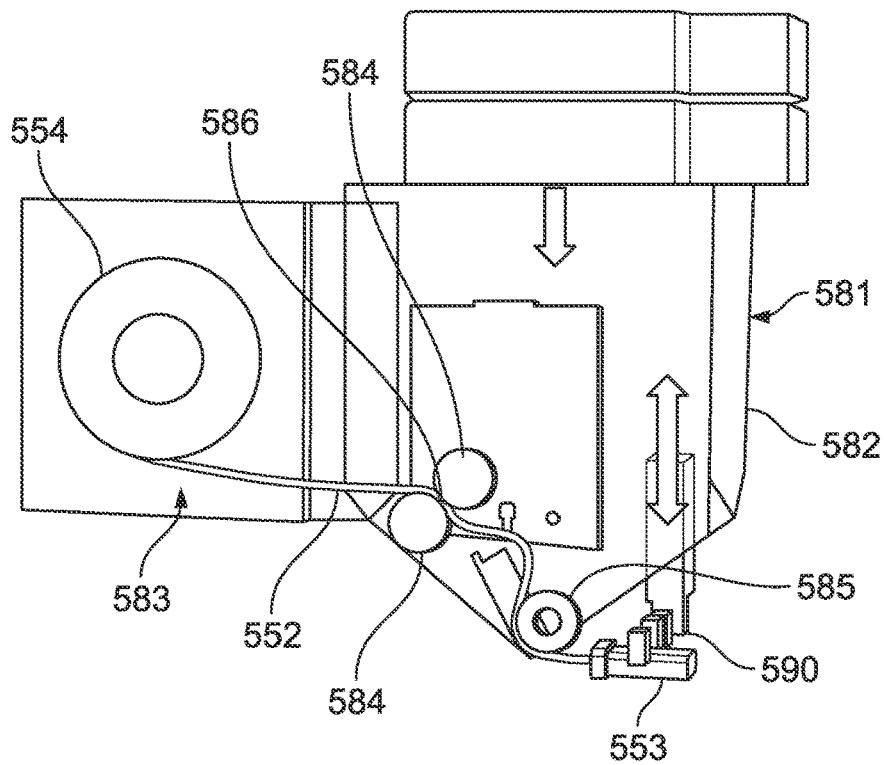
FIG. 29 depicts a fiber routing head of the fiber routing apparatus of FIGS. 26-28.

FIG. 29 is a schematic view depicting the pigtail routing head 581 of the pigtail routing apparatus 580 which works in combination with the platform 574 of the pigtail routing apparatus 580. The pigtail routing head 581 is linearly movable along the y-axis 538 relative to the platform 574 and the platform is linearly moveable along the x-axis 535 relative to the pigtail routing head 581. The pigtail routing apparatus 580 can include linear bearings (e.g., linear tracks, rails) to guide movement of the routing head 581 and the platform 574 along their respective axes, an can include linear drives such as drive cylinders or rack-and-pinion drives to move the routing head 581 and the platform 574 along their respective axes. The pigtail routing head 581 is also moveable along the z-axis 537 relative to the platform 574. In one example, the pigtail routing head 581 can be moved along the z-axis 537 relative to the platform 574 and the linear guide supporting the routing head 581 by a linear drive such as a drive cylinder.

The pigtail routing head 581 includes a main body 582 on which a pigtail packaging mounting location 583 is carried. The packaging mounting location 583 is adapted for receiving a packaged pigtail from the carousal 571. In certain examples, the packaging mounting location 583 is moveable relative to the main body 582 along the x-axis and/or the y-axis and/or the z-axis to facilitate access the packaging from the carousal 571 and delivering the packaging to the post routing staging location 573. The pigtail routing head 581 also includes feeding rollers 584 and a press roller 585 carried with the main body. At least one of the feeding rollers 584 can be driven roller. A nip 586 for receiving the optical fiber 582 of the fiber optic pigtail managed by the packaging 554 is defined between the feeding rollers 584. In certain examples, feeding rollers 584 are adapted to pull the optical fiber of the pigtail from the packaging and push the optical fiber toward the press roller 585. During fiber routing, the press roller can roll across the substrate while concurrently pressing the optical fiber of the pigtail against a bead of adhesive which has been pre-applied along the desired fiber routing path. During fiber routing on the substrate 531, a controller can coordinate speed of rotation of the feed rollers 584 with the relative movement that takes place between the press roller 585 and the substrate 531. In certain examples, the feeding rollers 584 can feed the optical fiber to a nip defined between the press roller 585 and the substrate 531. The optical fiber preferably passes beneath the press roller 585 such that the press roller 585 can press the optical fiber onto the adhesive bead on the substrate 531 as the main body 582 is moved by one or more drives under the control of a controller such as a digital controller.

In certain examples, the main body 582 of the pigtail routing head 581 is movable along the y-axis and the z-axis, and the table or platform supporting the substrate 531 is movable on an x-axis. In this way, a control system can manipulate the components of the pigtail routing system to route the pigtails on the substrate in accordance with a digital map accessed by the control system. In certain examples, a connector holder 590 or gripper for holding the connector of the connectorized pigtail can be coupled to the main body 582. In certain examples, the connector holder is movable along the x-axis and/or the y-axis and/or the z-axis relative to the main body 582 to facilitate grasping the connector of the pigtail from the packaging at the staging apparatus 570 and for placing the connector of the pigtail at a desired location on the substrate 531. The connector can be initially grasped by the holder 590 at the time the packaged pigtail is loaded onto the packaging mounting location 583 from the staging apparatus 570. Once the connector of the pigtail has been placed or secured at the desired location on the substate 351, relative movement can be generated between the main body 582 of the routing head and the platform to route the optical fiber of the pigtail along the predetermined fiber routing path on the substrate. As indicated previously, the routing path can be defined digitally via digital map. During routing, the press roller 585 can be rolled along the routing path and can press the optical fiber of the pigtail against the routing path as the roller moves along the routing path thereby leaving the optical fiber behind the roller secured to the substrate by the previously deposited bead of adhesive.

Figure 30:
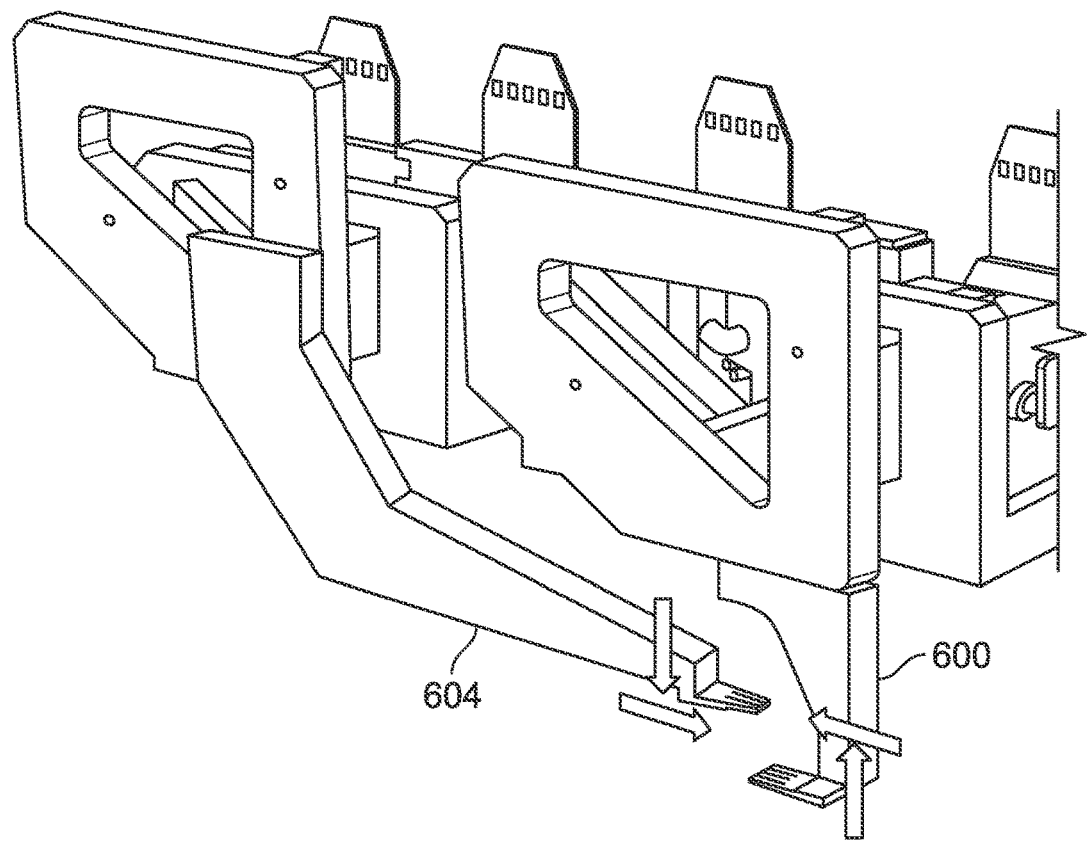
FIG. 30 depicts a station for ribbonizing portions of optical fibers that extend beyond an outer boundary of a substrate after fiber routing.
Figure 31:
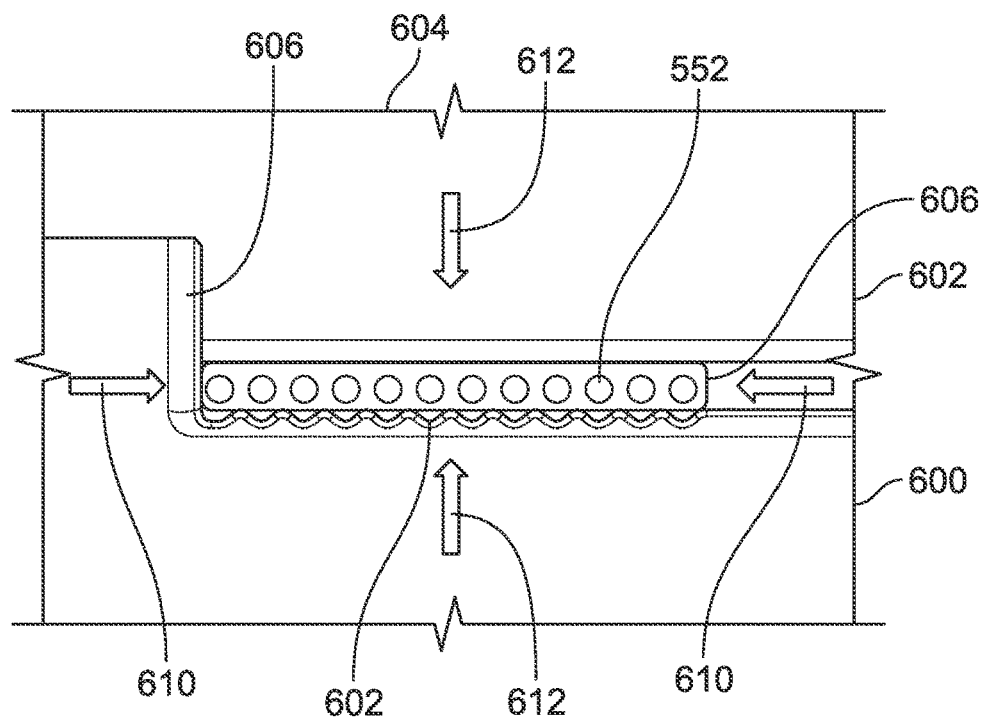
FIG. 31 is another view of the station of FIG. 30.
Figure 32:
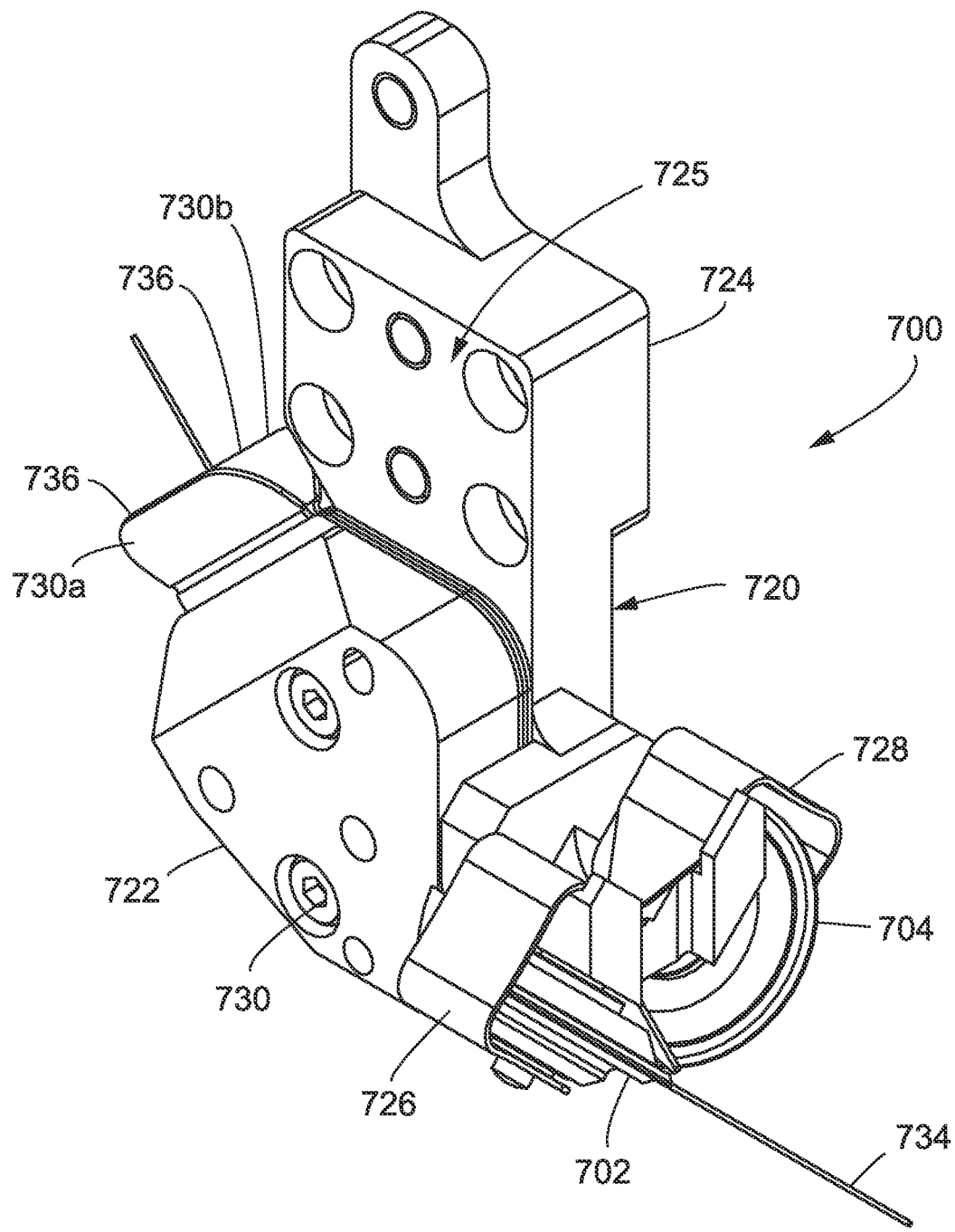
FIG. 32 is a perspective view of a press roller arrangement in accordance with the principles of the present disclosure.
Figure 33:
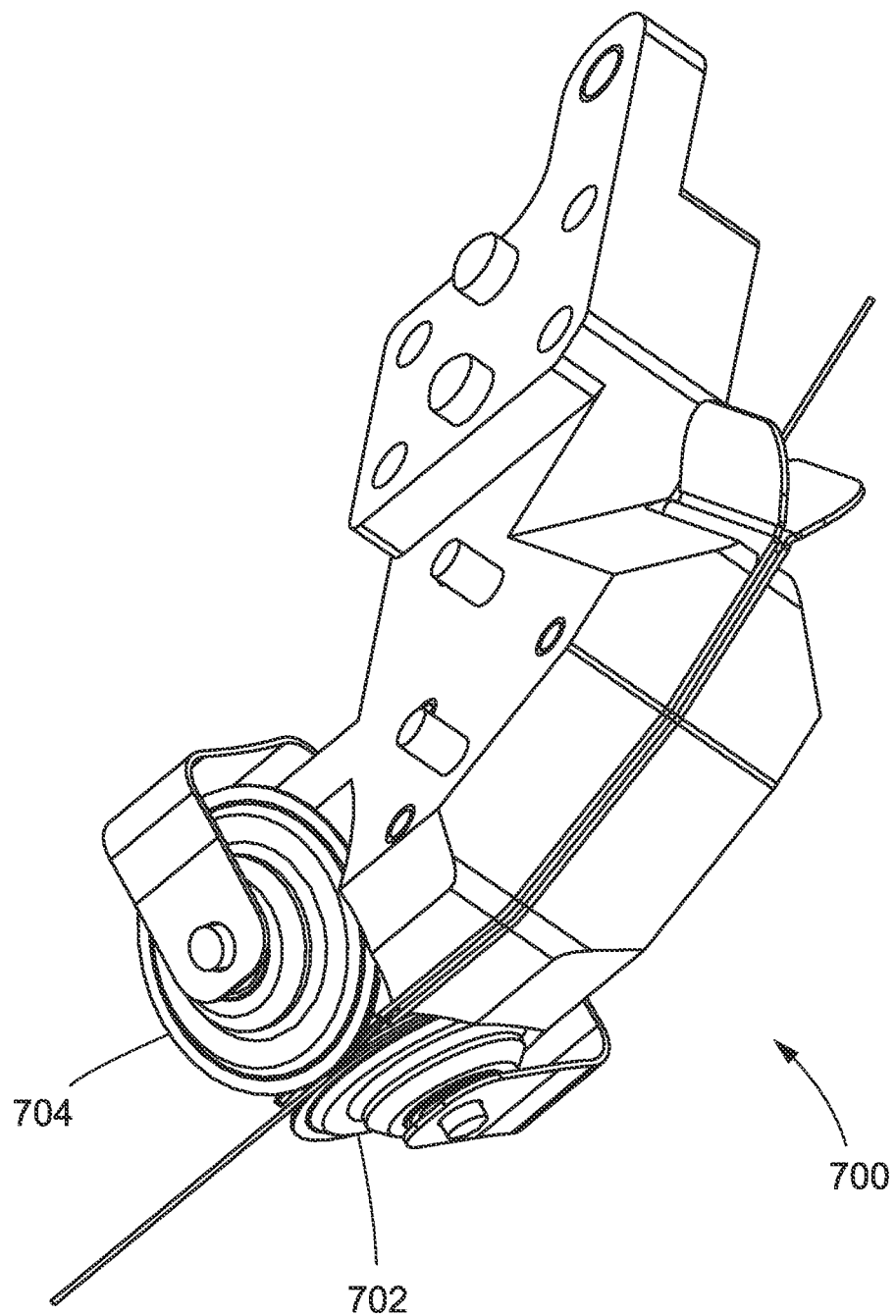
FIG. 33 is another perspective view of the press roller arrangement of FIG. 32.
Figure 34:
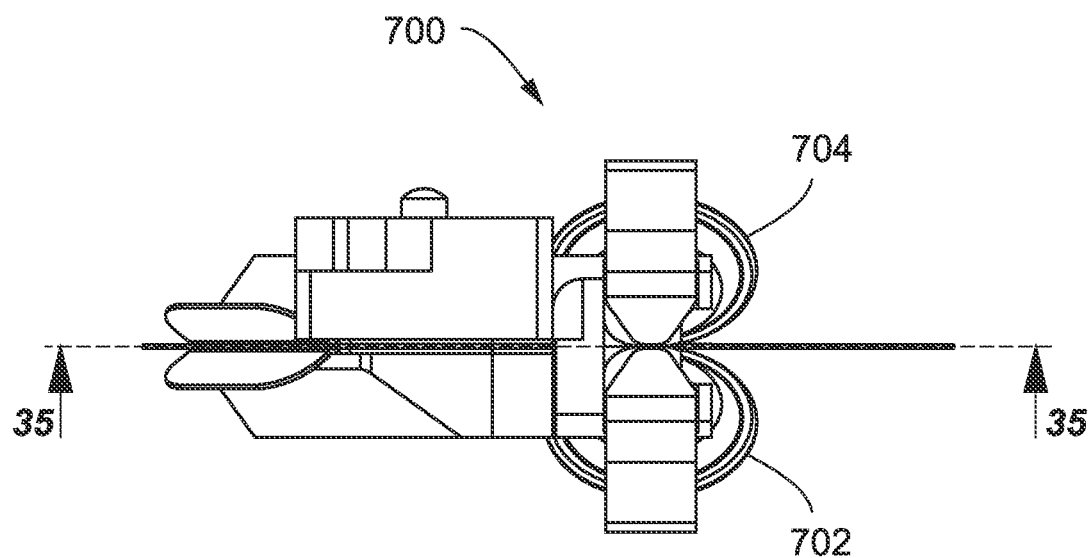
FIG. 34 is a top view of the press roller arrangement of FIG. 32.
Figure 35:
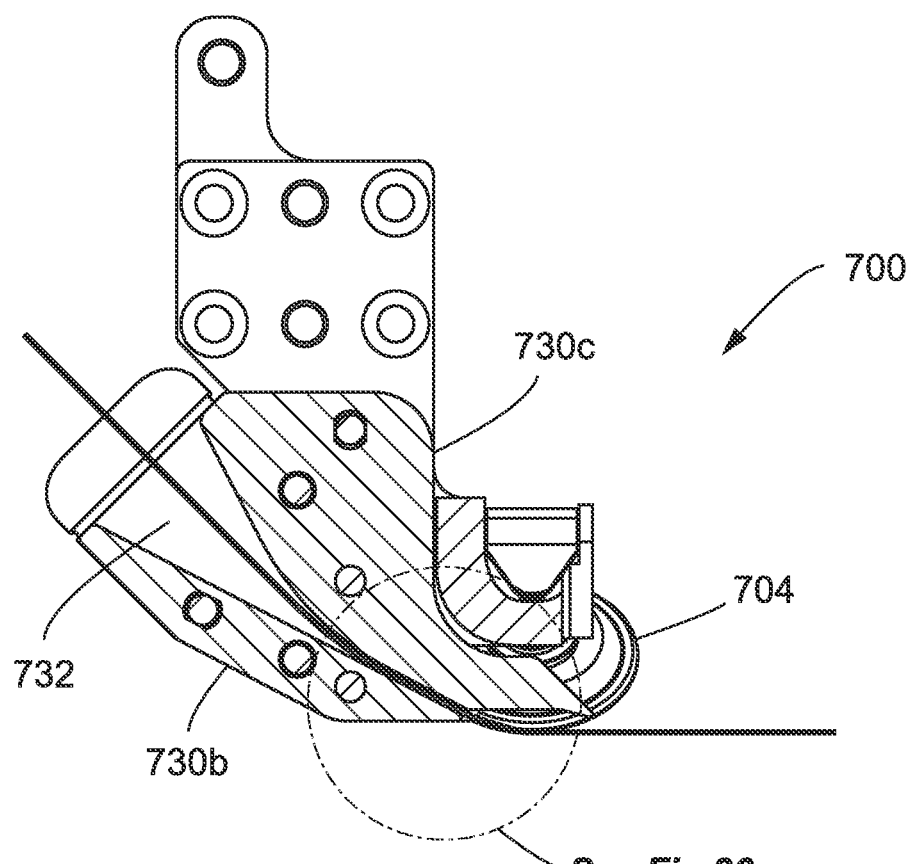
FIG. 35 is aa cross-sectional view taken along section line 35-35 of FIG. 34.
Figure 36:
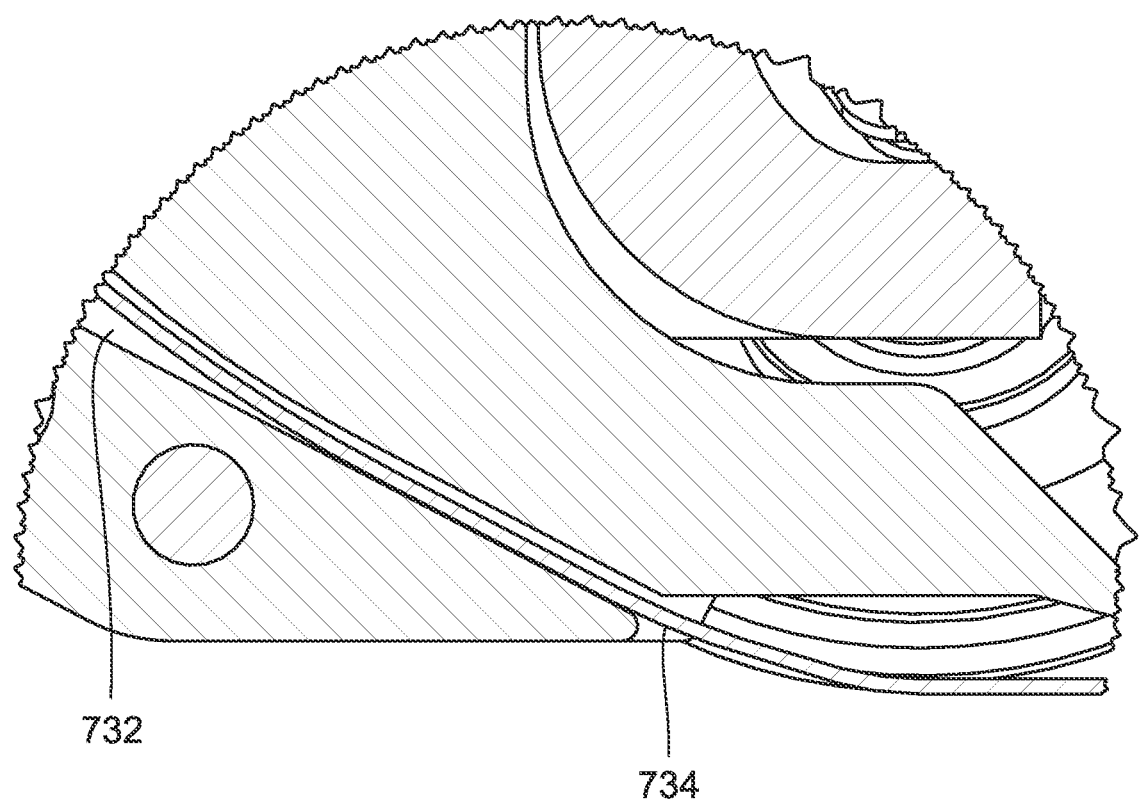
FIG. 36 is an enlarged view of a portion of FIG. 35.
Figure 37:
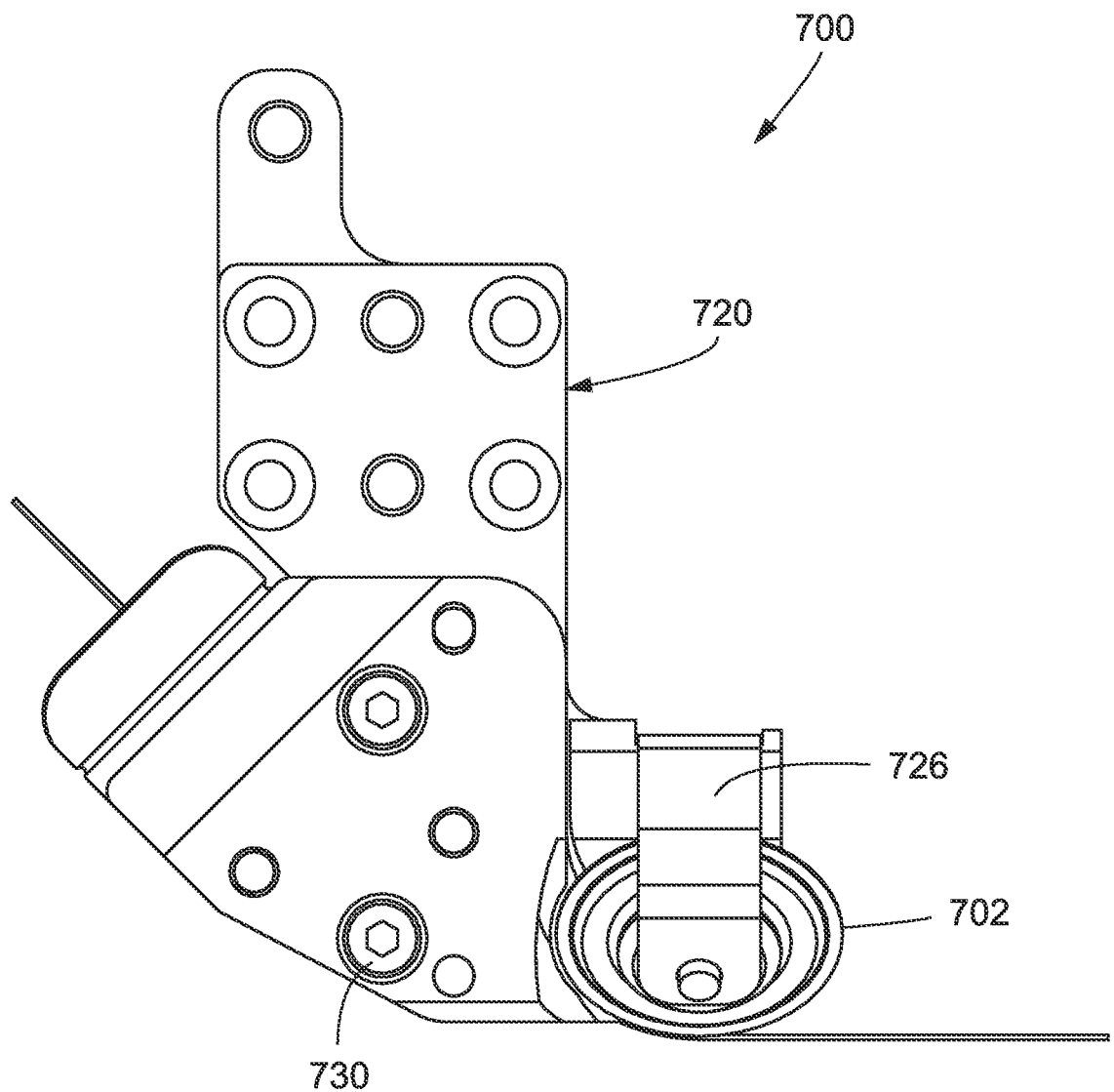
FIG. 37 is a side view of the press roller arrangement of FIG. 32.
Figure 38:
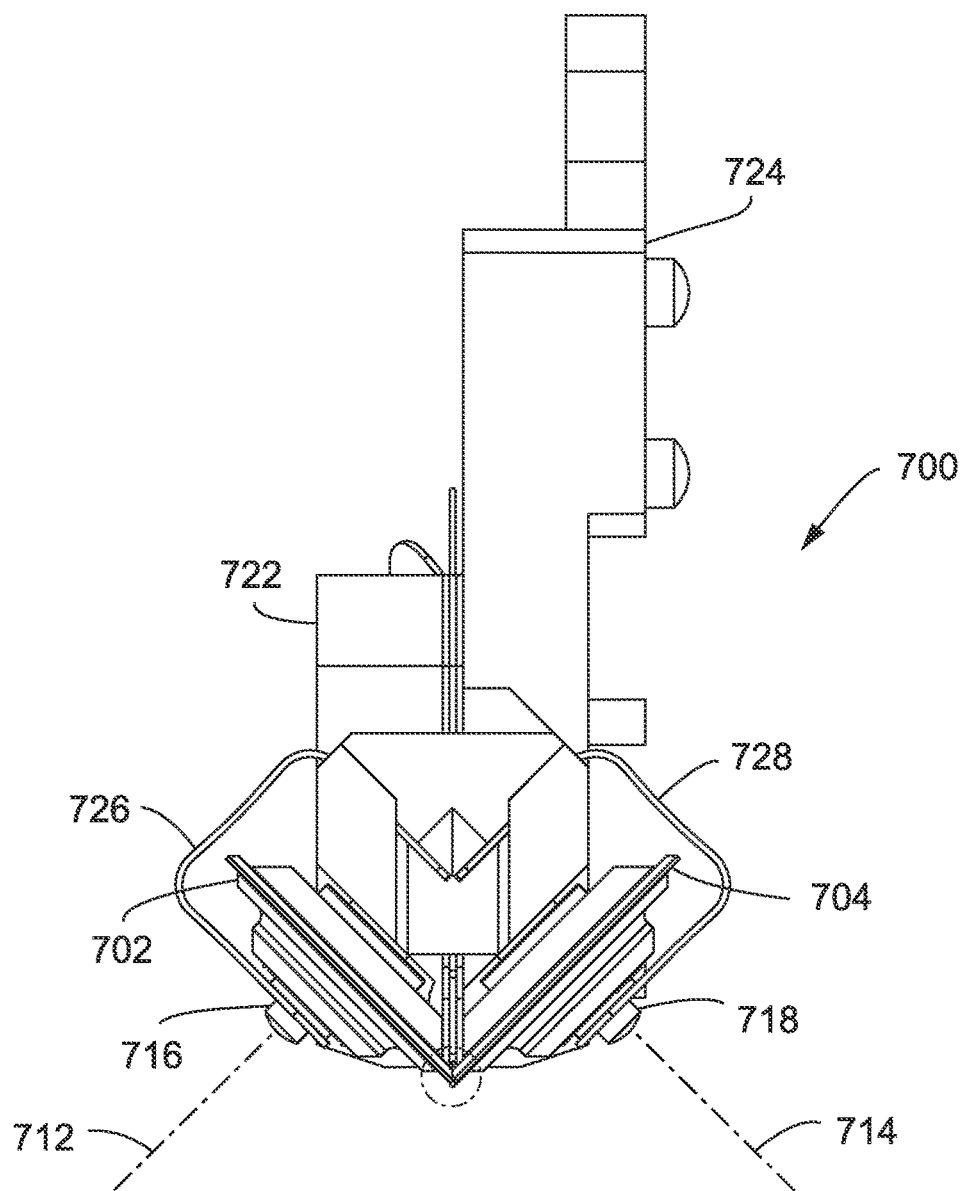
FIG. 38 is a front view of the press roller arrangement of FIG. 32.
Figure 39:
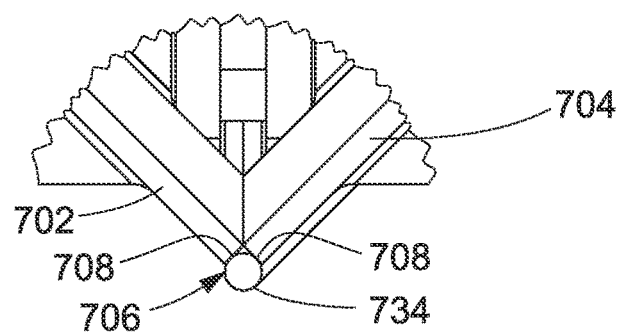
FIG. 39 is an enlarged view of a portion of FIG. 38.
Figure 40:
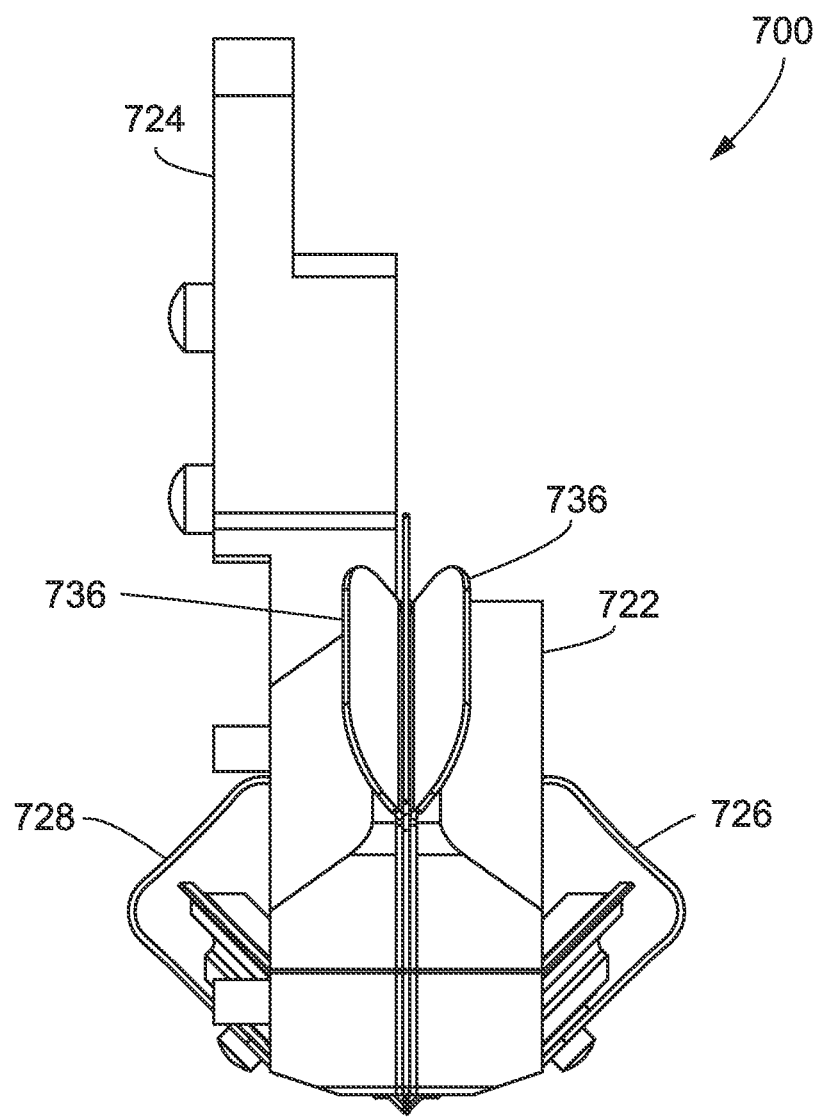
FIG. 40 is a rear view of the press roller arrangement of FIG. 32.
Figure 41:
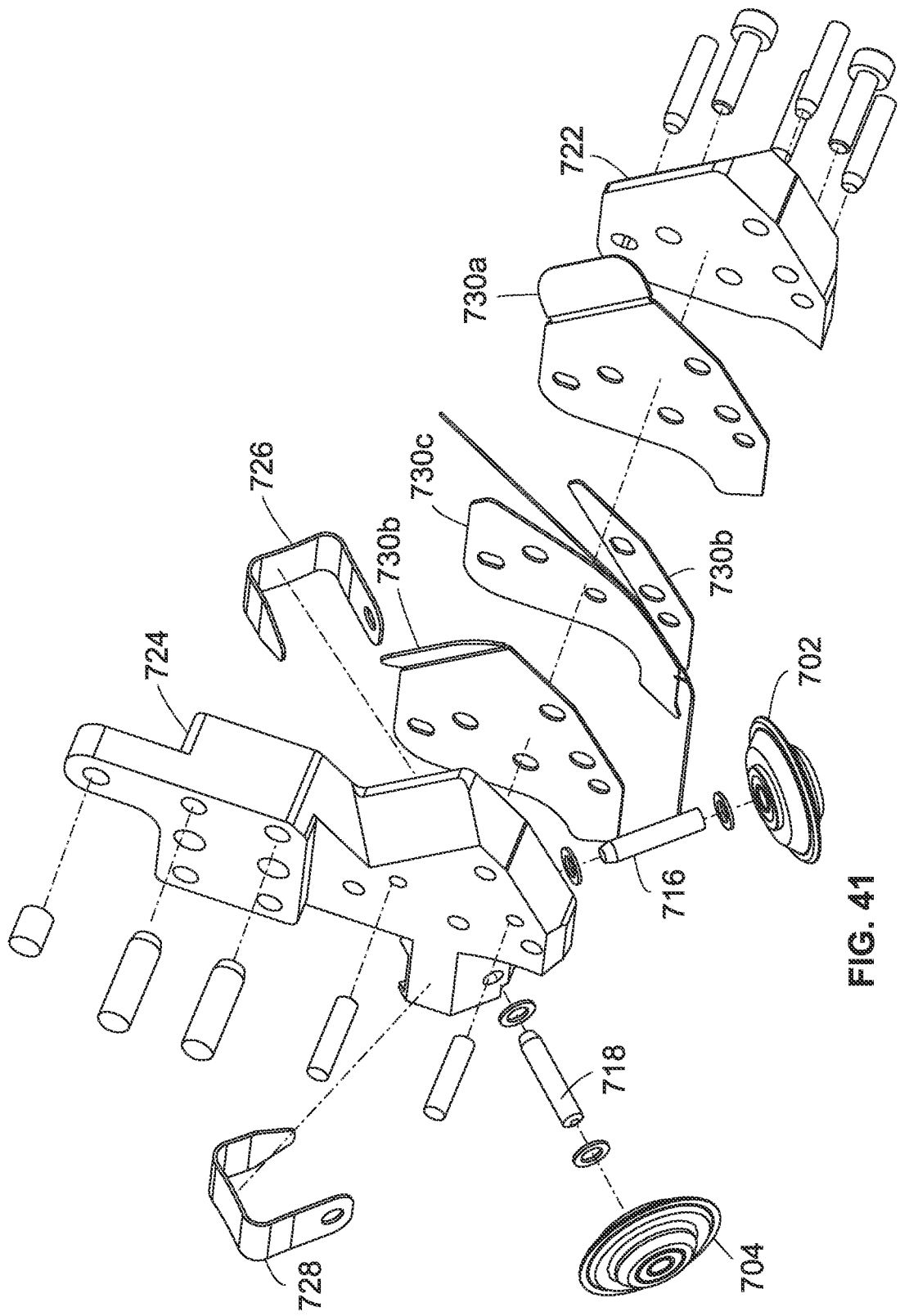
FIG. 41 is an exploded view of the press roller arrangement of FIG. 32.

FIGS. 30 and 31 show an example system for mechanically aligning the portions of the optical fibers that are not affixed to the substrate (e.g., the portions of the optical fibers that extend beyond an outer boundary of the substrate 531) to facilitate ribbonizing the optical fibers. The tool includes a first piece 600 defining a plurality of grooves 602 for receiving the optical fibers. The grooves 602 are configured to position the optical fibers parallel to one another at a predetermined pitch with respect to one another. In one example, v-grooves can be used to establish the center-to-center spacing of the optical fibers. A second piece 604 can be configured to press the optical fibers into the grooves 602. In certain examples, side members 606 are provided on the parts 600, 604 to press the optical fibers laterally together. For example, movement in a first orientation 610 between the parts 600, 604 can be used press the optical fibers laterally together in alignment with the grooves 602, and movement in a second orientation 612 perpendicular to the first orientation can be used to press the optical fibers into the grooves 602. Once the optical fibers have been aligned and positioned in a desired sequence, a matrix material can be applied to the fibers to form a section of either a standard fiber ribbon or a rollable fiber ribbon in which the optical fibers are retained in the desired sequence by the matrix material.

It will be appreciated that different type of structures can be used to press the optical fibers of the pigtails onto a substrate during fiber routing. For example, needle type fiber guides having rounded tips and no rollers can be used. Alternatively, as described above, a fiber routing tool having a rotatable press roller can be used. The press roller can have a non-grooved circumferential outer surface (e.g., a flat axial profile) or can have a circumferential groove in which the fiber is received. In a further example, the routing tool can include multiple press rollers that cooperate to press a fiber onto a substrate during fiber routing. The rollers can be mounted on different axes of rotation that are angled with respect to one another and circumferential edges of the rollers can cooperate to define a pocket (e.g., receptacle, notch, etc.) in which the fiber is received as the fiber is pressed onto the adhesive supported by the substrate.

FIGS. 32-41 depict an example multi-roller roller arrangement 700 in accordance with the principles of the present disclosure for use in pressing optical fibers onto a substrate a substrate (e.g., a flexible substrate) to adhere the fibers to the substrate during fiber routing. The roller arrangement 700 is adapted to be mounted to a manipulator such as a robotic arm or other moveable component that can be moved by a control system to route a fiber on a substrate. The roller arrangement 700 includes first and second rollers 702, 704 that are angled (e.g., skewed, canted) relative to one another and relatively positioned such that the rollers cooperate to define a fiber pocket 706 (see FIGS. 38 and 39) between circumferential edges 708 of the rollers 702, 704. The first and second rollers 702, 704 are rotatable about first and second axes of rotation 712, 714 (see FIG. 38) defined by first and second pins 716, 718 supported by a frame 720 of the roller arrangement 700. In one example, the axes of rotation 712, 714 are arranged at an angle in the range of 70-110 degrees, or in the range of 80-100 degrees or about 90 degrees.

The roller arrangement 770 includes the frame 720 for supporting the pins 716, 718 and for attaching the arrangement to a manipulator. Primary support of the frame 770 is provided by a frame block 724 in which the pins 716, 718 are supported. The block 724 includes an attachment interface 725 for attaching the arrangement 770 to a manipulator. Clips 726, 728 are used to retain the pins 716, 718 within the frame block 724. Another frame block 722 is secured to the frame block 724 by fasteners 730 such as bolts. Plates 730*a-d* are mounted between the frame blocks 722, 724. In one example, the plates 730*a-d* are clamped between the frame blocks 722, 724 and the fasteners 730 extend through openings in the plates 730*a-d*. The frame 720 defines a fiber passage 732 (see FIGS. 35 and 36) that extends through the frame 720 and is configured to direct an optical fiber 734 being routed on a substrate to the pocket 706. The passage 732 is defined by the plates 730*a-d* and is configured to taper inwardly as the passage extends toward the pocket 706. The plates 730*a* and 730*d* include angled lead-in portions 736 for guiding the optical fiber 734 into the passage 732.

Figure 42:
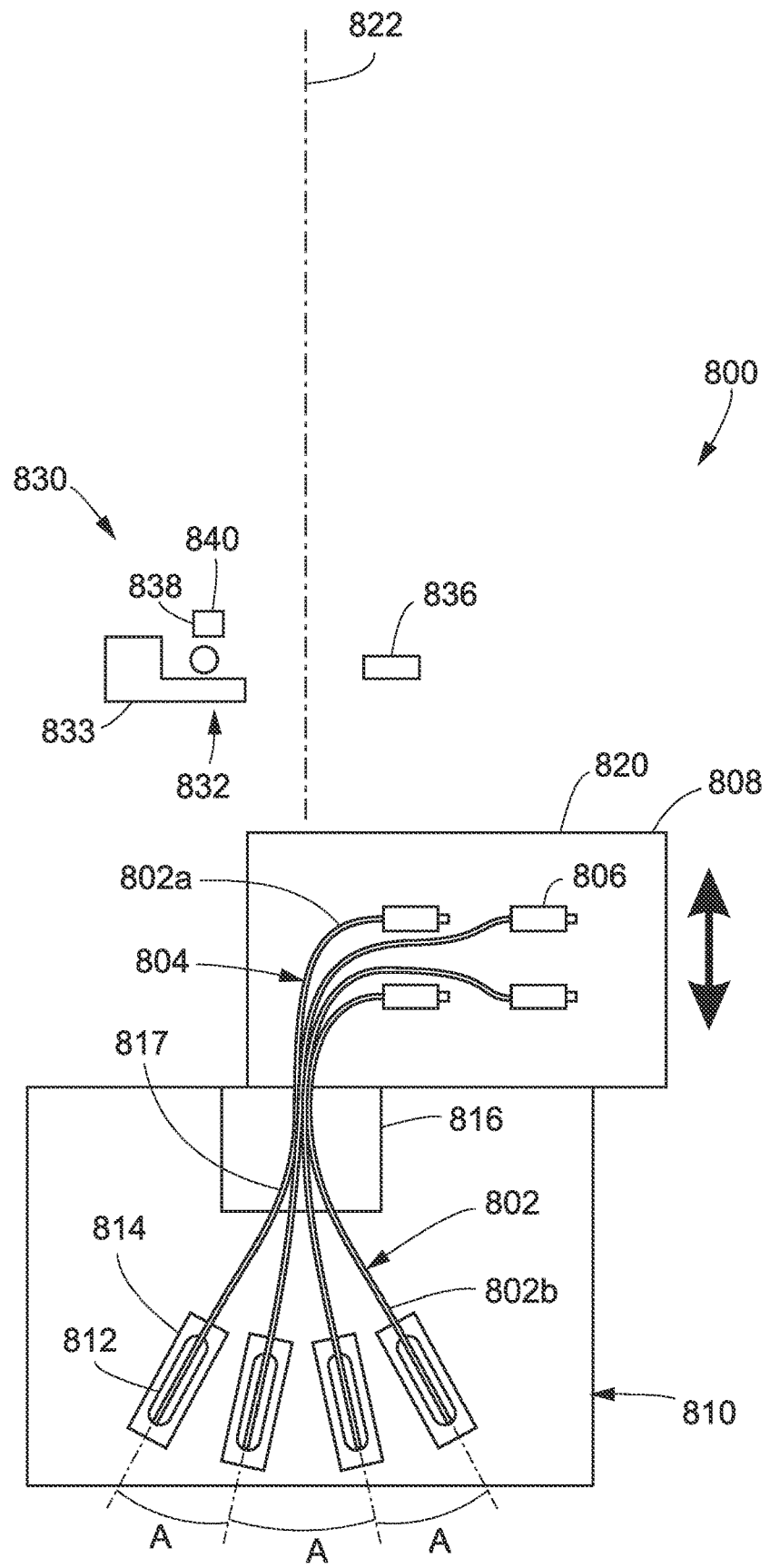
FIG. 42 is a schematic view of a fiber ribbonization system in accordance with the principles of the present disclosure.
Figure 43:
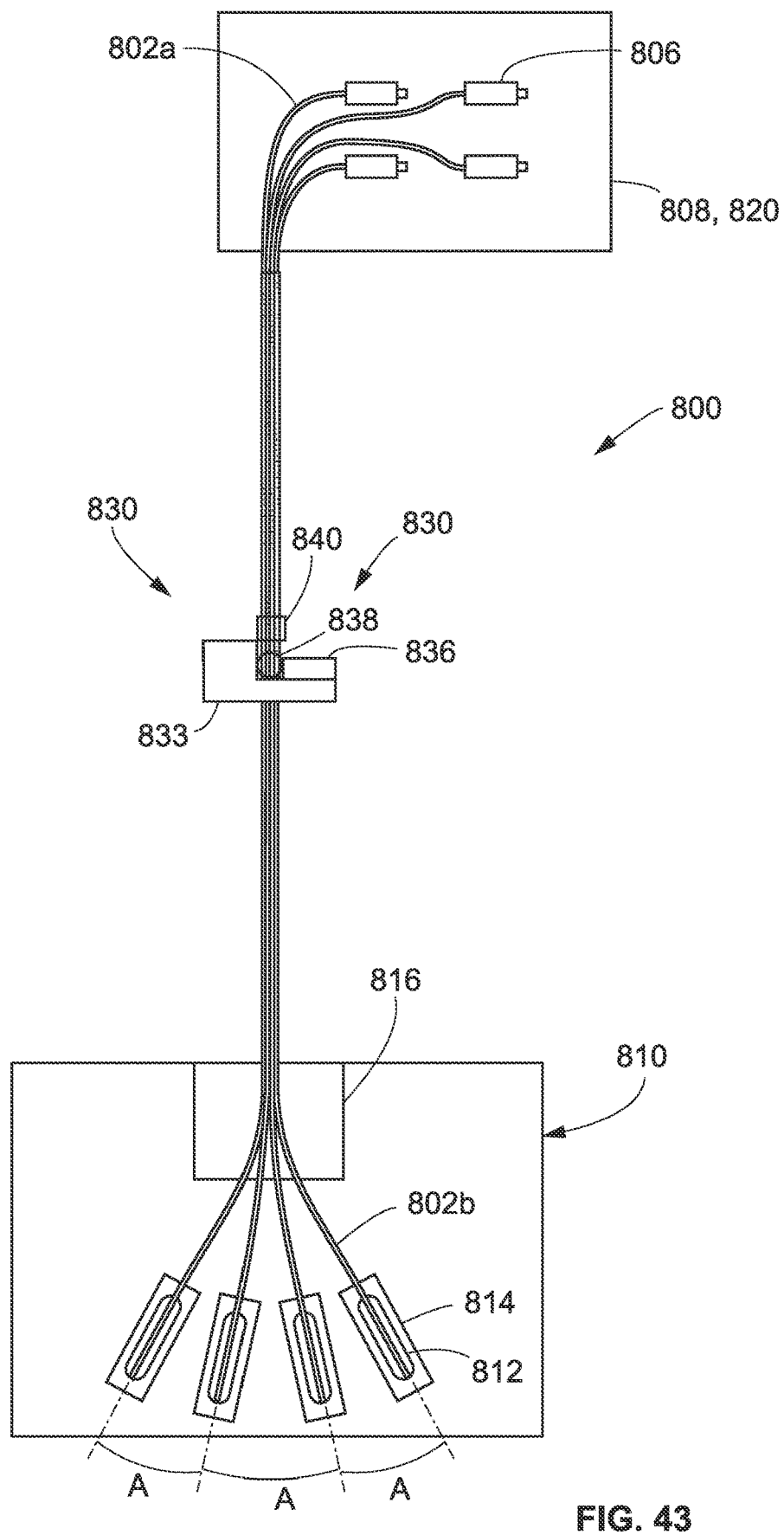
FIG. 43 is a schematic view of the fiber ribbonization system of FIG. 42 in the process of ribbonizing portions of optical fibers that extend outwardly from a substrate on which other portions of the fibers have been pre-routed.
Figure 44:
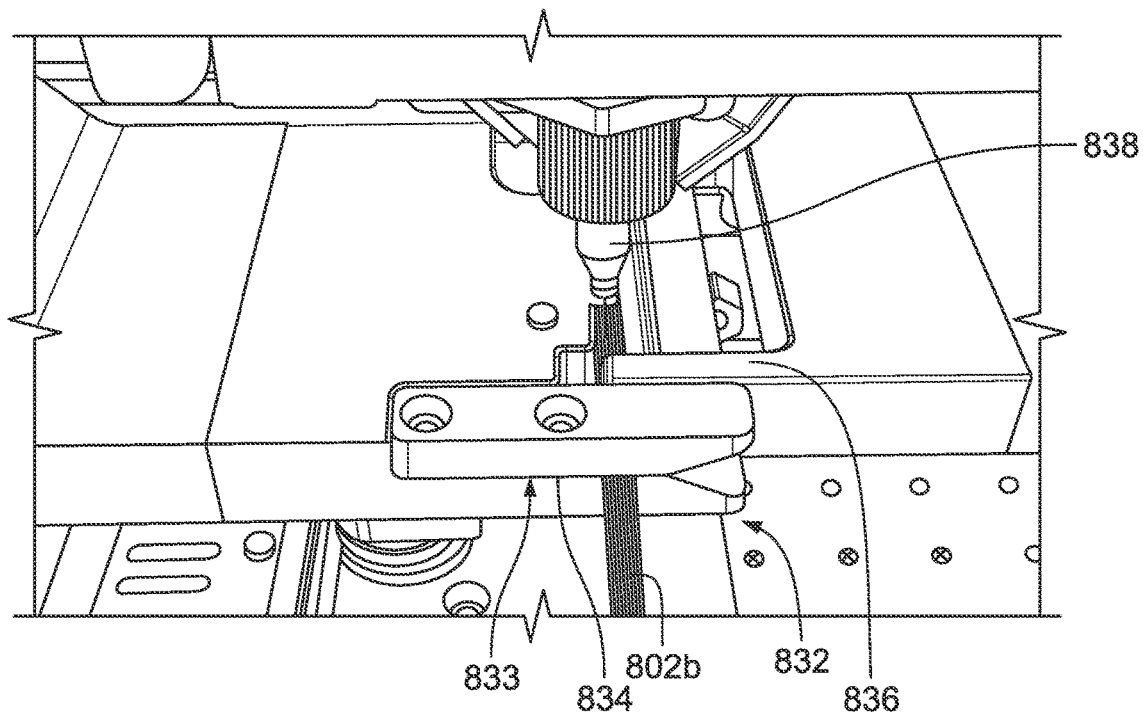
FIG. 44 is a perspective view of a ribbonization station of the system of FIGS. 42 and 43.
Figure 45:
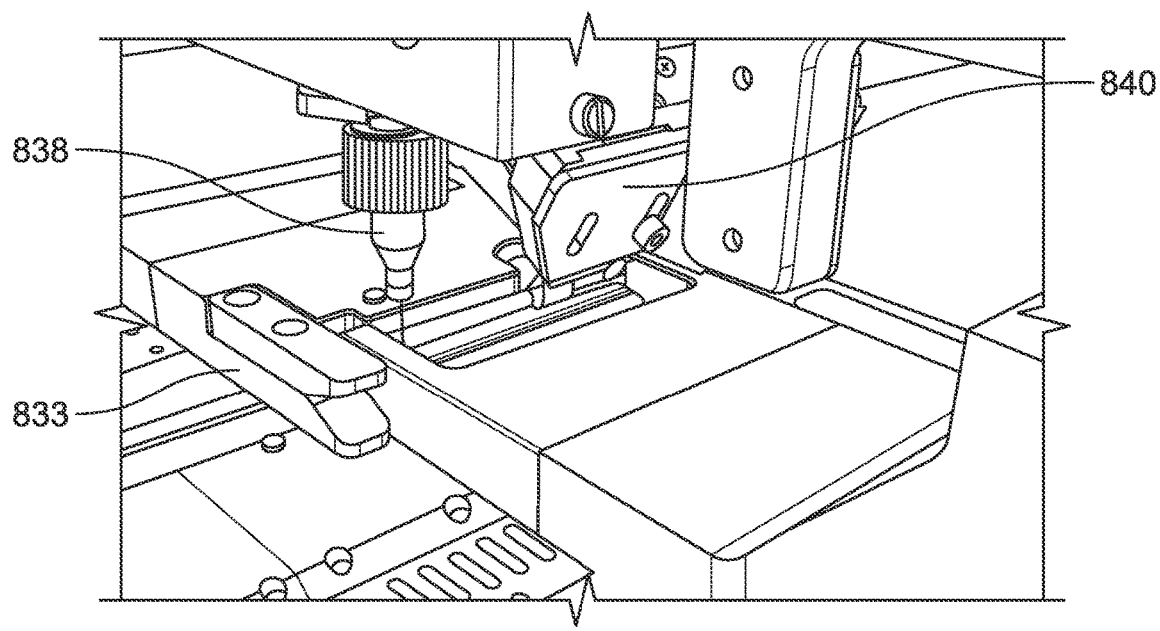
FIG. 45 is another view of the ribbonization station of FIG. 44.
Figure 46:
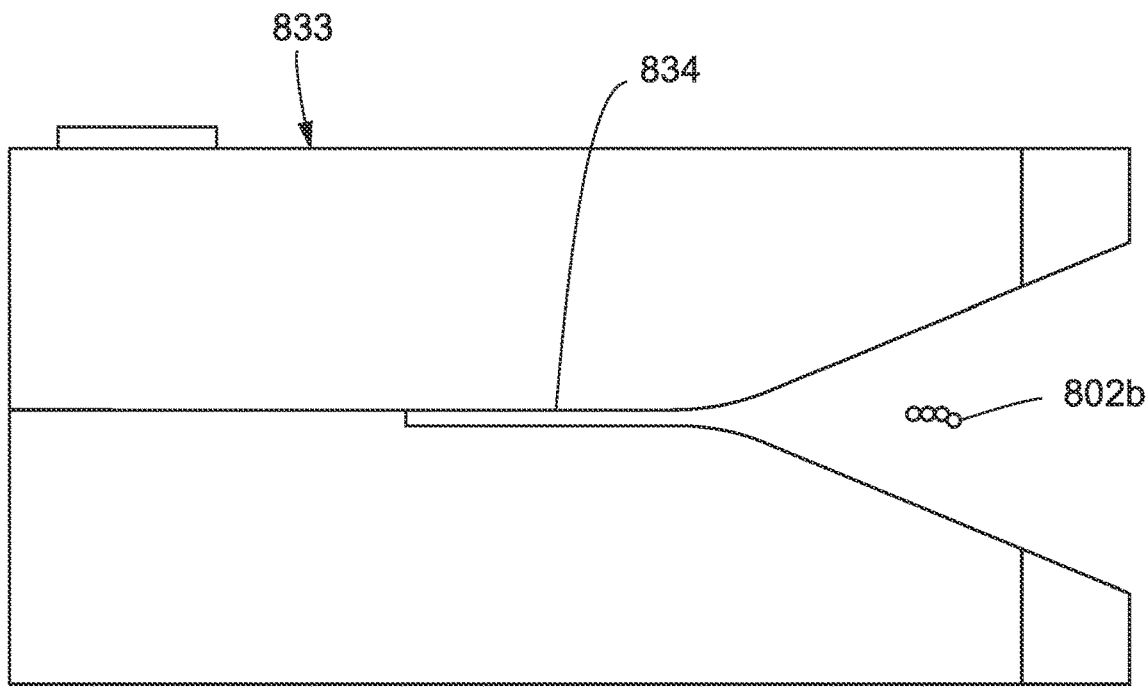
FIG. 46 depicts a fiber alignment tool of the ribbonization station of FIGS. 44 and 45.
Figure 47:
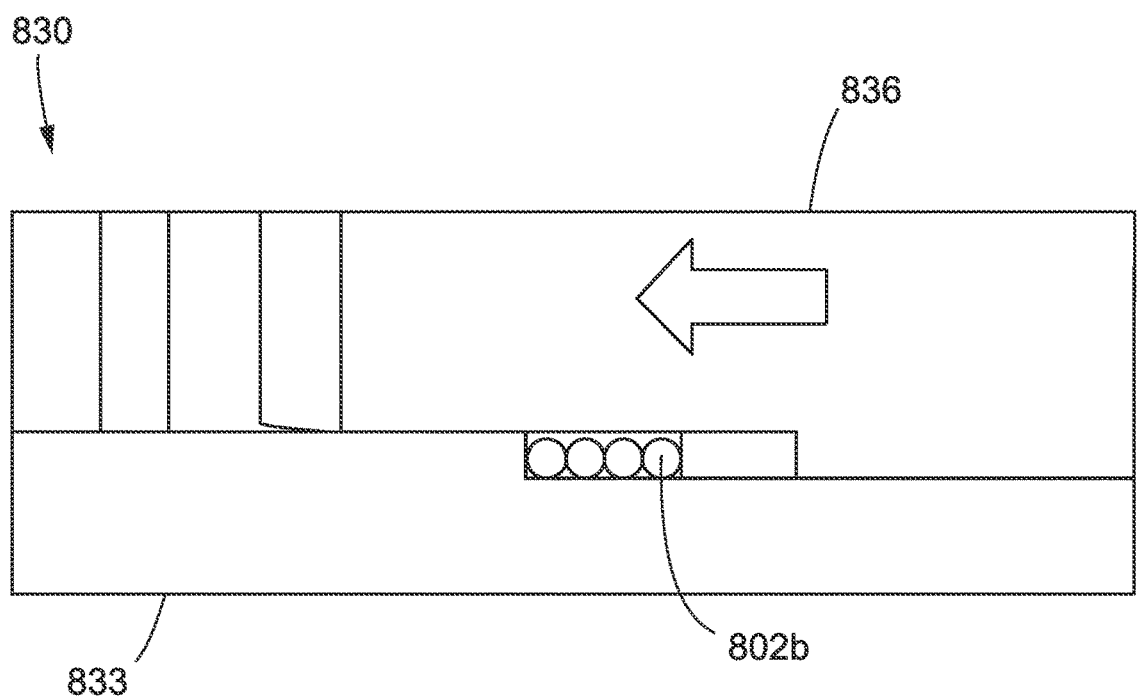
FIG. 47 depicts a pusher tool that works with the fiber alignment tool of FIG. 46.

FIGS. 42 and 43 depict an example system 800 for ribbonizing optical fibers 802 of connectorized pigtails 804 having connectorized ends 806. The optical fibers 802 can include pre-routed portions 802*a* that have been routed and secured to a substate 808 in a manner as described above, and portions 802*b* that extend off the substrate and that are not routed on the substrate 808. The system includes a spool holding region 810 for receiving fiber spools 812 after the fiber portions 802*a* have been routed on the substate 808. The portions 802*b* of the fibers 802 can be coiled about the fiber spools 812. The spool holding region 810 includes spool holders 814 defining pockets for receiving the fiber spools 812. The spool holders 814 are arranged in an angularly fanned out configuration such that the when the fiber spools 812 are held within the holders 814 the fiber spools 812 are fanned out with respect to one another (e.g., arranged on an arc and separated by fan angles A). The fiber spools 812 can rotate within their corresponding holders 814 to allow the fiber portions 802*b* to be paid off from the spools 812. Because of the fanned configuration, the spools 812 are each rotatable about a separate axis of rotation as the fiber portions 802*b* are paid off from the spools 812. The spool holding region 810 includes a fan-out comb 816 through which the fiber portions 802*b* are routed.

The fan-out comb 816 includes grooves 817 for fanning out (e.g., separating) the fiber portions 802*b* and for guiding (e.g., directing, angling) the fiber portions 802*b* from a fiber input/output location of the substrate 808 toward their respective fiber holders 814. While connectorized pigtails have been referenced for this example, it will be appreciated that any pre-processed or even non-pre-processed optical fibers can also be routed and ribbonized using the system 800.

The system 800 includes a plate 820 (e.g., a vacuum plate) for holding the substrate 808 during routing of the connectorized pigtails 804. The plate 820 is moveable relative the spool holding region 810 along an axis 822 and is moveable past a ribbonization station 830. The ribbonization station 830 includes a fiber alignment fixture 832 (see FIGS. 44-47) including a fiber alignment member 833 defining an open-ended fiber alignment slot 834 into which the fiber portions 802*b* can be received. The fixture 832 also includes a pusher 836 for pushing the fiber portions 802*b* into a planar, side-by-side array within the slot 834. The ribbonization station 830 also includes a matrix applicator 838 (e.g., an injector) for applying a matrix material (e.g., a curable material such as acrylate or other curable material which may include an adhesive material) to the fiber portions 802*b* aligned by the alignment fixture 832 to ribbonize the fiber portions 802*b*. The ribbonization station 830 also includes a curing component 840 for applying energy (e.g., radiant energy such as ultraviolet light) to the matrix material on the fiber portions 802*b* to cure the matrix material.

Once the fiber portions 802*a* have been routed on the substrate 808 and the spools 812 have been loaded in the spool holding region 810, the plate 820 is moved along the axis 822 away from the spool holding region 810 and past the ribbonization station 830 (see FIG. 43). As the plate 820 is moved away from the spool holding region 810, the spools 812 rotate within their holders 814 to enable the fiber portions 802*b* to be paid off from the spools 814. Once the plate 820 moves past the ribbonization station 830, the fiber alignment member 833 moves in a first lateral direction relative to the fiber portions 802*b* such the fiber portions 802*b* are received within the slot 834 through the open end and the pusher 836 is moved in a second lateral direction to push and align the fiber portions within the slot 834. Continued movement of the plate 820 pulls the aligned fiber portions 802*b* past the matrix applicator 838 where the matrix material is applied to the fiber portions 802*b* and past the curing component 840 where the material is cured to bind the fibers in the ribbonized configuration.

Figure 48:
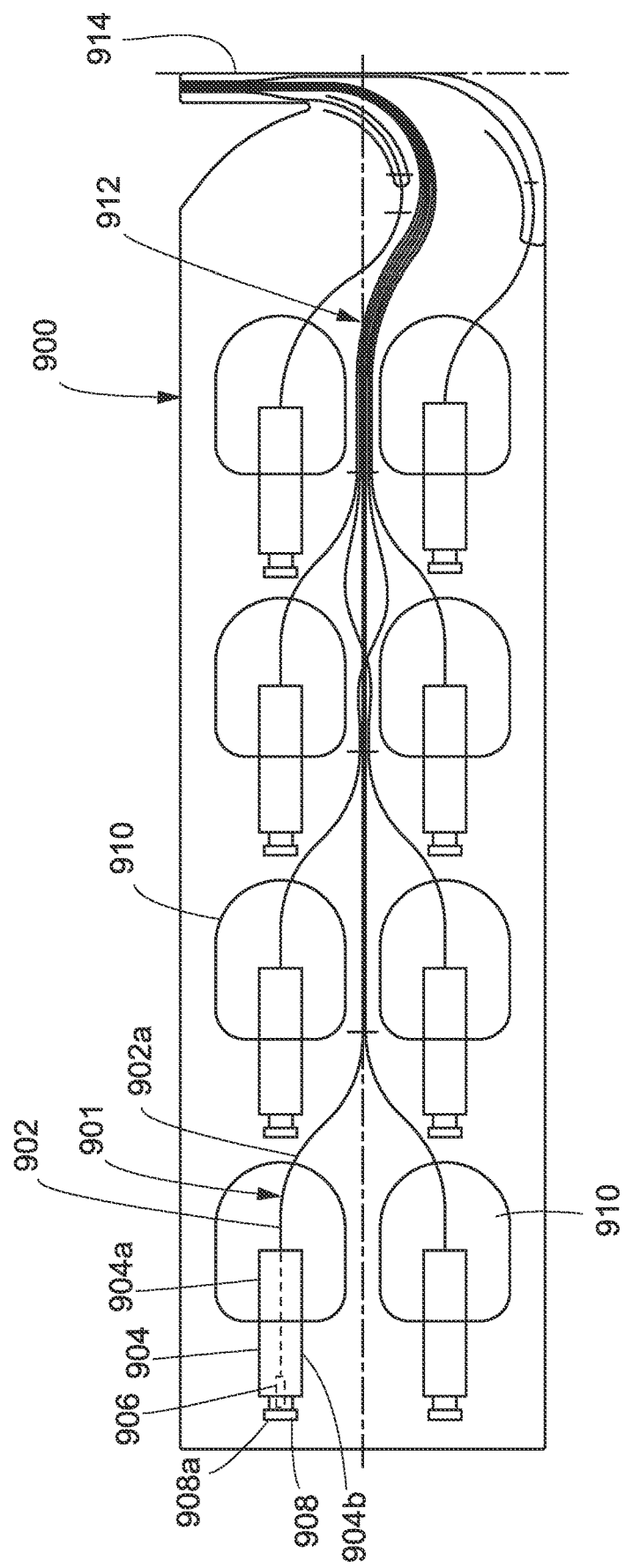
FIG. 48 depicts another fiber routing configuration in accordance with the principle of the present disclosure for routing connectorized pigtails on a substrate.

FIG. 48 depicts another flexible substrate 900 and connectorized fiber optic pigtail routing configuration in accordance with the principles of the present disclosure. The configuration includes a plurality of connectorized pigtails 901 each including an optical fiber 902 having an end terminated by a fiber optic connector 904 (e.g., an SC or LC connector). The fiber optic connectors 904 include ferrules 906 in which end portions of the optical fibers 902 are potted, and dust caps 908 removably mounted over the ferrules 906. The optical fibers 902 include pre-routed portions 902*a* bonded to the substate 900 along fiber routing paths. The substrate 900 includes a plurality of openings 910. The fiber routing paths are routed along a main path 912 that extends along a length of the substrate between sets of the openings 910. The routed fiber portions 902*a* are routed along the main path 912 to an input/output location 914 defined by a flexible extension or tail located at one end of the substrate 900 where the optical fibers extend off the substrate 900. The fiber portions 902*a* individually branch off from the main path 912 to separate ones of the openings 910. In certain examples, the connectors 904 are secured at the openings 910. In certain examples the fiber optic connectors 904 are secured to the substrate 900 at locations in which the connectors extend at least partially past the respective opening 910. In certain examples, the connectors are secured to the substrate 900 such that a first portion 904a of each connector coincides with its respective opening 901 and a second portion 904b of each connector extends past its respective opening 910. By extending the fibers 902 past the openings 910, fiber length is provided which is not bonded to the substrate 900 and is available for facilitating inserting the connectors 904 into corresponding adapter ports when the substrate is installed in an enclosure such as an MST and the connectors are disconnected from the substrate 900 and inserted into corresponding adapter ports of the enclosure.

In one example, the connectors 904 can be secured to the substrate by securing (e.g., bonding) the dust caps 908 to the substrate 900. Once the substrate 900 is installed within an enclosure, the ferrules 906 can be removed from their respective dust caps 908 to disconnect the connectors 904 from the substrate 900, and the connectors 904 can be inserted through the openings 910 into their respective adapter ports. The dust caps 908 can remain attached to the substrate 900. The dust caps can include structures such as enlarged end flanges 908a that are adapted to contact the substrate when the connectors 904 are laid on the substrate 900 to provide attachment locations for bonding the dust caps 908 to the substrate 900.

Example Aspects of the Disclosure

Aspect 1. A telecommunications apparatus comprising:
 a substrate sheet having a flexible construction, the substrate sheet defining a plurality of sheet openings, the substrate sheet including a fiber input/output location; and
 a plurality of optical fibers each routed onto the substrate sheet at the fiber input/output location, the optical fibers each including a first end and an opposite second end, the first ends being secured within single-fiber ferrules, the optical fibers including fixed routing portions extending on the substrate sheet along routing paths extending between the input/output location and the sheet openings, the fixed routing portions being adhesively secured to the substrate sheet, the first ends of the optical fibers secured within the single-fiber ferrules being positioned at the sheet openings, the optical fibers also including routable-portions that are not adhesively secured to the substrate and that extend from the fiber input/output location to the second ends.

Aspect 2. The telecommunications apparatus of aspect 1, wherein the single-fiber ferrules are mounted within fiber-optic connector bodies positioned at the sheet openings.

Aspect 3. The telecommunications apparatus of aspect 2, wherein the fiber optic connector bodies are SC connector bodies.

Aspect 4. The telecommunications apparatus of aspect 2, wherein the single-fiber ferrules are integrated as part of fiber optic connectors positioned at the sheet openings.

Aspect 5. The telecommunications apparatus of aspect 4, wherein the substrate sheet includes a plurality of fingers that project into the sheet openings, wherein the fixed routing portions of the optical fibers extend along lengths of the fingers, and wherein the fiber optic connectors are located adjacent ends of the fingers.

Aspect 6. The telecommunications apparatus of aspect 5, wherein the optical fibers include buffered portions that extend between the ends of the fingers and the fiber optic connectors.

Aspect 7. The telecommunications apparatus of aspect 5, wherein the fingers extend into or attach to the fiber optic connectors.

Aspect 8. The telecommunications apparatus of aspect 1, wherein the optical fibers are ribbonized at a ribbonized fiber region adjacent the second ends of the optical fibers, and wherein the optical fibers are loose at a loose fiber region located between the ribbonized fiber region and the input/output location.

Aspect 9. The telecommunications apparatus of aspect 1, wherein the substrate sheet includes a perimeter routing portion that defines and extends about a perimeter of the substrate sheet.

Aspect 10. The telecommunications apparatus of aspect 9, wherein the perimeter routing portion forms a continuous loop that surrounds the sheet openings.

Aspect 11. The telecommunications apparatus of aspect 10, wherein the perimeter routing portion includes a band of material that extends about the continuous loop.

Aspect 12. The telecommunications apparatus of aspect 1, wherein the substrate sheet is secured to a tray.

Aspect 13. The telecommunications apparatus of aspect 12, wherein the tray includes a perimeter frame that defines and extends around a central tray opening of the tray, and wherein the substrate sheet is secured to the perimeter frame with the sheet openings coextensive with the central tray opening.

Aspect 14. The telecommunications apparatus of aspect 13, wherein the tray includes first and second opposite sides, wherein the substrate sheet is secured to the frame at the first side of the tray, wherein the frame defines a channel about the central frame opening at the second side of the tray and wherein the routable-portions of the optical fibers are routed in the channel.

Aspect 15. The telecommunications apparatus of aspect 14, wherein the tray mounts in an enclosure.

Aspect 16. The telecommunications apparatus of aspect 15, wherein the enclosure includes a plurality of fiber optic adapters including hardened outer ports accessible from outside the enclosure and inner ports accessible from inside the enclosure, wherein the single-fiber ferrules are integrated as part of fiber optic connectors positioned at the sheet openings, and wherein the fiber optic connectors are inserted in the inner ports.

Aspect 17. The telecommunications apparatus of aspect 16, wherein the first side of the tray faces toward the fiber optic adapters and the second side of the tray faces away from the fiber optic adapters, and wherein the second ends of the optical fibers are spliced to optical fibers of a feeder cable of the enclosure at a splice location held within the channel of the tray.

Aspect 18. The telecommunications apparatus of aspect 17, wherein the enclosure includes first and second housing pieces that meet at a sealed interface and that cooperate to defined an interior of the housing when mated together at the sealed interface, wherein the fiber optic adapters are mounted to the first housing piece, and wherein the first side of the tray faces toward the first housing piece and the second side of the tray faces toward the second housing piece.

Aspect 19. A telecommunications apparatus comprising:
 a substrate defining a substrate opening; and
 an optical fiber routed on the substrate, the optical fiber including a first end and an opposite second end, the first end being secured within a ferrule of a fiber optic connector, the optical fiber including a fixed routing portion extending on the substrate along a routing path extending toward the substrate opening, the fixed routing portion being adhesively secured to the substrate, the first end of the optical fiber secured within the ferrule being positioned at the substrate opening.

Aspect 20. The telecommunications apparatus of aspect 19, wherein the optical fiber also includes a routable-portion that is not adhesively secured to the substrate, wherein the routable-portion extends to the second end.

Aspect 21. The telecommunications apparatus of aspect 19 or 20, wherein the substrate includes a flexible sheet which defines the substrate opening.

Aspect 22. The telecommunications apparatus of aspect 21, wherein the flexible sheet includes a polymeric film.

Aspect 23. The telecommunications apparatus of any of aspects 19-22, wherein a plurality of the optical fibers are routed on the substrate.

Aspect 24. The telecommunications apparatus of aspect 23, wherein the substrate defines a plurality of the substrate openings.

Aspect 25. A telecommunications enclosure comprising:
a housing;
a tray that mounts in the housing; and
a substrate sheet having a construction that more flexible than a construction of the tray, the substrate sheet being secured to the tray; and
a plurality of optical fibers routed on the substrate sheet, the optical fibers each including a first end and an opposite second end, the first ends being secured within ferrules, the optical fibers including fixed routing portions extending on the substrate sheet along routing paths, the fixed routing portions being adhesively secured to the substrate sheet.

Aspect 26. The enclosure of aspect 25, where in the substrate sheet defines sheet openings, wherein the first ends of the optical fibers secured within the ferrules being positioned at the sheet openings, and the optical fibers also including routable-portions that are not adhesively secured to the substrate.

Aspect 27. The enclosure of aspect 26, wherein the enclosure includes a plurality of fiber optic adapters mounted to a wall of the housing, the fiber optic adapters each including a first port accessible from outside the housing and a second port accessible from inside the housing, and wherein the ferrules are integrated within fiber optic connectors inserted within the second ports.

Aspect 28. The enclosure of aspect 27, wherein the routable-portions extend to the second ends of the optical fibers and are managed on the tray, and wherein the second ends of the optical fibers are spliced to optical fibers of an input cable coupled to the enclosure.

Aspect 29. A method for manufacturing an optical circuit layout for an optical connection device a plurality of optical connection locations arranged in a multi-dimensional configuration, the method comprising:
using a digital map corresponding to the multi-dimensional configuration of optical connection locations to control a robotic device which routes a plurality of optical fibers on a substrate, wherein the optical fibers are pre-tested optical fibers each having at least one pre-processed end, wherein the optical fibers are routed by the robotic device along routing paths defined by the digital map, and wherein the optical fibers are routed on the substrate with the pre-processed ends of the optical fibers being positioned in a multi-dimensional arrangement that corresponds to the multi-dimensional configuration of the optical connection locations.

Aspect 30. A method for manufacturing an optical circuit layout, the method comprising:
routing a bead of adhesive material along a fiber routing path on a substrate; and
routing an optical fiber along the bead of adhesive material to secure the optical fiber to the substrate along the fiber routing path.

Aspect 31. The method of aspect 30, wherein the optical fiber is pressed against the bead of adhesive material by a press roller as the optical fiber is routed along the bead of material.

Aspect 32. The method of aspect 31, wherein feed rollers including at least one driven roller feed the optical fiber toward the press roller as the optical fiber is routed along the bead of material.

Aspect 33. The method of aspect 32, wherein the feed rollers pull the optical fiber from packaging and push the optical fiber toward the press roller as the optical fiber is routed along the bead of material.

Aspect 34. The method of aspect 33, wherein the packaging retains the optical fiber in a coiled configuration.

Aspect 35. The method of aspect 34, wherein the optical fiber has a connectorized end at the time the optical fiber is routed on the substrate, wherein the feed rollers and the press rollers are carried by a fiber routing head, and wherein a connector gripper for grasping the connectorized end and for positioning the connectorized end on the substrate is carried with the fiber routing head.

Aspect 36. The method of aspect 35, wherein the packaging includes a connector holder, and wherein the connector gripper is adapted to remove the connectorized end from the connector holder.

Aspect 37. The method of aspect 30, wherein a plurality of beads of adhesive material are routed on the substrate, wherein a plurality of optical fibers are routed on the beads of adhesive material, wherein portions of the optical fibers extend outside beyond an outer boundary of the substrate after fiber routing, and wherein the portions of the optical fibers are ribbonized after fiber routing.

Aspect 38. A roller arrangement comprising:
a frame;
first and second rollers supported by the frame for rotation about rotation axes that are angled with respect to one another, the first and second rollers being canted relative to one another such that the first and second rollers cooperate to define a fiber receiving pocket between outer circumferences of the first and second rollers.

Aspect 39. The roller arrangement of Aspect 38, wherein the frame defines a fiber passage through the frame for directing an optical fiber to the fiber pocket.

Aspect 40 The roller arrangement of any of Aspects 38 or 39, wherein the fiber passage is tapered and narrows as the fiber passage extends toward the fiber pocket.

Aspect 41. The roller arrangement of any of Aspects 38-40, wherein the rollers are supported on pins secured to the frame.

Aspect 42. The roller arrangement of Aspect 41, wherein the rollers are secured to the frame by clips.

Aspect 43. The roller arrangement of Aspect 41, wherein the fiber passage is defined by plates clamped between blocks of the frame.

Aspect 44. A method for ribbonizing second portions of optical fibers that extend outwardly from a substrate on which first portions of the optical fibers have been pre-routed, the second portions being coiled about spools, the method comprising:
loading the spools into spool holders of a spool holding location; and
ribbonizing the second portions by moving the substrate away from the spool holding location such that the second portions are pulled though a fiber ribbonization station, wherein the spools rotate within the spool holders to allow the second portions to be paid out from the spools as the substrate moves away from the spool holding location.

Aspect 45. The method of Aspect 44, wherein the spools are fanned out with respect to one another at the spool holding location.

Aspect 46. The method of claim Aspect 45, wherein a comb assists in fanning out the fiber portions as the fiber portions extend from the substrate to the spool holders.

Aspect 47. The method of Aspect 46, wherein the substrate is supported by and moved by a vacuum plate.

Aspect 48. The method of any of Aspects 44-47, wherein the second portions are aligned in a row at the ribbonization station, wherein matrix material is applied to the second portions at the ribbonization station, and wherein the matrix material is cured at the ribbonization station.

Aspect 49. A telecommunications apparatus comprising:
a substrate sheet having a flexible construction, the substrate sheet defining a plurality of sheet openings, the substrate sheet including a fiber input/output location; and
a plurality of optical fibers each routed onto the substrate sheet at the fiber input/output location, the optical fibers each including a first end and an opposite second end, the first ends being secured within single-fiber ferrules, the optical fibers including fixed routing portions extending on the substrate sheet along routing paths extending between the input/output location and the sheet openings, the fixed routing portions being adhesively secured to the substrate sheet, the first ends of the optical fibers secured within the single-fiber ferrules being positioned at or near the sheet openings, the optical fibers also including routable-portions that are not adhesively secured to the substrate and that extend from the fiber input/output location to the second ends.

Aspect 50. The telecommunications apparatus of Aspect 49, wherein the substrate includes a tail that projects from a main body if the substrate, and wherein the fiber input/output location is at the tail.

Aspect 51. The telecommunications apparatus of Aspect 49 or 50, wherein the ferrules are covered by dust caps, and wherein the dust caps are bonded to the substrate as part of the routing process.

Aspect 52. The telecommunications apparatus of any of Aspects 49-51, wherein the first ends of the optical fibers extend past their corresponding openings.

Aspect 53. The telecommunications apparatus of any of Aspects 49-51, wherein connector bodies are installed at the first ends of the optical fibers adjacent to the ferrules, and wherein the connector bodies include first portions that coincide with the openings and second portions the extend past the openings.

Aspect 54. The telecommunications apparatus of Aspect 53, wherein the ferrules are covered by dust caps, wherein the dust caps are bonded to the substrate, and wherein the ferrules and there corresponding connector bodies can be disconnected from the substrate be pulling the ferrules from their corresponding dust caps.

While various routing equipment has been described herein specifically with respect to routing fiber optic pigtails on a substrate, it will be appreciated that such equipment can also be used more generically for routing optical fibers that may or may not be connectorized on a substrate. Hence certain methods and processes disclosed herein are applicable to routing optical fibers on a substrate, wherein the optical fibers can be connectorized or not connectorized at the time of routing.

What is claimed is:

1. A method for manufacturing an optical circuit layout for an optical connection device including a plurality of optical connection locations arranged in a multi-dimensional configuration, the method comprising:
using a digital map corresponding to the multi-dimensional configuration of optical connection locations to control a robotic device which routes a plurality of optical fibers on a substrate, wherein the optical fibers are pre-tested optical fibers each having at least one pre-processed end that is a pre-connectorized end including a fiber optic connector, wherein the optical fibers are routed by the robotic device along fiber routing paths defined by the digital map, and wherein the optical fibers are routed on the substrate with the pre-processed ends of the optical fibers being positioned in a multi-dimensional arrangement that corresponds to the multi-dimensional configuration of the optical connection locations, wherein the optical fibers with pre-connectorized ends form optical pigtails, and wherein the optical pigtails are staged for ready access by the robotic device within packaging including spools having flanges defining channels in which pre-defined lengths of the optical fibers are coiled and holders for holding the fiber optic connectors at defined mounting locations on the packaging, wherein the holders are positioned at outer radial peripheries of the spools radially outside the channels, with the optical fibers being coiled within the channels radially between the connectors and spooling surfaces of the spools.

2. The method of claim 1, wherein the optical fibers are secured on along the fiber paths by: routing beads of adhesive material along the fiber routing paths on the substrate; and routing the optical fibers along the beads of adhesive material to secure the optical fibers to the substrate along the fiber routing paths.

3. The method of claim 2, wherein the optical fibers are pressed against the beads of adhesive material by a press roller as the optical fibers are routed along the beads of adhesive material.

4. The method of claim 3, wherein at least one driven roller feeds the optical fibers toward the press roller as the optical fibers are routed along the beads of material.

5. The method of claim 4, wherein the at least one driven roller pulls the optical fibers from packaging and pushes the optical fibers toward the press roller as the optical fibers are routed along the beads of material.

6. The method of claim 5, wherein the optical fibers have connectorized ends at the time the optical fibers are routed on the substrate, wherein the at least one driven roller and the press roller are carried by a fiber routing head, and wherein a connector gripper for grasping the connectorized ends and for positioning the connectorized ends on the substrate is carried with the fiber routing head.

7. The method of claim 6, wherein each packaging includes a connector holder, and wherein the connector gripper is adapted to remove the connectorized ends from the connector holders.

8. The method of claim 7, wherein portions of the optical fibers extend beyond an outer boundary of the substrate after fiber routing, and wherein the portions of the optical fibers are ribbonized after fiber routing.

9. The method of claim 8, wherein the portions of the optical fibers are located on spools during and after fiber routing, and wherein after each fiber is routed its corresponding spool is loaded into a spool holder of a spool holding location.

10. The method of claim 9, wherein the optical fibers are ribbonized by moving the substrate away from the spool holding location such that the fiber portions are pulled through a fiber ribbonization station, wherein the spools rotate within the spool holders to allow the fiber portions to be paid out from the spools as the substrate moves away from the spool holding location.

11. The method of claim 10, wherein the spools are fanned out with respect to one another at the spool holding location.

12. The method of claim 11, wherein a comb assists in fanning out the fiber portions as the fiber portions extend from the substrate to the spool holders.

13. The method of claim 12, wherein the substrate is supported by and moved by a vacuum plate.

14. The method of claim 3, wherein the press roller has a flat axial profile.

15. The method of claim 2, wherein the fibers are pressed against the beads of adhesive material by a roller arrangement including first and second rollers that are angled relative to one another and that cooperate to define a press pocket in which the fibers are received as the fibers are pressed toward the substrate by the roller arrangement.

16. The method of claim 1, wherein the optical fibers have connectorized ends, wherein the substrate defines openings, and wherein the connectorized ends are secured at the openings.

17. The method of claim 1, wherein the optical fibers have connectorized ends including ferrules covered by dust caps, and wherein the dust caps are bonded to the substrate as part of the routing process.

18. The method of claim 1, wherein the optical fibers have connectorized ends, wherein the substrate defines openings, wherein the optical fibers are each routed to separate ones of the openings, and wherein the connectorized ends extend at least partially past their corresponding openings.

19. The method of claim 18, wherein the connectorized ends include first portions that coincide with the openings and second portions that extend past the openings.

20. The method of claim 19, wherein the connectorized ends include ferrules covered by dust caps, wherein the dust caps are bonded to the substrate, and wherein the connectorized ends can be disconnected from the substrate by pulling the ferrules from their corresponding dust caps.

21. A method for manufacturing an optical circuit layout for an optical connection device including a plurality of optical connection locations arranged in a multi-dimensional configuration, the method comprising:
using a digital map corresponding to the multi-dimensional configuration of optical connection locations to control a robotic device which routes a plurality of optical fibers on a substrate, wherein the optical fibers are pre-tested optical fibers each having at least one pre-processed end, wherein the optical fibers are routed by the robotic device along routing paths defined by the digital map, and wherein the optical fibers are routed on the substrate with the pre-processed ends of the optical fibers being positioned in a multi-dimensional arrangement that corresponds to the multi-dimensional configuration of the optical connection locations;
wherein the optical fibers have connectorized ends at the time the optical fibers are routed on the substrate, wherein a driven roller and a press roller are carried by a fiber routing head, and wherein a connector gripper for grasping the connectorized ends and for positioning the connectorized ends on the substrate is carried with the fiber routing head.

22. The method of claim 21, wherein the driven roller pulls the optical fibers from packaging, wherein each packaging includes a connector holder, and wherein the connector gripper is adapted to remove the connectorized ends from the connector holders.

23. The method of claim 22, wherein portions of the optical fibers extend beyond an outer boundary of the substrate after fiber routing, and wherein the portions of the optical fibers are ribbonized after fiber routing.

24. The method of claim 23, wherein the portions of the optical fibers are located on spools during and after fiber routing, and wherein after each fiber is routed its corresponding spool is loaded into a spool holder of a spool holding location.

25. The method of claim 24, wherein the optical fibers are ribbonized by moving the substrate away from the spool holding location such that the fiber portions are pulled through a fiber ribbonization station, wherein the spools rotate within the spool holders to allow the fiber portions to be paid out from the spools as the substrate moves away from the spool holding location.

26. The method of claim 25, wherein the spools are fanned out with respect to one another at the spool holding location.

27. The method of claim 26, wherein a comb assists in fanning out the fiber portions as the fiber portions extend from the substrate to the spool holders.

28. The method of claim 27, wherein the substrate is supported by and moved by a vacuum plate.

29. A method for manufacturing an optical circuit layout for an optical connection device including a plurality of optical connection locations arranged in a multi-dimensional configuration, the method comprising:
using a digital map corresponding to the multi-dimensional configuration of optical connection locations to control a robotic device which routes a plurality of optical fibers on a substrate, wherein the optical fibers are pre-tested optical fibers each having at least one pre-processed end that is a pre-connectorized end including a fiber optic connector, wherein the optical fibers are routed by the robotic device along routing paths defined by the digital map, and wherein the optical fibers are routed on the substrate with the pre-processed ends of the optical fibers being positioned in a multi-dimensional arrangement that corresponds to the multi-dimensional configuration of the optical connection locations, wherein the optical fibers with pre-connectorized ends form optical pigtails, and wherein the optical pigtails are staged for ready access by the robotic device within packaging including spools having flanges defining channels in which pre-defined lengths of the optical fibers are coiled and holders for holding the fiber optic connectors at defined mounting locations on the packaging, wherein the holders are defined at least partially by the flanges, the channel of each spool extending around an exterior radial periphery of the spool and between the flanges, and wherein the optical fibers are coiled between the flanges and around spooling surfaces of the spools and the connectors positioned over the coiled fibers and between the flanges.

* * * * *